(12) United States Patent
Brown et al.

(10) Patent No.: US 8,102,869 B2
(45) Date of Patent: Jan. 24, 2012

(54) DATA ROUTING SYSTEMS AND METHODS

(75) Inventors: David W. Brown, Bingen, WA (US); Jay S. Clark, Bingen, WA (US)

(73) Assignee: Roy-G-Biv Corporation, Bingen, WA (US)

( * ) Notice: Subject to any disclaimer, the term of this patent is extended or adjusted under 35 U.S.C. 154(b) by 264 days.

(21) Appl. No.: 12/494,163

(22) Filed: Jun. 29, 2009

(65) Prior Publication Data

US 2010/0005192 A1   Jan. 7, 2010

Related U.S. Application Data

(63) Continuation of application No. 10/844,025, filed on May 12, 2004, now abandoned.

(60) Provisional application No. 60/506,104, filed on Sep. 25, 2003.

(51) Int. Cl.
*H04L 12/56* (2006.01)
*H04J 1/16* (2006.01)
(52) U.S. Cl. ........................ 370/419; 370/463
(58) Field of Classification Search .................. 370/419, 370/463
See application file for complete search history.

(56) References Cited

U.S. PATENT DOCUMENTS

| | | |
|---|---|---|
| 4,078,195 A | 3/1978 | Mathias et al. |
| 4,159,417 A | 6/1979 | Rubincam |
| 4,199,814 A | 4/1980 | Rapp et al. |
| 4,418,381 A | 11/1983 | Molusis et al. |
| 4,422,150 A | 12/1983 | Keller et al. |

(Continued)

FOREIGN PATENT DOCUMENTS

CA   2222235   12/1996

(Continued)

OTHER PUBLICATIONS

ISO—International Standards Organization; "ISO 10303-1: Industrial automation systems and integration—Product data representation and exchange—Part 1: Overview and fundamental principles: First Edition", Dec. 15, 1994, pp. 1-28.

(Continued)

*Primary Examiner* — John Pezzlo
(74) *Attorney, Agent, or Firm* — Michael R. Schacht; Schacht Law Office, Inc.

(57) ABSTRACT

A motion control system collects data from a plurality of types of motion control devices and distributing data to a plurality of types of data destinations. A data input module comprises a plurality of data source components. Each of the data source components is configured to collect data from one of the plurality of motion control device types. At least one of the data source components is operatively connected to collect data from at least one of the motion control devices. The data output module comprises a plurality of data transport components. Each of the data transport components is configured to transport data to one of the plurality of data destination types. At least one of the plurality of data transport components is operatively connected to distribute data to at least one of the plurality of data destinations. The data cache module stores data collected by the plurality of data input modules; data stored by the data cache module is accessible by the plurality of data output modules. The data output module distributes data collected by the data input module and stored in the data cache module to at least one of the plurality of data destinations.

15 Claims, 15 Drawing Sheets

U.S. PATENT DOCUMENTS

| | | | |
|---|---|---|---|
| 4,444,061 A | 4/1984 | Mathias | |
| 4,494,060 A | 1/1985 | Chitayat et al. | |
| 4,531,182 A | 7/1985 | Hyatt | |
| 4,563,906 A | 1/1986 | Mathias | |
| 4,688,195 A | 8/1987 | Thompson et al. | |
| 4,713,808 A | 12/1987 | Gaskill et al. | |
| 4,716,458 A | 12/1987 | Heitzman et al. | |
| 4,750,888 A | 6/1988 | Allard et al. | |
| 4,767,334 A | 8/1988 | Thorne et al. | |
| 4,769,771 A | 9/1988 | Lippmann et al. | |
| 4,782,444 A | 11/1988 | Munshi et al. | |
| 4,800,521 A | 1/1989 | Carter et al. | |
| 4,809,335 A | 2/1989 | Rumsey | |
| 4,815,011 A | 3/1989 | Mizuno et al. | |
| 4,829,219 A | 5/1989 | Penkar | |
| 4,829,419 A | 5/1989 | Hyatt | |
| 4,840,602 A | 6/1989 | Rose | |
| 4,843,566 A | 6/1989 | Gordon et al. | |
| 4,846,693 A | 7/1989 | Baer | |
| 4,852,047 A | 7/1989 | Lavallee et al. | |
| 4,853,877 A | 8/1989 | Parkhurst et al. | |
| 4,855,725 A | 8/1989 | Fernandez | |
| 4,857,030 A | 8/1989 | Rose | |
| 4,868,474 A | 9/1989 | Lancraft et al. | |
| 4,887,966 A | 12/1989 | Gellerman | |
| 4,897,835 A | 1/1990 | Gaskill et al. | |
| 4,901,218 A | 2/1990 | Cornwell | |
| 4,912,650 A | 3/1990 | Tanaka et al. | |
| 4,923,428 A | 5/1990 | Curran | |
| 4,937,737 A | 6/1990 | Schwane et al. | |
| 4,937,759 A | 6/1990 | Vold | |
| 4,987,537 A | 1/1991 | Kawata | |
| 5,005,134 A | 4/1991 | Nakashima et al. | |
| 5,005,135 A | 4/1991 | Morser et al. | |
| 5,014,208 A | 5/1991 | Wolfson | |
| 5,020,021 A | 5/1991 | Kaji et al. | |
| 5,025,385 A | 6/1991 | Froyd | |
| 5,058,034 A | 10/1991 | Murphy et al. | |
| 5,095,445 A | 3/1992 | Sekiguchi | |
| 5,119,318 A | 6/1992 | Paradies | |
| 5,120,065 A | 6/1992 | Driscoll et al. | |
| 5,126,932 A | 6/1992 | Wolfson et al. | |
| 5,162,986 A | 11/1992 | Graber et al. | |
| 5,168,441 A | 12/1992 | Onarheim et al. | |
| 5,175,684 A | 12/1992 | Chong | |
| 5,175,817 A | 12/1992 | Adams et al. | |
| 5,175,856 A | 12/1992 | Van Dyke et al. | |
| 5,204,599 A | 4/1993 | Hohn | |
| 5,222,193 A | 6/1993 | Brooks et al. | |
| 5,230,049 A | 7/1993 | Chang et al. | |
| 5,231,693 A | 7/1993 | Backes et al. | |
| 5,245,703 A | 9/1993 | Hubert | |
| 5,247,650 A | 9/1993 | Judd et al. | |
| 5,287,199 A | 2/1994 | Zoccolillo | |
| 5,291,416 A | 3/1994 | Hutchins | |
| 5,309,351 A | 5/1994 | McCain et al. | |
| 5,329,381 A | 7/1994 | Payne | |
| 5,341,451 A | 8/1994 | Latte et al. | |
| 5,368,484 A | 11/1994 | Copperman et al. | |
| 5,377,258 A | 12/1994 | Bro | |
| 5,382,026 A | 1/1995 | Harvard et al. | |
| 5,390,304 A | 2/1995 | Leach et al. | |
| 5,390,330 A | 2/1995 | Talati | |
| 5,392,207 A | 2/1995 | Wilson et al. | |
| 5,392,382 A | 2/1995 | Schoppers | |
| 5,400,345 A | 3/1995 | Ryan, Jr. | |
| 5,402,518 A | 3/1995 | Lowery | |
| 5,405,152 A | 4/1995 | Katanics et al. | |
| 5,412,757 A | 5/1995 | Endo | |
| 5,413,355 A | 5/1995 | Gonzalez | |
| 5,417,210 A | 5/1995 | Funda et al. | |
| 5,418,964 A | 5/1995 | Conner et al. | |
| 5,438,529 A | 8/1995 | Rosenberg et al. | |
| 5,450,079 A | 9/1995 | Dunaway | |
| 5,453,933 A | 9/1995 | Wright et al. | |
| 5,459,382 A | 10/1995 | Jacobus et al. | |
| 5,465,215 A | 11/1995 | Strickland et al. | |
| 5,483,440 A | 1/1996 | Aono et al. | |
| 5,485,545 A | 1/1996 | Kojima et al. | |
| 5,485,620 A | 1/1996 | Sadre et al. | |
| 5,491,813 A | 2/1996 | Bondy et al. | |
| 5,493,281 A | 2/1996 | Owens | |
| 5,511,147 A | 4/1996 | Abdel-Malek | |
| 5,541,838 A | 7/1996 | Koyama et al. | |
| 5,566,278 A | 10/1996 | Patel et al. | |
| 5,566,346 A | 10/1996 | Andert et al. | |
| 5,576,727 A | 11/1996 | Rosenberg et al. | |
| 5,577,253 A | 11/1996 | Blickstein | |
| 5,596,994 A | 1/1997 | Bro | |
| 5,600,373 A | 2/1997 | Chui et al. | |
| 5,604,843 A | 2/1997 | Shaw et al. | |
| 5,607,336 A | 3/1997 | Lebensfeld et al. | |
| 5,608,894 A | 3/1997 | Kawakami et al. | |
| 5,613,117 A | 3/1997 | Davidson et al. | |
| 5,617,528 A | 4/1997 | Stechmann et al. | |
| 5,618,179 A | 4/1997 | Copperman et al. | |
| 5,623,582 A | 4/1997 | Rosenberg | |
| 5,625,820 A | 4/1997 | Hermsmeier et al. | |
| 5,625,821 A | 4/1997 | Record et al. | |
| 5,636,994 A | 6/1997 | Tong | |
| 5,652,866 A | 7/1997 | Aldred et al. | |
| 5,655,945 A | 8/1997 | Jani | |
| 5,659,753 A | 8/1997 | Murphy et al. | |
| 5,666,161 A | 9/1997 | Kohiyama et al. | |
| 5,666,264 A | 9/1997 | Chandler et al. | |
| 5,670,992 A | 9/1997 | Yasuhara et al. | |
| 5,691,897 A | 11/1997 | Brown et al. | |
| 5,691,898 A | 11/1997 | Rosenberg et al. | |
| 5,692,195 A | 11/1997 | Conner et al. | |
| 5,697,829 A | 12/1997 | Chainani et al. | |
| 5,701,140 A | 12/1997 | Rosenberg et al. | |
| 5,704,837 A | 1/1998 | Iwasaki et al. | |
| 5,707,289 A | 1/1998 | Watanabe et al. | |
| 5,724,074 A | 3/1998 | Chainani et al. | |
| 5,733,131 A | 3/1998 | Park | |
| 5,734,373 A | 3/1998 | Rosenberg et al. | |
| 5,737,523 A | 4/1998 | Callaghan et al. | |
| 5,739,811 A | 4/1998 | Rosenberg et al. | |
| 5,746,602 A | 5/1998 | Kikinis | |
| 5,752,880 A | 5/1998 | Gabai et al. | |
| 5,752,976 A | 5/1998 | Duffin et al. | |
| 5,754,855 A | 5/1998 | Miller et al. | |
| 5,764,155 A | 6/1998 | Kertesz et al. | |
| 5,766,077 A | 6/1998 | Hongo | |
| 5,772,504 A | 6/1998 | Machiguchi | |
| 5,790,178 A | 8/1998 | Shibata et al. | |
| 5,800,268 A | 9/1998 | Molnick | |
| 5,801,946 A | 9/1998 | Nissen et al. | |
| 5,802,365 A | 9/1998 | Kathail et al. | |
| 5,805,442 A | 9/1998 | Crater et al. | |
| 5,805,785 A | 9/1998 | Dias et al. | |
| 5,818,537 A | 10/1998 | Enokida et al. | |
| 5,821,920 A | 10/1998 | Rosenberg et al. | |
| 5,821,987 A | 10/1998 | Larson | |
| 5,822,207 A | 10/1998 | Hazama et al. | |
| 5,825,308 A | 10/1998 | Rosenberg | |
| 5,825,361 A | 10/1998 | Rubin et al. | |
| 5,828,575 A | 10/1998 | Sakai | |
| 5,832,189 A | 11/1998 | Tow | |
| 5,836,014 A | 11/1998 | Faiman, Jr. | |
| 5,846,132 A | 12/1998 | Junkin | |
| 5,848,415 A | 12/1998 | Guck | |
| 5,852,441 A | 12/1998 | Nakajima et al. | |
| 5,855,483 A | 1/1999 | Collins et al. | |
| 5,867,385 A | 2/1999 | Brown et al. | |
| 5,873,765 A | 2/1999 | Rifkin et al. | |
| 5,889,670 A | 3/1999 | Schuler et al. | |
| 5,889,672 A | 3/1999 | Schuler et al. | |
| 5,889,924 A | 3/1999 | Okabayashi et al. | |
| 5,890,963 A | 4/1999 | Yen | |
| 5,907,704 A | 5/1999 | Gudmundson et al. | |
| 5,907,831 A | 5/1999 | Lotvin et al. | |
| 5,914,876 A | 6/1999 | Hirai | |
| 5,917,840 A | 6/1999 | Cheney et al. | |
| 5,920,476 A | 7/1999 | Hennessey et al. | |
| 5,921,780 A | 7/1999 | Myers | |
| 5,924,013 A | 7/1999 | Guido et al. | |

| Patent | Kind | Date | Inventor |
|---|---|---|---|
| 5,926,389 | A | 7/1999 | Trounson |
| 5,942,869 | A | 8/1999 | Katou et al. |
| 5,956,484 | A | 9/1999 | Rosenberg et al. |
| 5,959,613 | A | 9/1999 | Rosenberg et al. |
| 5,960,085 | A | 9/1999 | de la Huerga |
| 5,960,168 | A | 9/1999 | Shaw et al. |
| 5,977,951 | A | 11/1999 | Danieli et al. |
| 5,984,499 | A | 11/1999 | Nourse et al. |
| 5,991,528 | A | 11/1999 | Taylor et al. |
| 5,999,964 | A | 12/1999 | Murakata et al. |
| 6,012,961 | A | 1/2000 | Sharpe, III et al. |
| 6,020,876 | A | 2/2000 | Rosenberg et al. |
| 6,028,593 | A | 2/2000 | Rosenberg et al. |
| 6,031,973 | A | 2/2000 | Gomi et al. |
| 6,038,493 | A | 3/2000 | Tow |
| 6,038,603 | A | 3/2000 | Joseph |
| 6,046,727 | A | 4/2000 | Rosenberg et al. |
| 6,055,579 | A | 4/2000 | Goyal et al. |
| 6,057,828 | A | 5/2000 | Rosenberg et al. |
| 6,061,004 | A | 5/2000 | Rosenberg |
| 6,065,365 | A | 5/2000 | Ostler et al. |
| 6,070,010 | A | 5/2000 | Keenleyside et al. |
| 6,078,308 | A | 6/2000 | Rosenberg et al. |
| 6,078,747 | A | 6/2000 | Jewitt |
| 6,078,968 | A | 6/2000 | Lo et al. |
| 6,080,063 | A | 6/2000 | Khosla |
| 6,083,104 | A | 7/2000 | Choi |
| 6,088,690 | A | 7/2000 | Gounares et al. |
| 6,090,156 | A | 7/2000 | MacLeod |
| 6,100,874 | A | 8/2000 | Schena et al. |
| 6,101,425 | A | 8/2000 | Govindaraj et al. |
| 6,101,530 | A | 8/2000 | Rosenberg et al. |
| 6,104,158 | A | 8/2000 | Jacobus et al. |
| 6,125,385 | A | 9/2000 | Wies et al. |
| 6,128,006 | A | 10/2000 | Rosenberg et al. |
| 6,131,097 | A | 10/2000 | Peurach et al. |
| 6,133,867 | A | 10/2000 | Eberwine et al. |
| 6,139,177 | A | 10/2000 | Venkatraman et al. |
| 6,144,895 | A | 11/2000 | Govindaraj et al. |
| 6,147,647 | A | 11/2000 | Tassoudji et al. |
| 6,161,126 | A | 12/2000 | Wies et al. |
| 6,166,723 | A | 12/2000 | Schena et al. |
| 6,167,491 | A | 12/2000 | McAlpine |
| 6,169,540 | B1 | 1/2001 | Rosenberg et al. |
| 6,173,316 | B1 | 1/2001 | De Boor et al. |
| 6,191,774 | B1 | 2/2001 | Schena et al. |
| 6,192,354 | B1 | 2/2001 | Bigus et al. |
| 6,195,592 | B1 | 2/2001 | Schuler et al. |
| 6,201,996 | B1 | 3/2001 | Crater et al. |
| 6,208,640 | B1 | 3/2001 | Spell et al. |
| 6,209,037 | B1 | 3/2001 | Brown et al. |
| 6,216,083 | B1 | 4/2001 | Ulyanov et al. |
| 6,216,173 | B1 | 4/2001 | Jones et al. |
| 6,219,032 | B1 | 4/2001 | Rosenberg et al. |
| 6,219,033 | B1 | 4/2001 | Rosenberg et al. |
| 6,232,891 | B1 | 5/2001 | Rosenberg |
| 6,233,545 | B1 | 5/2001 | Datig |
| 6,242,880 | B1 | 6/2001 | Hong |
| 6,243,078 | B1 | 6/2001 | Rosenberg |
| 6,246,390 | B1 | 6/2001 | Rosenberg |
| 6,247,994 | B1 | 6/2001 | DeAngelis et al. |
| 6,252,579 | B1 | 6/2001 | Rosenberg et al. |
| 6,252,853 | B1 | 6/2001 | Ohno |
| 6,259,382 | B1 | 7/2001 | Rosenberg |
| 6,271,833 | B1 | 8/2001 | Rosenberg et al. |
| 6,275,785 | B1 | 8/2001 | Currie et al. |
| 6,278,439 | B1 | 8/2001 | Rosenberg et al. |
| 6,285,351 | B1 | 9/2001 | Chang et al. |
| 6,286,133 | B1 | 9/2001 | Hopkins |
| 6,288,705 | B1 | 9/2001 | Rosenberg et al. |
| 6,288,716 | B1 | 9/2001 | Humpleman et al. |
| 6,290,565 | B1 | 9/2001 | Galyean, III et al. |
| 6,290,566 | B1 | 9/2001 | Gabai et al. |
| 6,292,170 | B1 | 9/2001 | Chang et al. |
| 6,292,174 | B1 | 9/2001 | Mallett et al. |
| 6,292,712 | B1 | 9/2001 | Bullen |
| 6,292,714 | B1 | 9/2001 | Okabayashi |
| 6,295,530 | B1 | 9/2001 | Ritchie et al. |
| 6,300,936 | B1 | 10/2001 | Braun et al. |
| 6,300,937 | B1 | 10/2001 | Rosenberg |
| 6,301,634 | B1 | 10/2001 | Gomi et al. |
| 6,304,091 | B1 | 10/2001 | Shahoian et al. |
| 6,305,011 | B1 | 10/2001 | Safonov |
| 6,309,275 | B1 | 10/2001 | Fong et al. |
| 6,310,605 | B1 | 10/2001 | Rosenberg et al. |
| 6,317,116 | B1 | 11/2001 | Rosenberg et al. |
| 6,317,871 | B1 | 11/2001 | Andrews et al. |
| 6,319,010 | B1 | 11/2001 | Kikinis |
| 6,343,349 | B1 | 1/2002 | Braun et al. |
| 6,345,212 | B1 | 2/2002 | Nourse |
| 6,353,850 | B1 | 3/2002 | Wies et al. |
| 6,366,272 | B1 | 4/2002 | Rosenberg et al. |
| 6,366,273 | B1 | 4/2002 | Rosenberg et al. |
| 6,366,293 | B1 | 4/2002 | Hamilton et al. |
| 6,374,195 | B1 | 4/2002 | Li et al. |
| 6,374,255 | B1 | 4/2002 | Peurach et al. |
| 6,400,996 | B1 | 6/2002 | Hoffberg et al. |
| 6,401,005 | B1 | 6/2002 | Schwarz et al. |
| 6,421,341 | B1 | 7/2002 | Han et al. |
| 6,425,118 | B1 | 7/2002 | Molloy et al. |
| 6,430,471 | B1 | 8/2002 | Kintou et al. |
| 6,439,956 | B1 | 8/2002 | Ho |
| 6,442,451 | B1 | 8/2002 | Lapham |
| 6,463,404 | B1 | 10/2002 | Appleby |
| 6,470,235 | B2 | 10/2002 | Kasuga et al. |
| 6,470,377 | B1 | 10/2002 | Sevcik et al. |
| 6,473,824 | B1 | 10/2002 | Kreissig et al. |
| 6,480,896 | B1 | 11/2002 | Brown et al. |
| 6,491,566 | B2 | 12/2002 | Peters et al. |
| 6,497,606 | B2 | 12/2002 | Fong et al. |
| 6,513,058 | B2 | 1/2003 | Brown et al. |
| 6,516,236 | B1 | 2/2003 | Brown et al. |
| 6,518,980 | B1 | 2/2003 | DeMotte et al. |
| 6,519,594 | B1 | 2/2003 | Li |
| 6,519,646 | B1 | 2/2003 | Gupta et al. |
| 6,523,171 | B1 | 2/2003 | Dupuy et al. |
| 6,528,963 | B1 | 3/2003 | Hong |
| 6,535,861 | B1 | 3/2003 | O'Connor et al. |
| 6,542,925 | B2 | 4/2003 | Brown et al. |
| 6,546,436 | B1 | 4/2003 | Fainmesser et al. |
| 6,559,860 | B1 | 5/2003 | Hamilton et al. |
| 6,560,513 | B2 | 5/2003 | Krause et al. |
| 6,560,592 | B1 | 5/2003 | Reid et al. |
| 6,571,141 | B1 | 5/2003 | Brown |
| 6,606,665 | B2 | 8/2003 | Govindaraj et al. |
| 6,615,091 | B1 | 9/2003 | Birchenough et al. |
| 6,647,328 | B2 | 11/2003 | Walker |
| 6,652,378 | B2 | 11/2003 | Cannon et al. |
| 6,658,325 | B2 | 12/2003 | Zweig |
| 6,658,627 | B1 | 12/2003 | Gallup et al. |
| 6,662,361 | B1 | 12/2003 | Jackson |
| 6,665,688 | B1 | 12/2003 | Callahan, II et al. |
| 6,668,211 | B1 | 12/2003 | Fujita et al. |
| 6,678,713 | B1 | 1/2004 | Mason et al. |
| 6,684,157 | B2 | 1/2004 | Barman et al. |
| 6,704,717 | B1 | 3/2004 | Tate |
| 6,733,382 | B2 | 5/2004 | Oe et al. |
| 6,778,949 | B2 | 8/2004 | Duan et al. |
| 6,782,374 | B2 | 8/2004 | Nichols |
| 6,845,276 | B2 * | 1/2005 | Bocchi .................. 700/61 |
| 6,848,107 | B1 | 1/2005 | Komine et al. |
| 6,850,806 | B2 | 2/2005 | Yutkowitz |
| 6,859,671 | B1 | 2/2005 | Brown |
| 6,859,747 | B2 | 2/2005 | Yutkowitz |
| 6,865,499 | B2 | 3/2005 | Yutkowitz |
| 6,879,862 | B2 | 4/2005 | Brown et al. |
| 6,885,898 | B1 | 4/2005 | Brown et al. |
| 6,889,118 | B2 | 5/2005 | Murray, IV et al. |
| 6,892,115 | B2 | 5/2005 | Berkcan et al. |
| 6,892,145 | B2 | 5/2005 | Topka et al. |
| 6,907,029 | B2 | 6/2005 | Brabrand |
| 6,909,942 | B2 | 6/2005 | Andarawis et al. |
| 6,920,408 | B2 | 7/2005 | Yutkowitz |
| 6,922,826 | B2 | 7/2005 | Bates et al. |
| 6,925,357 | B2 | 8/2005 | Wang et al. |
| 6,941,543 | B1 | 9/2005 | Brown et al. |
| 6,944,584 | B1 | 9/2005 | Tenney et al. |
| 7,024,255 | B1 | 4/2006 | Brown et al. |

| Patent No. | Date | Inventor |
|---|---|---|
| 7,024,666 B1 | 4/2006 | Brown |
| 7,031,798 B2 | 4/2006 | Brown et al. |
| 7,035,697 B1 | 4/2006 | Brown |
| 7,113,833 B1 | 9/2006 | Brown et al. |
| 7,137,107 B1 | 11/2006 | Brown |
| 7,137,891 B2 | 11/2006 | Neveu et al. |
| 7,139,843 B1 | 11/2006 | Brown et al. |
| 7,209,874 B2 | 4/2007 | Salmonsen |
| 7,216,179 B2 | 5/2007 | Ott et al. |
| 7,302,676 B2 | 11/2007 | Schmitt et al. |
| 7,558,320 B2 * | 7/2009 | Winder et al. ............ 375/240.12 |
| 2001/0020944 A1 | 9/2001 | Brown et al. |
| 2001/0029443 A1 | 10/2001 | Miyahira |
| 2001/0032268 A1 | 10/2001 | Brown et al. |
| 2001/0032278 A1 | 10/2001 | Brown et al. |
| 2001/0037492 A1 | 11/2001 | Holzmann |
| 2001/0056539 A1 | 12/2001 | Pavlin et al. |
| 2002/0004423 A1 | 1/2002 | Minami et al. |
| 2002/0044297 A1 | 4/2002 | Tanaka |
| 2002/0045956 A1 | 4/2002 | Kapitan |
| 2002/0049776 A1 | 4/2002 | Aronoff et al. |
| 2002/0052939 A1 | 5/2002 | Lee |
| 2002/0064157 A1 | 5/2002 | Krause |
| 2002/0065941 A1 | 5/2002 | Kaan et al. |
| 2002/0129333 A1 | 9/2002 | Chandhoke et al. |
| 2002/0150093 A1 | 10/2002 | Ott et al. |
| 2002/0156872 A1 | 10/2002 | Brown |
| 2002/0163909 A1 | 11/2002 | Sarkinen et al. |
| 2002/0165627 A1 | 11/2002 | Brown et al. |
| 2002/0165708 A1 | 11/2002 | Kumhyr |
| 2002/0173877 A1 | 11/2002 | Zweig |
| 2002/0177453 A1 | 11/2002 | Chen |
| 2002/0181937 A1 | 12/2002 | Yamamoto et al. |
| 2003/0033150 A1 | 2/2003 | Balan et al. |
| 2003/0037117 A1 | 2/2003 | Tabuchi |
| 2003/0046380 A1 | 3/2003 | Steger et al. |
| 2003/0061023 A1 | 3/2003 | Menezes et al. |
| 2003/0069998 A1 | 4/2003 | Brown et al. |
| 2003/0093187 A1 | 5/2003 | Walker |
| 2003/0109959 A1 | 6/2003 | Tajima et al. |
| 2003/0165227 A1 | 9/2003 | De Beer |
| 2003/0171846 A1 | 9/2003 | Murray, IV et al. |
| 2003/0184580 A1 * | 10/2003 | Kodosky et al. .............. 345/734 |
| 2003/0230998 A1 | 12/2003 | Miyaji et al. |
| 2004/0019683 A1 | 1/2004 | Lee et al. |
| 2004/0025150 A1 | 2/2004 | Heishi et al. |
| 2004/0044794 A1 | 3/2004 | Srinivasan |
| 2005/0114444 A1 | 5/2005 | Brown et al. |
| 2005/0132104 A1 | 6/2005 | Brown |
| 2006/0064503 A1 | 3/2006 | Brown et al. |
| 2006/0206219 A1 | 9/2006 | Brown et al. |
| 2006/0241811 A1 | 10/2006 | Brown et al. |
| 2006/0247801 A1 | 11/2006 | Brown et al. |
| 2006/0282180 A1 | 12/2006 | Brown et al. |
| 2007/0022194 A1 | 1/2007 | Brown et al. |
| 2008/0275576 A1 | 11/2008 | Brown et al. |
| 2008/0275577 A1 | 11/2008 | Brown et al. |
| 2009/0030977 A1 | 1/2009 | Brown et al. |
| 2009/0063628 A1 | 3/2009 | Brown et al. |
| 2009/0082686 A1 | 3/2009 | Brown et al. |
| 2009/0157199 A1 | 6/2009 | Brown et al. |
| 2009/0157807 A1 | 6/2009 | Brown et al. |
| 2009/0271007 A1 | 10/2009 | Brown et al. |
| 2010/0005192 A1 | 1/2010 | Brown et al. |
| 2010/0064026 A1 | 3/2010 | Brown et al. |

FOREIGN PATENT DOCUMENTS

| | | |
|---|---|---|
| CA | 2586401 | 12/1996 |
| CA | 2389183 | 5/2001 |
| CA | 2625283 | 5/2001 |
| EP | 0275826 | 7/1988 |
| EP | 0281427 | 9/1988 |
| EP | 0442676 | 8/1991 |
| EP | 0508912 | 10/1992 |
| EP | 0583908 | 2/1994 |
| EP | 821522 | 1/1998 |
| EP | 0829039 | 3/1998 |
| EP | 1174779 | 4/2000 |
| EP | 1260891 | 11/2002 |
| EP | 1560093 | 8/2005 |
| EP | 1678589 | 7/2006 |
| EP | 1690173 | 8/2006 |
| EP | 2081094 | 7/2009 |
| GB | 2244896 | 12/1991 |
| JP | 59-228473 | 12/1984 |
| JP | 06-168157 | 6/1994 |
| JP | 8161335 | 6/1996 |
| JP | 11506234 | 6/1999 |
| JP | 2000020114 | 1/2000 |
| JP | 2000155693 | 6/2000 |
| JP | 2003513348 | 4/2003 |
| JP | 2004078904 | 3/2004 |
| JP | 2007102796 | 4/2007 |
| JP | 2008159046 | 7/2008 |
| WO | 9211731 | 7/1992 |
| WO | 9308654 | 4/1993 |
| WO | 9507504 | 3/1995 |
| WO | 96/38769 | 5/1995 |
| WO | 96038769 | 12/1996 |
| WO | 0067081 | 11/2000 |
| WO | 0131408 | 5/2001 |
| WO | 0163431 | 8/2001 |
| WO | 02054184 | 7/2002 |
| WO | 02071241 | 9/2002 |
| WO | 03019397 | 3/2003 |
| WO | 2005031542 | 4/2005 |
| WO | 2005048086 | 5/2005 |

OTHER PUBLICATIONS

ISO—International Standards Organization; "ISO 10303-11: Part 11: Description methods: The Express language reference manual", Dec. 15, 1994, all pages.
Fredriksson, L; "A CAN Kingdom", 1995, KVASER AB, pp. 1-109, Rev 3.01.
FANUC Ltd.; "FANUC Robot i series Product Manual", 1995, pp. 1-8.
Brockschmidt, K.; "Inside OLE—Second Edition", 1995, Microsoft Press, (1236 pages) Copyright 1995.
National Instruments; "LabVIEW Graphical Programming for Instrumentation", 1995, pp. 1-16.
WIZDOM Controls, Inc.; "Paradym-31 Software Brochure", 1995, pp. 1-4.
Webb, J.; Reis, R.; "Programmable Logic Controllers—Principles and Applications (Third Edition)", 1995, Prentice-Hall, Inc., All pages. (Copyright 1995).
Fanuc Robotics North America; "SpotTool Application Software", 1995, pp. 1-2.
Farsi, M.; "A Production Cell Communication Model in Factory Automation Using the Controller Area Network", 1995, pp. 90-95.
Numerical Control Society; "Who's Who in Numerical Control—1972", 1972, all pages.
Numerical Control Society; "Who's Who in Numerical Control—1973", 1973, all pages.
Greenfeld, I.; Wright, P.; "A Generic User-Level Specification for Open-System Machine Controllers", Date Unknown, New York University, pp. 1-17.
Pacific Scientific; "Advanced Motion Language", Date Unknown, pp. C-2 thru C-11.
Moore; "Advanced Process Automation and Control System (APACS Product Literature)", Date Unknown, pp. 1-13.
Aerotech, Inc.; "Aerotech Motion Control Product Guide", Date Unknown, pp. 233-234.
Katila, P.; "Applying Total Productive Maintenance—TPM Principles in the Flexible Manufacturing Systems", Date Unknown, Lulea Tekniska Universitet, pp. 1-41.
Silma; "CimStation Product Literature", Date Unknown, pp. 1-12.
Galil Motion Control; "Galil Dynamic Data Exchange Server for DMC-1000", Date Unknown, pp. 1-2.
Galil Motion Control; "Galil OPINT600 Product Features", Date Unknown, pp. 1-3.
Fanuc Robotics North America; "Manufacturing solutions for value-minded companies (Product Brochure)", Date Unknown, pp. 1-5.

Intec Controls Corp; "Paragon TNT Product Brochure", Date Unknown, 6 pages.
Highland Technology, Inc.; "Perfect Parts Product Literature", Date Unknown, pp. 1-4.
Precision Microcontrol; "Precision MicroControl Product Guide", Date Unknown, pp. 11, 27-28.
Mitutoyo; "Quick Vision Product Literature", Date Unknown, pp. 1-8.
Fanuc Robotics North America; "Robotic Palletizing Provides Flexibility at High Speeds", Date Unknown, pp. 1-2.
Penton Media, Inc.; "Technology Trends section of American Machinist", Date Unknown, all pages. (publish date unknown, from American Machinist).
Seven Technologies A/S; "The complete, computer-based automation tool—Control at your fingertips (IGSS)", Date Unknown, 6 pages.
Fanuc Robotics North America; "The Growing Demand for Advanced Robotic Packaging Systems", Date Unknown, pp. 1-2.
SEMI; "SEMI E4-0699 SEMI Equipment Communications Standard 1 Message Transfer (SECS-I)", Jan. 2, 1980.
SEMI; "SEMI E5-1104 SEMI Equipment Communications Standard 2 Message Content (SECS-II)", 1982, Sections 1-9 (pp. 1-9).
ISO—International Standards Organization; "ISO 6983/1: Numerical control of machines—Program format and definition of address words: Part 1: Data format for positioning, line motion and contouring control systems: First Edition", Sep. 15, 1982, pp. 1-16.
Tal, J.; "Motion Control by Microprocessors", 1984, Galil Motion Control.
Fitzgerald, M.; Barbera, A.; "A Low-Level Control Interface for Robot Manipulators", 1985, Robotics and Computer-Integrated Manufacturing, vol. 2, No. 3/4, pp. 201-213.
Rembold, J.; Blume, C.; Frommherz, B.; "The Proposed Robot Software Interfaces SRL and IRDATA", 1985, Robotics and Computer-Integrated Manufacturing, vol. 2, No. 3/4, pp. 219-225.
ISO—International Standards Organization; "ISO 4342: Numerical control of machines—NC processor input—Basic part program reference language, First Edition", Dec. 15, 1985, all pages.
Taylor, R.; "A General Purpose Control Architecture for Programmable Automation Research", 1986, IBM T.J. Watson Research Center, pp. 165-173.
Hayward, V.; Paul, R.; "Robot Manipulator Control under Unix RCCL: A Robot Control "C" Library", 1986, The International Journal of Robotics Research, vol. 5, No. 4, pp. 94-111.
Mack, B.; Bayoumi, M.; "Design and Integration of New Software for the Robot Controller Test Station", 1988, IEEE, pp. 866-873.
Lloyd, J.; Parker, M.; McClain, R.; "Extending the RCCL Programming Environment to Multiple Robots and Processors", 1988, IEEE, pp. 465-469.
Petzold, C.; "The GDI Philosophy", 1988, Microsoft Development Library, Jul. 1994 MSDN, Programming Windows 3.1, pdf pp. 1-2.
Mangaser, A.; Wang, Y.; Butner, S.; "Concurrent Programming Support for a Multi-Manipulator Experiment on RIPS", 1989, IEEE, pp. 853-859.
Stegbauer, W.; "Intertask-Communication Inside a Real-Time Database", 1989, IFAC Distributed Databases in Real-time, pp. 63-69.
Tal, J.; "Motion Control Applications", 1989, Galil Motion Control.
Electronic Industries Association; "EIA-511 Manufacturing Message Specification—Service Definition and Protocol", Mar. 1, 1989, pp. 1-177.
Galil Motion Control; "Galil G-Code Translator News Release", Apr. 14, 1989, pp. 1-2.
Electronic Industries Association; "EIA-511 Errata", Apr. 18, 1989, pp. 1-7.
Pritchard, K.; "Applying Simulation to the Control Industry", May 1, 1989, Cahners Publishing Company, pp. 1-3 (reprinted from Control Engineering, May 1989).
Tesar, D.; Butler, M.; "A Generalized Modular Architecture for Robot Structures", Jun. 1, 1989, American Society of Mechanical Engineers, pp. 91-118.
Galil Motion Control; "Galil OPINT600 Product Literature", Jun. 1, 1989, pp. 1-2.
Galil Motion Control; "Galil ServoTRENDS vol. V. No. 3", Jul. 1, 1989, pp. 1-3.
Galil Motion Control; "Galil OPINT600 Press Release", Jul. 10, 1989, pp. 1-2.
Popovic, D.; Bhatkar, V.; "Distributed Computer Control for Industrial Automation", 1990, Marcel Dekker, Inc., (721 pages).
Bloom, H.; "Software and Computer Integrated Manufacturing", 1990, pp. 1-14.
Wright, P.; Greenfeld, I.; "Open Architecture Manufacturing: The Impact of Open-System Computers on Self-sustaining Machinery and the Machine Tool Industry", 1990, Proc. Manuf. Int. 90, Part2: Advances in Manufacturing, pp. 41-47.
Stewart; Schmitz; Khosla; "Implementing Real-Time Robotic Systems Using CHIMERA II", 1990, IEEE, pp. 254-255, Sections 3.1 and 3.2.
Kasahara, T.; "MAP 3.0 Entering the Practical Use Period in the CIM Era: MAP 3.0 MMS Architecture and Mounting Method", Mar. 1, 1990, Ohmsha Ltd., pp. 57-62, Computer and Network LAN vol. 8, No. 3.
Altintas, Y.; Peng, J.; "Design and Analysis of a Modular CNC System", Mar. 14, 1990, Elsevier Science Publishers B. V, pp. 305-316, vol. 13, Computers in Industry.
Salkind, L.; "Robotics Research Technical Report—SAGE a Real-Time Operating System for Robotic Supervisory Control", May 1, 1990, New York University, pp. 1-132. (DEFS 00040941-00041085).
ISO/IEC; "ISO/IEC 8824: Information Technology—Open Systems Interconnection—Specification of Abstract Syntax Notation One", Dec. 15, 1990, all pages.
Compumotor Division, Parker Hannifin; "6000 Series Programmer's Guide", 1991, all pages.
Iyengar, S.; Elfes, A.; "Autonomous Mobile Robots: Control, Planning, and Architecture", 1991, IEEE Computer Society Press, All pages.
Iyengar, S.; Elfes, A.; "Autonomous Mobile Robots: Perception, Mapping, and Navigation", 1991, IEEE Computer Society Press, All pages.
Paidy; Reeve; "Software Architecture for a Cell Controller", 1991, IEEE, pp. 344-349.
Miller, D.; Lennox, C.; "An Object-Oriented Environment for Robot System Architectures", Feb. 1, 1991, IEEE Control Systems, pp. 14-23.
Yared, W.; Sheridan, T.; "Plan Recognition and Generalization in Command Languages with Application to Telerobotics", Mar. 1, 1991, IEEE, vol. 21, No. 2, pp. 327-338.
Senehi, M.; Wallace, S.; Barkmeyer, E.; Ray, S.; Wallace, E.; "Control Entity Interface Document", Jun. 1, 1991, pp. 1-38.
Payton, D.; Bihari, T.; "Intelligent Real-Time Control of Robotic Vehicles", Aug. 1, 1991, ACM, pp. 49-63, vol. 34, No. B.
Robert Bosch GMBH; "Can Specification", Sep. 1, 1991, 72 pages, Version 2.0.
Takase, K.; "Project of a robot performing in an extreme situation", Oct. 15, 1991, vol. 9, No. 5, pp. 79-82, p. 59.
Step Tools, Inc.; "Database Use Case Presentation", Apr. 1, 2000, p. 1.
ARC Advisory Group; "HMI Software Strategies", Apr. 1, 2000, pp. 1-16.
Can in Automation (CIA); "CANopen", Apr. 3, 2000, pp. 1-125, document created on Apr. 3, 2000.
Manufacturing Science and Technology Center (MSTC); "MIMOSA CRIS V2.1 Terminology", Apr. 7, 2000, pp. 1-3, document created Apr. 7, 2000.
Individual; "Containment Early Binding—Draft 1.2", Apr. 12, 2000, pp. 1-17.
ARC Advisory Group; "E-Security Strategies for Enterprises", May 1, 2000, pp. 1-20.
ARC Advisory Group; "Open Control Strategies", May 1, 2000, pp. 1-20.
Mizukawa, M.; Matsuka, H.; Koyama, T.; Matsumoto, A.; "OriN: Open Robot Interface for the Network: A Proposed Standard", May 1, 2000, MCB University Press, Industrial Robot, 7 pages, pp. 344-350.
Iso/Iec; "Part 203: Application Protocol: Configuration controlled 3D designs of mechanical Parts and assemblies, Amendment 1", May 4, 2000, all pages.

Machinery Information Management Open Systems Alliance (MIMOSA); "Common Relational Information Schema, CRIS Version 2.1", May 8, 2000, all pages.
Proctor, F.; Kamatsu, C.; Glantschnig, F.; "ISO/DIS 14649-1: Industrial automation systems and integration—Physical device control—Data model for computerized numerical controllers—Part 1: Overview and fundamental principles: Draft", 2000, ISO—International Standards Organization, all pages.
ISO—International Standards Organization; "ISO/DIS 14649-10: Industrial automation systems and integration—Physical device control—Data model for computerized numerical controllers—Part 10: General process data: Draft", 2000, pp. 1-149.
Westenberg, A.; "Linux CAN-bus HOWTO", 2000, pp. 1-33.
EPM Technology; "Step-NC A NewData Interface for NC-Programming", 2000, p. 1, The Expressway web-site.
Loffredo, D.; "The Step ISO Standard Presentation", 2000, Step Tools, Inc., pp. 1-15.
Farsi, M.; Barbosa, M.; "CANopen Implementation—Applications to Industrial Networks", 2000, Research Studies Press Ltd, Chps. 1, 2 and 3.
Kovach, P.; "Inside Direct3D—The Definitive Guide for Real-Time 3D Power and Performance for Microsoft Windows", 2000, Microsoft Press, Chps. 1, 7 and 15.
Jerard, R.; Ryou, O.; "Internet Based Fabrication of Discrete Mechanical Parts", Jan. 3, 2000, Proceedings of the 2000 Design and Mfg Research Conference, pp. 1-9.
CAN in Automation (CIA); "CANopen Representation of SI Units and Prefixes", Jan. 19, 2000, pp. 1-7.
Individual; "Non-Neutral Comparison of the Part 28 Early Bindings", Mar. 24, 2000, pp. 1-10.
Natale, C.; Siciliano, B.; Villani, L.; "Robust Hybrid Force/Position Control with Experiments on an Industrial Robot", Sep. 19, 1999, IEEE, Proceedings of the 1999 IEEE/ASME Intl. Conf. On Advanced Intelligent Mechatronics, pp. 956-961.
Manufacturing Science and Technology Center (MSTC); "MSTC/JOP-1101: Specifications for Autonomous Decentralized Protocol (R 3.0)", Sep. 30, 1999, pp. 1-79.
Mizukawa, M.; Matsuka, H.; Koyama, T.; Matsumoto, A.; "De-Facto Standard API for Open and Networked Industrial Robots", Oct. 1, 1999, pp. 455-462.
Pirjanian, P.; "Behavior Coordination Mechanisms—State-of-the-art", Oct. 7, 1999, USC Robotics Research Laboratory, pp. 1-49.
ISO—International Standards Organization; "Express-X Language Reference Manual—Draft", Oct. 15, 1999, all pages.
Morales, E.; "GENERIS: The EC-JRC Generalized Software Control System for Industrial Robots", Nov. 1, 1999, MCB University Press, Industrial Robot, pp. 26-32, vol. 26, No. 1.
Jeppsson, J.; "Sensor Based Adaptive Control and Prediction Software—Keys to Reliable HSM", Nov. 3, 1999, The Boeing Company.
Manufacturing Science and Technology Center (MSTC); "MSTC/JOP—1304: Management-data Format for Machine tool", Nov. 30, 1999, pp. i-iii, 1-10.
Ge Fanuc; "Cimplicity HMI for CNC—CNC Machining Interface Plus Operation Manual", Dec. 1, 1999, pp. 1-1 to B-2.
Hemmett, J.; Fussell, B.; Jerard, R.; "A Robust and Efficient Approach to Feedrate Selection for 3-axis Machining", 2000, ASME IMECE, pp. 1-15, Submission for "Dynamics and Control of Material Removal Process", 2000 ASME IECE.
Manufacturing Science and Technology Center (MSTC); "MSTC/JOP-1014: FL-net Implementation Guideline, Version 1.0", Jul. 1, 1999, pp. 1-39.
Manufacturing Science and Technology Center (MSTC); "MSTC/JOP-1015: Basic Specifications of FL-net Product Certification System, Version 1.0", Jul. 1, 1999, pp. 1-11.
Manufacturing Science and Technology Center (MSTC); "MSTC/JOP-1302: CNC Application Programming Interface, PAPI Specification 1.01E", Jul. 26, 1999, pp. i-v, 1-143.
CAN in Automation (CIA); "CAN Application Fields", Jul. 28, 1999, pp. 1-5, document created on Jul. 28, 1999.
JARA; "Specifications of ORiN (Ver. 0.5)", Aug. 1, 1999.

Valera, A.; Robertsson, A.; Nilsson, K.; Johansson, R.; "Interactive Online Evaluation of Robot Motion Control", Aug. 2, 1999, IEEE, Proceedings of the 1999 IEEE International Conference on Control Applications, pp. 1039-1043.
CAN in Automation (CIA); "CAN Data Link Layer", Aug. 9, 1999, pp. 1-44, document created on Aug. 9, 1999.
CAN in Automation (CIA); "CAN Implementation", Aug. 9, 1999, pp. 1-33, document created on Aug. 9, 1999.
CAN in Automation (CIA); "CAN Physical Layer", Aug. 9, 1999, pp. 1-45, document created on Aug. 9, 1999.
Loffredo, D.; "Fundamentals of STEP Implementation", Sep. 9, 1999, STEP Tools, Inc., pp. 1-12, document creation date: Sep. 9, 1999.
Nilsson, K.; Johansson, R.; "Integrated Architecture for Industrial Robot Programming and Control", May 20, 1999, Elsevier Science Publishers B.V, Robotics and Autonomous Systems, pp. 205-226, vol. 29.
Brooks, M.; "Rate Monotonic Analysis of an Antenna CAN Bus", May 28, 1999, pp. 1-3.
Mathias, D.; Hellmann, R.; "Boeing Implements HMI", Jun. 1, 1999, Manufacturing Engineering, pp. 1-3.
Rockwell Automation; "Interchange for Windows Release Notes", Jun. 1, 1999, pp. 1-14.
Hardwick, D.; "STEP Database Tutorial, Chapter One—Making Business Objects Using EXPRESS-X", Jun. 21, 1999, STEP Tools, Inc., pp. 1-20.
Platt, D.; "Understanding COM+: Events", Jun. 30, 1999, Microsoft Press, pp. 149-182.
Platt, D.; "Understanding COM+: Security", Jun. 30, 1999, Microsoft Press, pp. 44-57.
ISO/IEC; "CEI/IEC 9506-5: Industrial automation systems—Manufacturing message specification—Part 5: Companion Standard for Programmable Controllers", Jul. 1, 1999, pp. 1-129.
Manufacturing Science and Technology Center (MSTC); "MST/JOP-1012: FL-net Protocol Specifications, Version 1.0", Jul. 1, 1999, pp. 1-65.
Manufacturing Science and Technology Center (MSTC); "MSTC/JOP—1013: FL-net Device Profile Common Specification, Version 1.0", Jul. 1, 1999, pp. 1-28.
Leu, K; Ang Jr., M.; Wong, Y.; "A Telemanufacturing Workcell Over the Internet", Nov. 1, 1998, SPIE, pp. 230-237.
Muir, P.; Homer, J.; "Mechatronic Objects for Real-Time Control Software Development", Nov. 1, 1998, SPIE, pp. 251-265, vol. 3518.
ISO/IEC; "ISO/IEC 8824-1: Information technology—Abstract Syntax Notation One (ASN.1): Specification of basic notation: Second Edition", Dec. 15, 1998, all pages.
Globalspec; "About CNC Controllers", 1999, Internet Location: http://motion-controls.globalspec.com/ LearnMore/Motion_Controls/Machine_Motion_Controllers/CNC_Controllers.
Birla, S.; Yen, J.; Skeries, F.; Berger, D.; "Controls Software Requirements for Global Commonization", 1999, Cahners Publishing Company, pp. 1-4, Jan. 1999 issue of Control Engineering.
Lee, K.; "Principles of CAD/CAM/CAE Systems", 1999, Addison Wesley Longman, Inc., All pages. (Copyright 1999).
Manufacturing Science and Technology Center (MSTC); "The Introduction of Standard Protocol in Japanese Manufacturing Systems and a Proposal of Collaboration", 1999, pp. 1-48.
Brooks, M.; "CAN Bus Simulation Results", Mar. 30, 1999, pp. 1-4.
Ge Fanuc; "Cimplicity HMI OPC Server", Apr. 1, 1999.
Cho, Y.; You, B.; Lee, C.; "A Compact/Open Network-based Controller Incorporating Modular Software Architecture for a Humanoid Robot", Apr. 19, 1999, Kluwer Academic Publishers, Journal of Intelligent and Robotic Systems, pp. 341-355.
ISO—International Standards Organization; "ISO—DIS 14649-1: Industrial automation systems and integration—Physical device control—Data model for Computerized Numerical Controllers—Part 1: Overview and Fundamental Principles", Sep. 1, 1998, pp. 1-15.
Claverie, S.; "Working the 'NET: Developing Applications with Internet Information Server and Visual Basic Active X Controls", Sep. 1, 1998, Loyola University, pp. 158-162.
Haynes, T.; "Data Interface for Numerical Controls", Sep. 21, 1998, National Center for Manufacturing Sciences, all pages, NCMS Fall Conference.

Barco Gerber Systems Corporation; "Gerber RS-274X Format User's Guide", Sep. 21, 1998, pp. 1-55.
Ge Fanuc; "Open Systems (Type II High Speed Serial Bus Setup for 32-Bit Windows 95 and Windows NT Applications) User's Manual", Oct. 1, 1998, pp. 1-1 to B-5.
Price, D.; West, M.; Fowler, J.; "The STEP Data Integration Architecture Activity", Oct. 1, 1998, pp. 1-9, document creation date: Oct. 1, 1998.
ISO 10303 Editing Committee; "ISO 10303—STEP on a Page", Oct. 23, 1998, p. 1.
ISO 10303 Editing Committee; "ISO 10303: STEP on a p. #2", Oct. 23, 1998, p. 1.
OPC Foundation; "OPC Overview", Oct. 27, 1998, Version 1.0.
Michaloski, J.; Birla, S.; Weinert, G.; Yen, J.; "A Framework for Component-base CNC Machines", Nov. 1, 1998, SPIE, pp. 132-143, vol. 3518.
Bargen, B.; Donnely, P.; "Inside Direct X--In Depth Techniques for Developing High-Performance Multimedia Applications", 1998, Microsoft Press, Chps. 1, 18-20, 22-27.
Loffredo, D.; "Efficient Database Implementation of Express Information Models (Presentation)", Apr. 10, 1998, pp. 1-26.
Loffredo, D.; "Efficient Database Implementation of Exress Information Models", May 1, 1998, pp. 1-133.
Bouzouia, B.; Guerrouni, F.; Boukhezar, A.; "A Three-Layer Workcell Control Architecture Design", May 1, 1998, IEEE, pp. 1185-1191.
Think and Do Software, Inc.; "Think and Do Smart Distributed System Brochure", May 18, 1998, pp. 1-2, (document creation date May 18, 1998).
CAN in Automation (CIA); "CAN Specification 2.0, Part A", Jun. 12, 1998, pp. 1-31, document created on Jun. 12, 1998.
CAN in Automation (CIA); "CAN Specification 2.0, Part B", Jun. 12, 1998, pp. 1-38, document created on Jun. 12, 1998.
ISO—International Standards Organization; "ISO 10303-49: Industrial automation systems and integration—Product data representation and exchange—Part 49: Integrated generic resources: Process structure and properties: First Edition", Jun. 15, 1998, pp. 1-64.
ISO—International Standards Organization; "ISO 13584-20: Industrial automation systems and integration—Parts library—Part 20: Logical resource: Logical model of expressions: First Edition", Jul. 1, 1998, pp. 1-96.
CAN in Automation (CIA); "CAN Specification 2.0, Addendum—Implementation Guide for the CAN Protocol", Jul. 7, 1998, pp. 1-3, document created on Jul. 7, 1998.
Sperling; "Designing Applications for an OSACA Control", Nov. 16, 1997, Proceedings of the International Mechanical Engineering Congress and Exposition, 5 pages.
Lutz, P.; "OSACA--The vendor-neutral Control Architecture", Dec. 1, 1997, The European Conference on Integration in Manufacturing, pp. 247-256.
Scholar'S International Publishing Corp.; "Chapter 1—CNC Programming Fundamentals—From MasterCam Documentation", 1998, all pages.
Iconics, Inc.; "GENESIS32 Version 5.2 Product Workshop", 1998, pp. 1-247.
Hall, E.; "Intelligent Robot Trends for 1998", 1998, University of Cincinnati, pp. 1-13.
Siemens AG Automation and Drives; "IT-Solutions for Machine Tools: SinCOM Computer Link SINUMERIK 840D/810D Description of Functions", 1998, 272 pages.
Xiaowei, M.; Xiaoli, L.; Yulin, M.; Hegao, C.; "Real-time Self-reaction of Mobile Robot with Genetic Fuzzy Neural Network in Unknown Environment", 1998, Proceedings of the IEEE Intl. Conf. on Sys, Man, and Cybernetics, vol. 4.
Petzold, C.; "The Technique of Banding", 1998, Microsoft Development Library, Jul. 1994 MSDN, Programming Windows 3.1, pdf pp. 1-9.
Morales; "A Generalised Software Control System for Industrial Robots", 1998, IEEE, pp. 411-416.
Chang; "Development and Implementation of an Application Programming Interface for PC/DSP-based Motion Control System", 1998, SPIE, pp. 94-105, vol. 3518.
Roy-G-Biv Corporation; "ReEx: U.S. Patent No. 5,691,897 Ex-Partes Reexamination (Control No. 90/009,282)—Appeal Brief", Jul. 12, 2010, (75 pages).
JPO; "Japanese Patent Application No. JP2003513348—FileHist: Office Action", Jun. 10, 2010, (13 pages).
USPTO; "USPTO Patent FileHist: P215429 (U.S. Appl. No. 11/728,801) Notice of Allowance", Jun. 16, 2010, (72 pages).
USPTO; "USPTO Patent FileHist: P214669 (U.S. Appl. No. 10/966,848)—Notice of Allowance", Jun. 22, 2010, (50 pages).
USPTO; "USPTO Patent FileHist: P214669 (U.S. Appl. No. 10/966,848)—Notice of Allowance", Jul. 12, 2010, (17 pages).
Brown, D.; Clark, J.; "FileHist: Canadian Patent Application No. 2,586,401—Notice of Allowance", Oct. 27, 2009, CIPO, (641 pages).
EPO; "FileHist: European Patent Application No. EP04816957—Search Report", Mar. 24, 2010, (4 pages).
Roy-G-Biv Corporation; "USPTO Patent FileHist: P214185 (U.S. Appl. No. 10/405,883) File History; Amend after Final Rejection Office Action", Mar. 29, 2010, (6 pages).
USPTO; "USPTO Patent FileHist: 7110.00002 (U.S. Appl. No. 12/263,953) File History; Non-Final Office Action", Mar. 31, 2010, (476 pages).
Roy-G-Biv Corporation; "USPTO Patent FileHist: P215031 (U.S. Appl. No. 11/375,502) File History; Response After Oct. 1, 2009 Non-Final Office Action", Mar. 31, 2010, (13 pages).
Roy-G-Biv Corporation; "USPTO Patent FileHist: P215057 (U.S. Appl. No. 11/454,053) File History; Supp Amend after Non-Final Office Action", Apr. 1, 2010, (15 pages).
Roy-G-Biv Corporation; "USPTO Patent FileHist: P215057 (U.S. Appl. No. 11/454,053) File History; Supp Amend after Non-Final Office Action", Apr. 5, 2010, (8 pages).
USPTO; "USPTO Patent FileHist: P214185 (U.S. Appl. No. 10/405,883) File History; Notice of Allowance", Apr. 19, 2010, (58 pages).
Roy-G-Biv Corporation; "USPTO Patent FileHist: P215057 (U.S. Appl. No. 11/454,053) File History—Remarks", Apr. 23, 2010, 2 pages.
Roy-G-Biv Corporation; "USPTO Patent FileHist: P215057 (U.S. Appl. No. 11/454,053) File History—Supplemental Amendment After Non-Final Rejection", Apr. 23, 2010, 1 page.
USPTO; "ReEx: U.S. Patent No. 5,691,897 Reexamination (Control No. 90/009,282)—Examiner Interview Summary", May 12, 2010, (9 pages).
Roy-G-Biv Corporation; "ReEx: U.S. Patent No. 5,691,897 Reexamination (Control No. 90/009,282)—Supplemental Response to Final Office Action", May 18, 2010, (48 pages).
USPTO; "ReEx: U.S. Patent No. 5,691,897 Reexamination (Control No. 90/009,282)—Examiner Advisory Action", May 24, 2010, (5 pages).
Roy-G-Biv Corporation; "USPTO Patent FileHist: P215057 (U.S. Appl. No. 11/454,053) File History—Terminal Disclaimer", Apr. 23, 2010, 2 pages.
Roy-G-Biv Corporation; "USPTO Patent FileHist: P216039 (U.S. Appl. No. 12/244,673) File History—Remarks", Apr. 23, 2010, 2 pages.
Roy-G-Biv Corporation; "USPTO Patent FileHist: P216039 (U.S. Appl. No. 12/244,673) File History—Supplemental Amendment After Non-Final Rejection", Apr. 23, 2010, 1 page.
Individual; "AP240_ARM_DIS_012003 Presentation", Feb. 25, 2003, pp. 1-20, document creation date: Feb. 25, 2003.
Van Der Wal, E.; "PLCopen: changing the world of industrial automation—status, structuring tools, activities and libraries", Nov. 18, 2003, PLCopen, pp. 1-108.
Kepware Technologies; "User Configurable Driver Users Manual", 2004.
Rockwell Automation Technologies, Inc.; "Integrated Architecture Product Literature", Apr. 1, 2004.
Danner, B.; Frechette, S.; Vorburger, T.; "A Step-Based Information Model for Dimensional Inspection—Draft", Jun. 20, 2002, ISO—International Standards Organization, pp. 1-95.
Kepware Technologies; "KEPServerEX OPC Server Software", Jul. 12, 2002, pp. 1-202.

Siemens AG Automation and Drives; "SCADA: The Strategic Centre—IT and Business Integration Technical Article", Dec. 10, 2002.
Rockwell Automation Technologies, Inc.; "FactoryTalk—Enabled Solutions", 2003.
Fanuc Ltd.; "Fanuc Series 30i/31i/32i:300i/310i/320i:300is/310is/320is-Model A Brochure", 2003, pp. 1-28.
Fanuc Robotics America, Inc; "HandlingWorks Product Brochure", 2003, pp. 1-2.
Baron, M.; "Process Visualization—Up to Date—Technical Article", 2003, Siemens AG Automation and Drives.
Fanuc Robotics North America, Inc.; "R-J3/R-J3iB Integrated PMC", 2003, pp. 1-2.
Siemens AG Automation and Drives; "SIMATIC WinCC Version 6 System Description Product Brochure", 2003.
Roy-G-Biv Corporation; "XMC Helps Systems Integrator Improve Customer's Efficiency With CNC Machine-Tool Retrofit", 2003, pp. 1-2.
Callen, J.; "A View from the CAM Side—Moving into 3D", May 1, 2002, Desktop Engineering Magazine, pp. 1-3, Desktop Engineering Magazine Web Article (www.deskeng.com).
OMAC Users Group; "OMAC Step-NC: The Value Proposition For STEP-NC", May 1, 2002, pp. 1-23.
GE Fanuc; "TCP/IP Ethernet Communications—Station Manager Manual", May 1, 2002, Chapters 1, 3, 4 and 5, pp. 1-9, 14-56.
I++ Working Group; "I++ DME Interface, Version 1.09", May 17, 2002, pp. 1-76, document created on May 17, 2002.
Wood, R.; "Integrated Steel Processing Environment (ISPE) Project Presentation", Jun. 10, 2002, Northrop Grumman Corporation, pp. 1-3.
Vorburger, T.; "Report on AP219—Dimensional Inspection Information Exchange Project Presentation", Jun. 10, 2002, NIST, pp. 1-16.
Radack, G.; "WG3 Presentation to SC4 Opening Plenary—TC4—Step-Manufacturing", Jun. 10, 2002, ISO—International Standards Organization, pp. 1-4, document creation date: Jun. 10, 2002.
Individual; "AP2XX_ARM_060602 Presentation", Jun. 11, 2002, pp. 1-18, document creation date: Jun. 11, 2002.
Individual; "TC 184, SC4, WG3, T24 (Manufacturing) Session on AP219 Meeting Notes", Jun. 12, 2002, pp. 1-2.
Danner, B.; Frechette, S.; Vorburger, T.; "AP219 Dimensional Inspection—Informational requirements document Presentation", Jun. 14, 2002, Seneca-IT.com, pp. 1-24.
Jerard, R.; Ryou, O.; "E-Commerce for the Metal Removal Industry", Jan. 7, 2002, International Business Machines Corporation, pp. 1-28.
ISO—International Standards Organization; "ISO/FDIS 14649-10: Industrial automation systems and integration—Physical device control—Data model for Computerized Numerical Controllers—Part 10: General Process Data: Draft 2002", Feb. 6, 2002, pp. 1-179.
ISO—International Standards Organization; "ISO/FDIS 14649-11: Industrial automation systems and integration—Physical device control—Data model for Computerized Numerical Controllers—Part 11: Process Data for Milling: Draft 2002", Feb. 6, 2002, pp. 1-76.
ISO—International Standards Organization; "ISO/FDIS 14649-111: Industrial automation systems and integration—Physical device control—Data model for Computerized Numerical Controllers—Part 111: Tools for Milling: Draft 2002", Feb. 6, 2002, pp. 1-27.
Brown, D.; "OMAC-HMI, OSACA, JOP Standard CNC Data Type Analysis", Feb. 9, 2002, Roy-G-Biv Corporation.
ISO—International Standards Organization; "ISO/WD 10303-238: STEP-NC AIM v2.8—Draft", Feb. 24, 2002, pp. 1-810.
Krar, S.; Gill, A.; "Open Architecture CNC (Advanced Manufacturing Magazine)", Mar. 1, 2002, CLB Media Inc., pp. 23-27. vol. 4, No. 2.
Cover, R.; "The XML Cover Pages: STEP/EXPRESS and XML", Mar. 29, 2002, pp. 1-11.
Step Tools, Inc.; "ST-XML Manual", Apr. 1, 2002, pp. 1-60.
Individual; "AAM for AP2xx (Process Plans for Machined Products) Presentation", Apr. 11, 2002, pp. 1-11, document creation date: Apr. 11, 2002.
Ge Fanuc; "Pleadings: Invalidity Contentions of Defendants—Exhibit W-543", Jul. 11, 2008, pp. 1-67.
Ge Fanuc; "Pleadings: Invalidity Contentions of Defendants—Exhibit W-897", Jul. 11, 2008, pp. 1-161.
Ge Fanuc; "Pleadings: Invalidity Contentions of Defendants—Exhibit X-236", Jul. 11, 2008, pp. 1-37.
Ge Fanuc; "Pleadings: Invalidity Contentions of Defendants—Exhibit X-543", Jul. 11, 2008, pp. 1-51.
Ge Fanuc; "Pleadings: Invalidity Contentions of Defendants—Exhibit X-897", Jul. 11, 2008, pp. 1-73.
Ge Fanuc; "Pleadings: Invalidity Contentions of Defendants—Exhibit Y-058", Jul. 11, 2008, pp. 1-28.
Ge Fanuc; "Pleadings: Invalidity Contentions of Defendants—Exhibit Y-236", Jul. 11, 2008, pp. 1-15.
Ge Fanuc; "Pleadings: Invalidity Contentions of Defendants—Exhibit Y-543", Jul. 11, 2008, pp. 1-19.
Ge Fanuc; "Pleadings: Invalidity Contentions of Defendants—Exhibit Y-897", Jul. 11, 2008, pp. 1-34.
Ge Fanuc; "Pleadings: Invalidity Contentions of Defendants—Exhibit Z-058", Jul. 11, 2008, pp. 1-117.
Ge Fanuc; "Pleadings: Invalidity Contentions of Defendants—Exhibit Z-236", Jul. 11, 2008, pp. 1-103.
Ge Fanuc; "Pleadings: Invalidity Contentions of Defendants—Exhibit Z-543", Jul. 11, 2008, pp. 1-97.
Ge Fanuc; "Pleadings: Invalidity Contentions of Defendants—Exhibit Z-897", Jul. 11, 2008, pp. 1-227.
Roy-G-Biv Corporation; "Pleadings: Plaintiff Indentification of Ten Asserted Claims", Aug. 8, 2008, p. 1.
Ge Fanuc; "Pleadings: Fourth Supplemental Objections and Responses of Defendants to Plantiff First Set of Interrogatories (Nos. 1 and 2)", Aug. 14, 2008, pp. 1-26.
Ge Fanuc; "Pleadings: Fifth Supplemental Objections and Responses of Defendants to Plantiff First Set of Interrogatories (Nos. 1)", Aug. 26, 2008, pp. 1-23.
Roy-G-Biv Corporation; "Pleadings: RGB Internal Document #8", Nov. 6, 2008, p. 4 (RGB00055568).
Roy-G-Biv Corporation; "Pleadings: RGB Internal Documents #9", Nov. 6, 2008, p. 14 (RGB00056075).
Roy-G-Biv Corporation; "Pleadings: RGB Related Document #1", Nov. 6, 2008, PDF pp. 1-23 (RGB00051652- RGB00051674).
Roy-G-Biv Corporation; "Pleadings: RGB Related Document #2", Nov. 6, 2008, PDF pp. 1-5 (RGB00052822- RGB00052826).
Roy-G-Biv Corporation; "Pleadings: RGB Related Document #3", Nov. 6, 2008, PDF p. 1 (RGB00004196).
Roy-G-Biv Corporation; "Pleadings: RGB Related Document #4", Nov. 6, 2008, PDF p. 1 (RGB00004200).
Roy-G-Biv Corporation; "Pleadings: RGB Related Document #5", Nov. 6, 2008, PDF p. 1 (RGB00004201).
Roy-G-Biv Corporation; "Pleadings: RGB Related Document #6", Nov. 6, 2008, PDF p. 1 (RGB00004202).
Roy-G-Biv Corporation; "Pleadings: RGB Related Document #7", Nov. 6, 2008, PDF pp. 1-3 (RGB00052984- RGB00052986).
Ge Fanuc; "Pleadings: Invalidity Contentions of Defendants—Exhibit Q-236", Jul. 11, 2008, pp. 1-53.
Ge Fanuc; "Pleadings: Invalidity Contentions of Defendants—Exhibit Q-543", Jul. 11, 2008, pp. 1-90.
Ge Fanuc; "Pleadings: Invalidity Contentions of Defendants—Exhibit Q-897", Jul. 11, 2008, pp. 1-110.
Ge Fanuc; "Pleadings: Invalidity Contentions of Defendants—Exhibit S-058", Jul. 11, 2008, pp. 1-26.
Ge Fanuc; "Pleadings: Invalidity Contentions of Defendants—Exhibit S-236", Jul. 11, 2008, pp. 1-17.
Ge Fanuc; "Pleadings: Invalidity Contentions of Defendants—Exhibit S-543", Jul. 11, 2008, pp. 1-29.
Ge Fanuc; "Pleadings: Invalidity Contentions of Defendants—Exhibit S-897", Jul. 11, 2008, pp. 1-38.
Ge Fanuc; "Pleadings: Invalidity Contentions of Defendants—Exhibit T-058", Jul. 11, 2008, pp. 1-43.
Ge Fanuc; "Pleadings: Invalidity Contentions of Defendants—Exhibit T-236", Jul. 11, 2008, pp. 1-31.
Ge Fanuc; "Pleadings: Invalidity Contentions of Defendants—Exhibit T-543", Jul. 11, 2008, pp. 1-48.
Ge Fanuc; "Pleadings: Invalidity Contentions of Defendants—Exhibit T-897", Jul. 11, 2008, pp. 1-80.
Ge Fanuc; "Pleadings: Invalidity Contentions of Defendants—Exhibit V-058", Jul. 11, 2008, pp. 1-43.

Ge Fanuc; "Pleadings: Invalidity Contentions of Defendants—Exhibit V-236", Jul. 11, 2008, pp. 1-37.
Ge Fanuc; "Pleadings: Invalidity Contentions of Defendants—Exhibit V-543", Jul. 11, 2008, pp. 1-47.
Ge Fanuc; "Pleadings: Invalidity Contentions of Defendants—Exhibit V-897", Jul. 11, 2008, pp. 1-91.
Ge Fanuc; "Pleadings: Invalidity Contentions of Defendants—Exhibit W-058", Jul. 11, 2008, pp. 1-93.
Ge Fanuc; "Pleadings: Invalidity Contentions of Defendants—Exhibit W-236", Jul. 11, 2008, pp. 1-68.
Ge Fanuc; "Pleadings: Invalidity Contentions of Defendants—Exhibit L-543", Jul. 11, 2008, pp. 1-39.
Ge Fanuc; "Pleadings: Invalidity Contentions of Defendants—Exhibit L-897", Jul. 11, 2008, pp. 1-66.
Ge Fanuc; "Pleadings: Invalidity Contentions of Defendants—Exhibit LL-058", Jul. 11, 2008, pp. 1-55.
Ge Fanuc; "Pleadings: Invalidity Contentions of Defendants—Exhibit LL-236", Jul. 11, 2008, pp. 1-41.
Ge Fanuc; "Pleadings: Invalidity Contentions of Defendants—Exhibit LL-543", Jul. 11, 2008, pp. 1-59.
Ge Fanuc; "Pleadings: Invalidity Contentions of Defendants—Exhibit LL-897", Jul. 11, 2008, pp. 1-98.
Ge Fanuc; "Pleadings: Invalidity Contentions of Defendants—Exhibit MM-543", Jul. 11, 2008, pp. 1-3.
Ge Fanuc; "Pleadings: Invalidity Contentions of Defendants—Exhibit NN-058", Jul. 11, 2008, pp. 1-37.
Ge Fanuc; "Pleadings: Invalidity Contentions of Defendants—Exhibit NN-236", Jul. 11, 2008, pp. 1-35.
Ge Fanuc; "Pleadings: Invalidity Contentions of Defendants—Exhibit NN-543", Jul. 11, 2008, pp. 1-33.
Ge Fanuc; "Pleadings: Invalidity Contentions of Defendants—Exhibit NN-897", Jul. 11, 2008, pp. 1-63.
Ge Fanuc; "Pleadings: Invalidity Contentions of Defendants—Exhibit O-058", Jul. 11, 2008, pp. 1-44.
Ge Fanuc; "Pleadings: Invalidity Contentions of Defendants—Exhibit O-236", Jul. 11, 2008, pp. 1-24.
Ge Fanuc; "Pleadings: Invalidity Contentions of Defendants—Exhibit O-543", Jul. 11, 2008, pp. 1-35.
Ge Fanuc; "Pleadings: Invalidity Contentions of Defendants—Exhibit O-897", Jul. 11, 2008, pp. 1-58.
Ge Fanuc; "Pleadings: Invalidity Contentions of Defendants—Exhibit OO-058", Jul. 11, 2008, pp. 1-24.
Ge Fanuc; "Pleadings: Invalidity Contentions of Defendants—Exhibit OO-543", Jul. 11, 2008, pp. 1-8.
Ge Fanuc; "Pleadings: Invalidity Contentions of Defendants—Exhibit P-058", Jul. 11, 2008, pp. 1-24.
Ge Fanuc; "Pleadings: Invalidity Contentions of Defendants—Exhibit P-236", Jul. 11, 2008, pp. 1-24.
Ge Fanuc; "Pleadings: Invalidity Contentions of Defendants—Exhibit P-543", Jul. 11, 2008, pp. 1-28.
Ge Fanuc; "Pleadings: Invalidity Contentions of Defendants—Exhibit P-897", Jul. 11, 2008, pp. 1-55.
Ge Fanuc; "Pleadings: Invalidity Contentions of Defendants—Exhibit Q-058", Jul. 11, 2008, pp. 1-83.
Ge Fanuc; "Pleadings: Invalidity Contentions of Defendants—Exhibit HH-543", Jul. 11, 2008, pp. 1-63.
Ge Fanuc; "Pleadings: Invalidity Contentions of Defendants—Exhibit HH-897", Jul. 11, 2008, pp. 1-92.
Ge Fanuc; "Pleadings: Invalidity Contentions of Defendants—Exhibit II-058", Jul. 11, 2008, pp. 1-143.
Ge Fanuc; "Pleadings: Invalidity Contentions of Defendants—Exhibit II-236", Jul. 11, 2008, pp. 1-84.
Ge Fanuc; "Pleadings: Invalidity Contentions of Defendants—Exhibit II-543", Jul. 11, 2008, pp. 1-144.
Ge Fanuc; "Pleadings: Invalidity Contentions of Defendants—Exhibit II-897", Jul. 11, 2008, pp. 1-179.
Ge Fanuc; "Pleadings: Invalidity Contentions of Defendants—Exhibit J-058", Jul. 11, 2008, pp. 1-104.
Ge Fanuc; "Pleadings: Invalidity Contentions of Defendants—Exhibit J-236", Jul. 11, 2008, pp. 1-76.
Ge Fanuc; "Pleadings: Invalidity Contentions of Defendants—Exhibit J-543", Jul. 11, 2008, pp. 1-73.
Ge Fanuc; "Pleadings: Invalidity Contentions of Defendants—Exhibit J-897", Jul. 11, 2008, pp. 1-169.
Ge Fanuc; "Pleadings: Invalidity Contentions of Defendants—Exhibit JJ-058", Jul. 11, 2008, pp. 1-80.
Ge Fanuc; "Pleadings: Invalidity Contentions of Defendants—Exhibit JJ-236", Jul. 11, 2008, pp. 1-56.
Ge Fanuc; "Pleadings: Invalidity Contentions of Defendants—Exhibit JJ-543", Jul. 11, 2008, pp. 1-65.
Ge Fanuc; "Pleadings: Invalidity Contentions of Defendants—Exhibit JJ-897", Jul. 11, 2008, pp. 1-129.
Ge Fanuc; "Pleadings: Invalidity Contentions of Defendants—Exhibit K-543", Jul. 11, 2008, pp. 1-4.
Ge Fanuc; "Pleadings: Invalidity Contentions of Defendants—Exhibit L-058", Jul. 11, 2008, pp. 1-47.
Ge Fanuc; "Pleadings: Invalidity Contentions of Defendants—Exhibit L-236", Jul. 11, 2008, pp. 1-34.
Ge Fanuc; "Pleadings: Invalidity Contentions of Defendants—Exhibit EE-058", Jul. 11, 2008, pp. 1-15.
Ge Fanuc; "Pleadings: Invalidity Contentions of Defendants—Exhibit EE-236", Jul. 11, 2008, pp. 1-13.
Ge Fanuc; "Pleadings: Invalidity Contentions of Defendants—Exhibit EE-543", Jul. 11, 2008, pp. 1-17.
Ge Fanuc; "Pleadings: Invalidity Contentions of Defendants—Exhibit EE-897", Jul. 11, 2008, pp. 1-30.
Ge Fanuc; "Pleadings: Invalidity Contentions of Defendants—Exhibit FF-058", Jul. 11, 2008, pp. 1-24.
Ge Fanuc; "Pleadings: Invalidity Contentions of Defendants—Exhibit FF-058", Jul. 11, 2008, pp. 1-24.
Ge Fanuc; "Pleadings: Invalidity Contentions of Defendants—Exhibit FF-236", Jul. 11, 2008, pp. 1-18.
Ge Fanuc; "Pleadings: Invalidity Contentions of Defendants—Exhibit FF-543", Jul. 11, 2008, pp. 1-18.
Ge Fanuc; "Pleadings: Invalidity Contentions of Defendants—Exhibit FF-897", Jul. 11, 2008, pp. 1-37.
Ge Fanuc; "Pleadings: Invalidity Contentions of Defendants—Exhibit G-058", Jul. 11, 2008, pp. 1-24.
Ge Fanuc; "Pleadings: Invalidity Contentions of Defendants—Exhibit G-236", Jul. 11, 2008, pp. 1-16.
Ge Fanuc; "Pleadings: Invalidity Contentions of Defendants—Exhibit G-543", Jul. 11, 2008, pp. 1-18.
Ge Fanuc; "Pleadings: Invalidity Contentions of Defendants—Exhibit G-897", Jul. 11, 2008, pp. 1-32.
Ge Fanuc; "Pleadings: Invalidity Contentions of Defendants—Exhibit GG-543", Jul. 11, 2008, pp. 1-14.
Ge Fanuc; "Pleadings: Invalidity Contentions of Defendants—Exhibit H-543", Jul. 11, 2008, pp. 1-5.
Ge Fanuc; "Pleadings: Invalidity Contentions of Defendants—Exhibit HH-058", Jul. 11, 2008, pp. 1-68.
Ge Fanuc; "Pleadings: Invalidity Contentions of Defendants—Exhibit HH-236", Jul. 11, 2008, pp. 1-41.
Ge Fanuc; "Pleadings: Invalidity Contentions of Defendants—Exhibit AA-897", Jul. 11, 2008, pp. 1-148.
Ge Fanuc; "Pleadings: Invalidity Contentions of Defendants—Exhibit B-058", Jul. 11, 2008, pp. 1-19.
Ge Fanuc; "Pleadings: Invalidity Contentions of Defendants—Exhibit B-236", Jul. 11, 2008, pp. 1-22.
Ge Fanuc; "Pleadings: Invalidity Contentions of Defendants—Exhibit B-543", Jul. 11, 2008, pp. 1-16.
Ge Fanuc; "Pleadings: Invalidity Contentions of Defendants—Exhibit B-897", Jul. 11, 2008, pp. 1-42.
Ge Fanuc; "Pleadings: Invalidity Contentions of Defendants—Exhibit BB-543", Jul. 11, 2008, pp. 1-18.
Ge Fanuc; "Pleadings: Invalidity Contentions of Defendants—Exhibit C-543", Jul. 11, 2008, pp. 1-11.
Ge Fanuc; "Pleadings: Invalidity Contentions of Defendants—Exhibit CC-058", Jul. 11, 2008, pp. 1-25.
Ge Fanuc; "Pleadings: Invalidity Contentions of Defendants—Exhibit CC-236", Jul. 11, 2008, pp. 1-25.
Ge Fanuc; "Pleadings: Invalidity Contentions of Defendants—Exhibit CC-543", Jul. 11, 2008, pp. 1-20.
Ge Fanuc; "Pleadings: Invalidity Contentions of Defendants—Exhibit CC-897", Jul. 11, 2008, pp. 1-57.

Ge Fanuc; "Pleadings: Invalidity Contentions of Defendants—Exhibit D-058", Jul. 11, 2008, pp. 1-24.
Ge Fanuc; "Pleadings: Invalidity Contentions of Defendants—Exhibit D-236", Jul. 11, 2008, pp. 1-22.
Ge Fanuc; "Pleadings: Invalidity Contentions of Defendants—Exhibit D-543", Jul. 11, 2008, pp. 1-26.
Ge Fanuc; "Pleadings: Invalidity Contentions of Defendants—Exhibit D-897", Jul. 11, 2008, pp. 1-49.
Ge Fanuc; "Pleadings: Invalidity Contentions of Defendants—Exhibit DD-543", Jul. 11, 2008, pp. 1-6.
Ge Fanuc; "Pleadings: Invalidity Contentions of Defendants—Exhibit E-543", Jul. 11, 2008, pp. 1-5.
Schneeman, R.; "Device Driver Development for Microsoft Windows NT: Accessing Motion Control Hardware Using a Multimedia Framework (with DEFS)", NIST, Oct. 1, 1996, DEFS 00010531-00010580.
Compumotor Division, Parker Hannifin; "Motion Toolbox User Guide", Jul. 1, 1997, DEFS 00010095-00010214.
Roy-G-Biv Corporation; "Pleadings: Plaintiff Roy-G-Biv Corp.'s Answers and Objections to Defendants First Set of Interrogatories", Feb. 28, 2008.
Ge Fanuc; "Pleadings: Objections and Responses of Defendants to Plaintiff First Set of Requests for Documents (Nos. 1-25)", Mar. 7, 2008, pp. 1-31.
Roy-G-Biv Corporation; "Pleadings: Plaintiff Roy-G-Biv Corp.'s First Supplementary Answers and Objections to Defendants' First Set of Interrogatories", Mar. 20, 2008, pp. 1-6.
Ge Fanuc; "Pleadings: Defendant's Objections and Responses to Plaintiff's Second Set of Requests for Documents (Nos. 26-94)", Mar. 24, 2008, pp. 1-60.
Roy-G-Biv Corporation; "Pleadings: Plaintiff's First Supplemental Objections and Responses of Defendant's First Set of Interrogatories (Nos. 1, 2, 8, 11, and 12)", Apr. 14, 2008, pp. 1-15.
Ge Fanuc; "Pleadings: Defendant's Second Set of Document Requests (Nos. 88-123) to Plaintiff", Apr. 18, 2008, pp. 1-16.
"Pleadings: Plaintiff's Second Supplemental Answers and Objections to Defendant's First Set of Interrogatories", Apr. 25, 2008, pp. 1-11.
Ge Fanuc; "Pleadings: Invalidity Contentions of Defendants (Redacted)", Jul. 11, 2008, pp. 1-87.
Ge Fanuc; "Pleadings: Invalidity Contentions of Defendants—Exhibit A-058", Jul. 11, 2008, pp. 1-37.
Ge Fanuc; "Pleadings: Invalidity Contentions of Defendants—Exhibit A-236", Jul. 11, 2008, pp. 1-50.
Ge Fanuc; "Pleadings: Invalidity Contentions of Defendants—Exhibit A-543", Jul. 11, 2008, pp. 1-47.
Ge Fanuc; "Pleadings: Invalidity Contentions of Defendants—Exhibit A-897", Jul. 11, 2008, pp. 1-129.
Ge Fanuc; "Pleadings: Invalidity Contentions of Defendants—Exhibit AA-058", Jul. 11, 2008, pp. 1-85.
Ge Fanuc; "Pleadings: Invalidity Contentions of Defendants—Exhibit AA-236", Jul. 11, 2008, pp. 1-74.
Ge Fanuc; "Pleadings: Invalidity Contentions of Defendants—Exhibit AA-543", Jul. 11, 2008, pp. 1-74.
USPTO; "USPTO Patent FileHist: P216039 (U.S. Appl. No. 12/244,673) File History", Feb. 11, 2010, (1005 pages).
Brown, D.; Clark, J.; "Foreign FileHist: Canadian Patent Application No. CA 2,705,404—File History", Jun. 1, 2010, CIPO, (190 pages).
EPO; "Foreign FileHist: European Patent Application No. EP04809804—Search Report", Sep. 2, 2010, (3 pages).
USPTO; "USPTO Patent FileHist: P215429 (U.S. Appl. No. 11/728,801) Notice of Allowance", Sep. 13, 2010, (31 pages).
Roy-G-Biv Corporation; "USPTO Patent FileHist: P215429 (U.S. Appl. No. 11/728,801) Amendment after Notice of Allowance", Sep. 17, 2010, (2 pages).
USPTO; "USPTO Patent FileHist: 7110.00001 (U.S. Appl. No. 12/400,098) File History—Non-Final Office Action", Sep. 28, 2010, (479 pages).
USPTO; "USPTO Patent FileHist: 7110.00004 (U.S. Appl. No. 12/390,779) File History—Non-Final Office Action", Sep. 30, 2010, (352 pages).
USPTO; "USPTO Patent FileHist: P215032 (U.S. Appl. No. 11/370,082) File History—Final Office Action", Oct. 5, 2010, (122 pages).
Brown, D.; Clark, J.; "Foreign FileHist: European Patent Application No. EP08013237—File History", Oct. 8, 2010, EPO, (198 pages).
USPTO; "USPTO Patent FileHist: P215057 (U.S. Appl. No. 11/454,053) File History—Final Office Action", Oct. 14, 2010, (127 pages).
Zadeh, L; "Fuzzy Logic, Neural Networks, and Soft Computing", Mar. 1, 1994, ACM, (8 pages) Mar. 1994 issue of Communications of the ACM/vol. 37, No. 3.
USPTO; "USPTO Patent FileHist: 7110.00001 (U.S. Appl. No. 12/400,098) File History", Feb. 11, 2010, (1075 pages).
USPTO; "USPTO Patent FileHist: 7110.00002 (U.S. Appl. No. 12/263,953) File History", Feb. 11, 2010, (1054 pages).
USPTO; "USPTO Patent FileHist: 7110.00003 (U.S. Appl. No. 12/326,565) File History", Feb. 11, 2010, (1063 pages).
USPTO; "USPTO Patent FileHist: 7110.00004 (U.S. Appl. No. 12/390,779) File History", Feb. 11, 2010, (968 pages).
USPTO; "USPTO Patent FileHist: P215057 (U.S. Appl. No. 11/454,053) File History", Feb. 11, 2010, (835 pages).
USPTO; "USPTO Patent FileHist: P216040 (U.S. Appl. No. 12/406,921) File History", Feb. 11, 2010, (539 pages).
USPTO; "USPTO Patent FileHist: P216039 (U.S. Appl. No. 12/244,673) File History: Terminal Disclaimer", Feb. 16, 2010, (13 pages).
Roy-G-Biv Corporation; "USPTO Patent FileHist: P215057 (U.S. Appl. No. 11/454,053) File History: Response to Office Action", Feb. 22, 2010, (14 pages).
JPO; "JPO FileHist: Japanese Patent Application No. JP2003513348: Office Action", Jun. 10, 2010, (7 pages) \PendingApps\P213335jp Jun. 10, 2010 Office Action and English.
Roy-G-Biv Corporation; "USPTO Patent FileHist: P216068 (U.S. Appl. No. 12/271,724)—Response to Non-Final Office Action", Aug. 27, 2010, (10 pages).
Roy-G-Biv Corporation; "USPTO Patent FileHist: 7110.00002 (U.S. Appl. No. 12/263,953) File History: Response to Non-Final Office Action", Aug. 31, 2010, (7 pages).
USPTO; "USPTO Patent FileHist: P216068 (U.S. Appl. No. 12/271,724)—Office Action", Apr. 27, 2010, (153 pages).
Roy-G-Biv Corporation; "USPTO Patent FileHist: P215032 (U.S. Appl. No. 11/370,082) File History—Response to Office Action", Jul. 16, 2010, (10 pages).
USPTO; "USPTO Patent FileHist: P215031 (U.S. Appl. No. 11/375,502) File History; Final Office Action", Jul. 21, 2010, (195 pages).
Roy-G-Biv Corporation; "USPTO Patent FileHist: P214669 (U.S. Appl. No. 10/966,848)—Amend After Notice of Allowance, Formal Drawings", Jul. 29, 2010, (19 pages).
Roy-G-Biv Corporation; "USPTO Patent FileHist: P216040 (U.S. Appl. No. 12/406,921) File History—Preliminary Amendment", Jul. 29, 2010, (21 pages).
USPTO; "USPTO Patent FileHist: P214185 (U.S. Appl. No. 10/405,883) File History; Non-Final Office Action", Aug. 5, 2010, (30 pages).
Schaffer, J.; Whitley, D.; Eshelman, L.; "Combinations of Genetic Algorithms and Neural Networks: A Survey of the State of Art", 1992, COGANN-92 Intl. Wkshp. on Comb. of Gen. Alg and Neural Networks., (40 pages).
Kunze, M.; Steffens, J.; "The Neural Network Objects", 1996, World Scientific, Proceedings of the 5th AIHENP Workshop, Lausanne.
Palade, V.; Bumbaru, S.; Negoita, G.; "A Method for Compiling Neural Networks into Fuzzy Rules Using Genetic Algorithms and Hierarchical Approach", Apr. 1, 1998, 1998 Intl. Conf on Knowledge-Based Intel. Elec. Sys., pp. 21-23.
Delgado, M.; Gomez-Skarme, A.; Marin-Blazqu, J.; Barbera, H.; "A Multiagent Architecture for Fuzzy Modeling", 1999, Int. J. Intelligent Systems, vol. 14, pp. 305-329.
Irobot; "Mobility Robot Integration Software User's Guide", 2000, 129 pages.
International Business Machines Corporation; "Neural Network Utility Family", Oct. 16, 2000, Downloaded using Internet Archive Wayback Machine.

Noel, L.; Wong, K.; Hopgood, a.; "DARBS: A Distributed Blackboard System", 2001, Springer-Verlag, Inc., Proc. ES2001, pp. 161-170.
Internet Archive Wayback Machine; "Mathematical Programming Glossary—N", Mar. 6, 2001.
Bruyninckx, H.; "OROCOS: design and implementation of a robot control software framework", Apr. 1, 2002, OROCOS.ORG, (9 pages).
Mallet, A.; Fleury, S.; Bruyninckx, H.; "A specification of generic robotics software components: future evolutions of GenoM in the Orocos context", Nov. 24, 2003, 6 pages. pdf creation date Nov. 24, 2003.
Ge Fanuc; "Pleadings: Declaration of Melvin Ray Mercer—Exhibit F", Dec. 6, 2008, pp. 1-5 (pdf pages).
Ge Fanuc; "Pleadings: Declaration of Melvin Ray Mercer—Exhibit G", Dec. 6, 2008, pp. 1-8 (pdf pages).
Roy-G-Biv Corporation; "Pleadings: Plaintiff's Motion to Dismiss Ge Fanuc Intelligenc Platforms, Inc. and General Electric Company's Infringement Claims or, Alternatively Motion to Sever", Jan. 8, 2009, pp. 1-7 (pdf pages).
Ge Fanuc; "Pleadings: Defendant's Reply in Support of Their Motion to Stay the Litigation Plending the Outcome of the Reexamination Proceedings", Jan. 12, 2009, pp. 1-8 (pdf pages).
Ge Fanuc; "Pleadings: Defendant's Reply in Support of Their Motion to Stay the Litigation Plending the Outcome of the Reexamination Proceedings—Exhibit 1", Jan. 12, 2009, pp. 1-2 (pdf pages).
Ge Fanuc; "Pleadings: Defendant's Reply in Support of Their Motion to Stay the Litigation Plending the Outcome of the Reexamination Proceedings—Exhibit 2", Jan. 12, 2009, pp. 1-2 (pdf pages).
Ge Fanuc; "Pleadings: Defendant's Reply in Support of Their Motion to Stay the Litigation Plending the Outcome of the Reexamination Proceedings—Exhibit 3", Jan. 12, 2009, pp. 1-2 (pdf pages).
US Dist Court EDTX, Marshal Div; "Order: Order Resetting Markman Date", Jan. 14, 2009, p. 1.
Roy-G-Biv Corporation; "Pleadings: Plaintiff's Opposition to Defendant's Motion to Stay the Litigation Pending the Outcome of the Reexamination Proceedings (Corrected)", Jan. 27, 2009, pp. 1-8 (pdf pages).
Roy-G-Biv Corporation; "Pleadings: Plaintiff's Second Set of Interrogatories (Nos. 17-18) for Each Defendant", Feb. 6, 2009, pp. 1-4.
Roy-G-Biv Corporation; Pleadings: Plaintiff Opening Markman Brief—Exhibit 5, Nov. 21, 2008, pp. 1-50.
Roy-G-Biv Corporation; Pleadings: Plaintiff Opening Markman Brief—Exhibit 5, Nov. 21, 2008, pp. 51-92.
Health Hero Network, Inc.; "USPTO Patent FileHist: P213698 (U.S. Appl. No. 08/944,529) File History", Oct. 7, 1997, Now Abandoned (123 pages).
Roy-G-Biv Corporation; "USPTO Patent FileHist: P210652 (U.S. Appl. No. 09/191,981) File History", Nov. 13, 1998, Now Abandoned (290 pages).
Roy-G-Biv Corporation; "USPTO Patent FileHist: P213781 (U.S. Appl. No. 09/882,800) File History", Jun. 14, 2001, Now Abandoned (132 pages).
Roy-G-Biv Corporation; "USPTO Patent FileHist: P214064 (U.S. Appl. No. 10/074,552) File History", Feb. 11, 2002, Now Abandoned (115 pages).
Roy-G-Biv Corporation; "USPTOPatent FileHist: P214119 (U.S. Appl. No. 10/150,237) File History", May 17, 2002, Now Abandoned (39 pages).
Roy-G-Biv Corporation; "USPTO Patent FileHist: P214185 (U.S. Appl. No. 10/405,883) File History", Apr. 1, 2003, Pending (1144 pages).
Roy-G-Biv Corporation; "USPTO Patent FileHist: P214321 (U.S. Appl. No. 10/409,393) File History", Apr. 7, 2003, Now Abandoned (140 pages).
Roy-G-Biv Corporation; "USPTO Patent FileHist: P214322 (U.S. Appl. No. 10/412,166) File History", Apr. 10, 2003, Now Abandoned (282 pages).
Roy-G-Biv Corporation; "USPTO Patent FileHist: P214408 (U.S. Appl. No. 10/643,533) File History", Aug. 18, 2003, Now Abandoned (311 pages).
Roy-G-Biv Corporation; "USPTO Patent FileHist: P214760 (U.S. Appl. No. 11/067,327) File History", Feb. 25, 2005, Now Abandoned (311 pages).
USPTO; "USPTO Patent FileHist: P215057 (U.S. Appl. No. 11/454,053)—Final Office Action", Nov. 23, 2010, (20 pages).
Roy-G-Biv Corporation; "USPTO Patent FileHist: 7110.00002 (U.S. Appl. No. 12/263,953)—Letter to Examiner", Nov. 24, 2010, (4 pages).
USPTO; "USPTO Patent FileHist: P216039 (U.S. Appl. No. 12/244,673) File History—Final Office Action", Nov. 29, 2010, (228 pages).
USPTO; "USPTO Patent FileHist: P216040 (U.S. Appl. No. 12/406,921) File History—Non-Final Office Action", Dec. 3, 2010, (278 pages).
Roy-G-Biv Corporation; "USPTO Patent FileHist: P214185 (U.S. Appl. No. 10/405,883) Amendment and Response to Non-Final Office Action", Dec. 6, 2010, (8 pages).
USPTO; "USPTO Patent FileHist: P215429 (U.S. Appl. No. 11/728,801)—Notice of Allowance", Dec. 14, 2010, (8 pages).
Roy-G-Biv Corporation; "USPTO Patent FileHist: P215057 (U.S. Appl. No. 11/454,053) File History—Second Request for Reconsideration After Final Rejection", Dec. 22, 2010, (4 pages).
Roy-G-Biv Corporation; "USPTO Patent FileHist: 7110.00001 (U.S. Appl. No. 12/400,098) File History—Response after Non-Final Office Action", Dec. 28, 2010, (8 pages).
Roy-G-Biv Corporation; "USPTO Patent FileHist: 7110.00004 (U.S. Appl. No. 12/390,779) File History—Response after Non-Final Office Action", Dec. 30, 2010, (9 pages).
Roy-G-Biv Corporation; "USPTO Patent FileHist: P216039 (U.S. Appl. No. 12/244,673) File History—Response after Final Office Action", Jan. 5, 2011, (4 pages).
Roy-G-Biv Corporation; "USPTO Patent FileHist: P214778 (U.S. Appl. No. 11/084,673) File History", Jun. 25, 2008, (800 pages).
Roy-G-Biv Corporation; "USPTO Patent FileHist: P214527 (U.S. Appl. No. 10/844,025) File History", Dec. 2, 2008, (1318 pages).
USPTO; "USPTO Patent FileHist: P214527 (U.S. Appl. No. 10/844,025) File History—Final Office Action", Dec. 29, 2008, (22 pages).
USPTO; "USPTO Patent FileHist: P214185 (U.S. Appl. No. 10/405,883) File History—Non-Final Office Action", Feb. 25, 2009, (65 pages).
JPO; "Foreign FileHist: Japanese Patent Application No. JP2007102796—Office Action", Nov. 12, 2009, (1 pages).
USPTO; "USPTO Patent FileHist: P216269 (U.S. Appl. No. 12/557,722) File History—Non Final Office Action", Oct. 20, 2010, (441 pages).
Roy-G-Biv Corporation; "USPTO Patent FileHist: P215429 (U.S. Appl. No. 11/728,801)—Response After Notice of Allowance", Nov. 1, 2010, (2 pages).
Roy-G-Biv Corporation; "Foreign FileHist: European Patent Application No. EP04816957—Response to Examination Report", Nov. 9, 2010, (7 pages).
USPTO; "USPTO Patent FileHist: P216068 (U.S. Appl. No. 12/271,724)—Final Office Action", Nov. 10, 2010, (269 pages).
USPTO; "USPTO Patent FileHist: P214669 (U.S. Appl. No. 10/966,848)—Issue Notification", Nov. 23, 2010, (1 page).
Michalewicz, Z.; "Genetic Algorithms plus Data Structures equals Evolution Programs", 1992, Springer-Verlag, Inc., (393 pages).
Teller, A.; "Algorithm Evolution with Internal Reinforcement for Signal Understanding", Dec. 5, 1998, (166 pages).
Plcopen; "Function blocks for motion control—Version 1.0", Nov. 23, 2001, (68 pages) Technical Specification PLCopen—Technical Committee 2—Task Force.
Fanuc Ltd, Fanuc Robotics, and Ge Fanuc; "Pleadings: Defendants and Counterclaim Plaintiffs Fourth Set of Requests for Production to Plaintiff and Counterclaim Defendant (Nos. 144 to 183)", Feb. 19, 2009, pp. 1-11.
Fanuc Ltd, Fanuc Robotics, and Ge Fanuc; "Pleadings: Objections and Responses of Defendants to Plaintiff's Second Set of Interrogatories (Nos. 17-18)—Redacted", Mar. 16, 2009, All pages.
Fanuc Ltd, Fanuc Robotics, and Ge Fanuc; "Pleadings: Defendant's Markman Claim Construction Hearing Tutorial", Apr. 15, 2009, all pages.

Roy-G-Biv Corporation; "Pleadings: Plaintiff Markman Claim Construction Tutorial", Apr. 15, 2009, all pages.
Fanuc Ltd, Fanuc Robotics, and Ge Fanuc; "Pleadings: Defendant's Markman Presentation for Claim Construction Hearing", Apr. 16, 2009, all pages.
Roy-G-Biv Corporation; "Pleadings: Plaintiff Markman Claim Construction Argument", Apr. 16, 2009, all pages.
Everingham Iv, C.; "Order: (Granted in Part) Plaintiff Motion for Proctective Order re Experts", Jun. 4, 2009, US Dist Court EDTX, Marshal Div, All pages.
Everingham Iv, C.; "Order: (Granted) Plaintiff Motion to Compel re Fanuc Witnesses", Jun. 4, 2009, US Dist Court EDTX, Marshal Div, All pages.
Fanuc Ltd, Fanuc Robotics, and Ge Fanuc; "Pleadings: Defendant's Request for Leave to File a Motion for Summary Adjudication of Non-Infringement", Jun. 15, 2009, All pages.
Fanuc Ltd, Fanuc Robotics, and Ge Fanuc; "Pleadings: Defendants Motion for Reconsideration of Order Granting Plaintiff's (Amended) Motion for Protective Order (D.E. 170)", Jun. 15, 2009, All pages.
Fanuc Ltd, Fanuc Robotics, and Ge Fanuc; "Pleadings: Defendants Third Set of Interrogatories to Plaintiff (Nos. 19-28)", Jun. 17, 2009, All pages.
Roy-G-Biv Corporation; "Pleadings: Plaintiffs Fourth Set of Interrogatories (Nos. 25-27) for Each Defendant", Jun. 19, 2009, All pages.
Fanuc Ltd, Fanuc Robotics, and Ge Fanuc; "Pleadings: Objections and Responses of Defendants to Plaintiffs Fourth Set of Interrogatories (Nos. 25-27)", Jul. 2, 2009, All pages.
Individual; "Order: (Denying) Defendants Motion for Reconsideration re Protective Order", Jul. 9, 2009, All pages.
Folsom, D.; "Order: (Granting) Motion for Continuance", Aug. 25, 2009, US Dist Court EDTX, Marshal Div, p. 1.
Folsom, D.; "Order: Claim Construction ('897, '058, '236 and '543 Patents)", Aug. 25, 2009, US Dist Court EDTX, Marshal Div, pp. 1-64.
Folsom, D.; "Order: Judgment Dismissing Action by Reason of Settlement", Oct. 19, 2009, US Dist Court EDTX, Marshal Div, pp. 1-2.
Folsom, D.; "Order: Reopen and Dismissal of Case", Nov. 20, 2009, US Dist Court EDTX, Marshal Div, p. 1.
Ge Fanuc; "Pleadings: Defendants Fanuc Ltd.'s, Fanuc Robotics America, Inc.'s, Ge Fanuc Automation Americas, Inc.'s, and Ge Fanuc Intelligent Platforms, Inc.'s First Set of Interrogatories to Plaintiff Roy-G-Biv Corporation", Jan. 25, 2008, pp. 1-10.
Ge Fanuc; "Pleadings: Defendants Fanuc Ltd.'s, Fanuc Robotics America, Inc.'s, Ge Fanuc Automation Americas, Inc.'s, and Ge Fanuc Intelligent Platforms, Inc.'s First Set of Requests for Production to Plaintiff Roy-G-Biv Corporation", Jan. 31, 2008, pp. 1-25.
Ge Fanuc; "Pleadings: Defendant's Initial Disclosures Pursuant to Federal Rule of Civil Procedure 26(a)(1)", Feb. 1, 2008, pp. 1-6.
Roy-G-Biv Corporation; "Pleadings: Plaintiff Roy-G-Biv Corporation's Initial Disclosures", Feb. 1, 2008, pp. 1-5.
Roy-G-Biv Corp, Fanuc Ltd, Fanuc Robotics, and Ge Fanuc; "Pleadings: Notice of Compliance With P.R. 4-5(d)", Jan. 9, 2009, pp. 1-3.
Roy-G-Biv Corp, Fanuc Ltd, Fanuc Robotics, and Ge Fanuc; "Pleadings: Supplemental Joint Claim Construction and Prehearing Statement—Exhibit A", Jan. 9, 2009, pp. 1-2.
Roy-G-Biv Corp, Fanuc Ltd, Fanuc Robotics, and Ge Fanuc; "Pleadings: Supplemental Joint Claim Construction and Prehearing Statement—Exhibit B", Jan. 9, 2009, pp. 1-9.
Roy-G-Biv Corp, Fanuc Ltd, Fanuc Robotics, and Ge Fanuc; "Pleadings: Supplemental Joint Claim Construction and Prehearing Statement—Exhibit C", Jan. 9, 2009, pp. 1-110.
Roy-G-Biv Corp, Fanuc Ltd, Fanuc Robotics, and Ge Fanuc; "Pleadings: Supplemental Joint Claim Construction and Prehearing Statement—Exhibit D", Jan. 9, 2009, pp. 1-80.
Roy-G-Biv Corp, Fanuc Ltd, Fanuc Robotics, and Ge Fanuc; "Pleadings: Supplemental Joint Claim Construction and Prehearing Statement", Jan. 9, 2009, pp. 1-4.
Roy-G-Biv Corporation; "Pleadings: Plaintiff Roy-G-Biv Corporation's Complaint for Patent Infringement and Demand for Jury Trial", Sep. 19, 2007, pp. 1-9.

Ge Fanuc; "Pleadings: Defendants Fanuc Ltd., Fanuc Robotics America, Inc., Ge Fanuc Automation Americas, Inc., and Ge Fanuc Intelligent Platforms, Inc.'s Answer to Plaintiff's Complaint for Patent Infringement and Counterclaims for Invalidity and Noninfringement", Nov. 15, 2007, pp. 1-12.
Ge Fanuc; "Pleadings: Motion to Dismiss", Nov. 21, 2007, 9 pages.
Roy-G-Biv Corporation; "Pleadings: Plaintiff Roy-G-Biv Corporation's Reply to Defendants' Counterclaims for Invalidity and Noninfringement", Dec. 10, 2007, pp. 1-5.
Roy-G-Biv Corporation; "Pleadings: Plaintiff Roy-G-Biv Corporation's Response to Ge Fanuc Automation Corporation's Motion to Dismiss", Dec. 13, 2007, pp. 1-54.
Ge Fanuc; "Pleadings: Defendant Ge Fanuc Automation Americas, Inc.'s Notice of Change of Corporate Name", Dec. 14, 2007, pp. 1-3.
Ge Fanuc; "Pleadings: Ge Fanuc Automation Corporation's Reply in Support of Its Motion to Dismiss for Lack of Personal Jurisdiction", Dec. 28, 2007, pp. 1-25.
Roy-G-Biv Corporation; "Pleadings: Joint Conference Report", Jan. 4, 2008, pp. 1-6.
Roy-G-Biv Corporation; "Pleadings: Roy-G-Biv Corporation's First Set of Interrogatories (Nos. 1-16) for Each Defendant", Jan. 18, 2008, pp. 1-16.
Roy-G-Biv Corporation; "Pleadings: Roy-G-Biv Corporation's First Set of Requests to Defendants for Document, Electronically Stored Information, and Things", Jan. 18, 2008, pp. 1-19.
USPTO; "ReEx: U.S. Patent No. 5,691,897 Ex-Partes Reexamination (Control No. 90/009,282)—Ex Parte Reexamination Certificate (7971st)", Jan. 11, 2011, 9 pages.
USPTO; "ReEx: U.S. Patent No. 6,513,058 Reexamination (Control No. 95/000,398)—Right of Appeal Notice", Jan. 26, 2011, (10 pages).
USPTO; "ReEx: U.S. Patent No. 6,516,236 Reexamination (Control No. 95/000,396)—Right of Appeal Notice", Jan. 26, 2011, (10 pages).
USPTO; "ReEx: U.S. Patent No. 6,941,543 Reexamination (Control No. 95/000,397)—Right of Appeal Notice", Jan. 26, 2011, (13 pages).
Roy-G-Biv Corporation; "ReEx: U.S. Patent No. 5,691,897 Reexamination (Control No. 90/009,282)—Certificate of Correction Filing", Feb. 24, 2011, (9 pages).
Roy-G-Biv Corporation; "ReEx: U.S. Patent No. 6,941,543 Reexamination (Control No. 95/000,397)—Notice of Appeal", Feb. 24, 2011, (4 pages).
USPTO; "ReEx: U.S. Patent No. 6,513,058 Reexamination (Control No. 95/000,398)—Notice of Intent to Issue Inter Partes ReExamination Certificate", Mar. 28, 2011, (5 pages).
USPTO; "ReEx: U.S. Patent No. 6,516,236 Reexamination (Control No. 95/000,396)—Notice of Intent to Issue Inter Partes ReExamination Certificate", Mar. 28, 2011, (5 pages).
EPO; "Foreign FileHist: European Patent Application No. EP08013237—Examination Report", Apr. 5, 2011, (5 pages).
USPTO; "USPTO Patent FileHist: P215032 (U.S. Appl. No. 11/370,082) File History—Non-Final Office Action", Apr. 11, 2011, (34 pages).
Roy-G-Biv Corporation; "USPTO Patent FileHist: P215032 (U.S. Appl. No. 11/370,082) File History—Request for Continued Examination", Mar. 7, 2011, (9 pages).
CIPO; "Foreign FileHist: Canadian Patent Application No. CA 2,625,283—Notice of Reinstatement", Mar. 8, 2011, 1 page.
USPTO; "USPTO Patent FileHist: P215429 (U.S. Appl. No. 11/728,801) Issue Notification", Mar. 8, 2011, (1 page).
Roy-G-Biv Corporation; "USPTO Patent FileHist: P215057 (U.S. Appl. No. 11/454,053) File History—Petition for Extension of Time", Mar. 14, 2011, (2 pages).
USPTO; "USPTO Patent FileHist: 7110.00001 (U.S. Appl. No. 12/400,098) File History—Final Office Action", Mar. 17, 2011, (37 pages).
Roy-G-Biv Corporation; "USPTO Patent FileHist: P216269 (U.S. Appl. No. 12/557,722) File History—Response to Non Final Office Action", Mar. 21, 2011, (8 pages).
USPTO; "USPTO Patent FileHist: 7110.00004 (U.S. Appl. No. 12/390,779) File History—Final Office Action", Mar. 22, 2011, (41 pages).

Brown, D.; Stein, S.; "USPTO Patent FileHist: P216556 (U.S. Appl. No. 12/896,750) File History—Published Application US 2011/0071652", Mar. 24, 2011, USPTO, (33 pages).
Brown, D.; Clark, J.; "Foreign FileHist: European Patent Publication No. EP2302475", Mar. 30, 2011, EPO, (149 pages).
Roy-G-Biv Corporation; "USPTO Patent FileHist: P216040 (U.S. Appl. No. 12/406,921) File History—Response to Non-Final Office Action", Apr. 4, 2011, (3 pages).
USPTO "USPTO Patent FileHist: P214185 (U.S. Appl. No. 10/405,883) File History—Final Office Action", Dec. 28, 2009, (77 pages).
EPO; "Foreign FileHist: European Patent Application No. EP04809804—Examination Report", Dec. 15, 2010, (5 pages).
USPTO; "USPTO Patent FileHist: P215057 (U.S. Appl. No. 11/454,053) File History—Advisory Action after Final Office Action", Jan. 13, 2011, (3 pages).
USPTO; "USPTO Patent FileHist: P216039 (U.S. Appl. No. 12/244,673) File History—Advisory Action after Final Office Action", Jan. 13, 2011, (2 pages).
Roy-G-Biv Corporation; "USPTO Patent FileHist: P215057 (U.S. Appl. No. 11/454,053) File History—Second Request for Reconsideration After Final Rejection", Feb. 4, 2011, (3 pages).
Roy-G-Biv Corporation; "USPTO Patent FileHist: P216039 (U.S. Appl. No. 12/244,673) File History—Second Request for Reconsideration after Final Office Action", Feb. 4, 2011, (3 pages).
USPTO; "USPTO Patent FileHist: P214185 (U.S. Appl. No. 10/405,883) File History—Final Office Action", Feb. 10, 2011, (28 pages).
Roy-G-Biv Corporation; "Canadian Patent FileHist: Canadian Patent Application No. 2,625,283 Petition for Reinstatement", Feb. 16, 2011, (7 pages).
USPTO; "USPTO Patent FileHist: P216039 (Ussn: 12/244,673) File History—Final Office Action", Feb. 25, 2011, (17 pages).
USPTO; "USPTO Patent FileHist: P215057 (U.S. Appl. No. 11/454,053) File History—Final Office Action", Mar. 1, 2011, (21 pages).
Black, Lowe and Graham; "ReEx: U.S. Patent No. 6,513,058 Reexamination (Control No. 95/000,398)—Response after PTO's Notice Dated Feb. 4, 2010", Feb. 19, 2010, (52 pages).
Black, Lowe and Graham; "ReEx: U.S. Patent No. 6,941,543 Reexamination (Control No. 95/000,397)—Response after PTO's Notice Dated Feb. 4, 2010", Feb. 19, 2010, (59 pages).
Roy-G-Biv Corporation; "ReEx: RGRX_06 Exhibit Index", Feb. 24, 2010, (7 pages).
Black, Lowe and Graham; "ReEx: U.S. Patent No. 5,691,897 Ex-Partes Reexamination (Control No. 901009,282)—Response after Final Office Action", Mar. 12, 2010, 43 pages.
Black, Lowe and Graham; "ReEx: U.S. Patent No. 6,516,236 Reexamination (Control No. 95/000,396)—Response after PTO's Notice Dated Feb. 4, 2010", Mar. 19, 2010, (56 pages).
Individual; "ReEx: U.S. Patent No. 6,513,058 Reexamination (Control No. 95/000,398)—Third Party Certificate of Service", Jun. 11, 2009, all pages.
Individual; "ReEx: U.S. Patent No. 6,516,236 Reexamination (Control No. 95/000,396)—Third Party Certificate of Service", Jun. 11, 2009, all pages.
Individual; "ReEx: U.S. Patent No. 6,513,058 Reexamination (Control No. 95/000,398)—Petition and Request for Return of 3rd Party Req. Comments Without Consideration", Jun. 12, 2009, all pages.
Black, Lowe and Graham; "ReEx: U.S. Patent No. 6,516,236 Reexamination (Control No. 95/000,396)—Petition and Request of 3rd Party Req. Comments Without Consideration", Jun. 12, 2009, all pages.
Armstrong Teasdale LLP; "ReEx: U.S. Patent No. 6,941,543 Reexamination (Control No. 95/000,397)—Third Party Request", Sep. 23, 2009, all pages.
USPTO; "ReEx: U.S. Patent No. 5,691,897 Reexamination (Control No. 90/009,282)—Final Office Action", Jan. 13, 2010, all pages.
USPTO; "ReEx: U.S. Patent No. 6,516,236 Reexamination (Control No. 95/000,396)—Non-Final Office Action #2", Feb. 4, 2010, all pages.
USPTO; "ReEx: U.S. Patent No. 6,941,543 Reexamination (Control No. 95/000,397)—Non-Final Office Action #2", Feb. 4, 2010, all pages.
USPTO; "ReEx: U.S. Patent No. 6,513,058 Reexamination (Control No. 95/000,398)—Non-Final Office Action #2", Feb. 8, 2010, all pages.
Black, Lowe and Graham; "ReEx: U.S. Patent No. 6,516,236 Reexamination (Control No. 95/000,396)—Response after Non-Final Office Action", Feb. 16, 2010, all pages.
USPTO; "ReEx: U.S. Patent No. 5,691,897 Reexamination (Control No. 90/009,282)—Returned Postcards", May 6, 2009, all pages.
Armstrong Teasdale LLP; "ReEx: U.S. Patent No. 6,516,236 Reexamination (Control No. 95/000,396)—Third Party Requester Comments after Non-Final Office Action", May 22, 2009, all pages.
Individual; "ReEx: U.S. Patent No. 6,516,236 Reexamination (Control No. 95/000,396)—Third Party Requester Comments after Non-Final Office Action: Exhibits A-1 thru A-47", May 22, 2009, all pages.
Individual; "ReEx: U.S. Patent No. 6,516,236 Reexamination (Control No. 95/000,396)—Third Party Requester Comments after Non-Final Office Action: Exhibits B thru Q", May 22, 2009, all pages. See transcript—Contains multiple refs_with varying pub. dates. Exh Q not provided by requestor.
Individual; "ReEx: U.S. Patent No. 6,513,058 Reexamination (Control No. 95/000,398)—Third Party Certificate of Mailing", May 28, 2009, all pages.
Armstrong Teasdale LLP; "ReEx: U.S. Patent No. 6,513,058 Reexamination (Control No. 951000,398)—Third Party Requester Comments after Non-Final Office Action", May 28, 2009, all pages.
Individual; "ReEx: U.S. Patent No. 6,513,058 Reexamination (Control No. 95/000,398)—Third Party Requester Comments after Non-Final Office Action: Exhibits A-1 thru A-55", May 28, 2009, all pages.
Individual; "ReEx: U.S. Patent No. 6,513,058 Reexamination (Control No. 95/000,398)—Third Party Requester Comments after Non-Final Office Action: Exhibits B thru S", May 28, 2009, all pages.
Armstrong Teasdale LLP; "ReEx: U.S. Patent No. 6,941,543 Reexamination (Control No. 95/000,397)—Third Party Requester Comments after Non-Final Office Action", May 29, 2009, all pages.
Individual; "ReEx: U.S. Patent No. 6,941,543 Reexamination (Control No. 95/000,397)—Third Party Requester Comments after Non-Final Office Action: Exhibits T thru V", May 29, 2009, all pages.
Petzold, C.; "ReEx: U.S. Patent No. 6,941,543 Reexamination (Control No. 95/000,397)—Response Declaration: Petzold", Apr. 29, 2009, (declaration-12 pages) and (supporting Exhibit A-B, where Exhibit B includes sub-exhibits A-G—78 pages).
Richter, J.; "ReEx: U.S. Patent No. 6,941,543 Reexamination (Control No. 951000,397)—Response Declaration: Richter", Apr. 29, 2009, (declaration—27 pages) and (supporting Exhibits A-B where Exhibit B includes sub-exhibits A-G—80 pages).
Stone, M.; "ReEx: U.S. Patent No. 6,941,543 Reexamination (Control No. 951000,397)—Response Declaration: Stone", Apr. 29, 2009, (declaration—13 pages) and (supporting Exhibit A—4 pages).
USPTO; "ReEx: U.S. Patent No. 6,941,543 Reexamination (Control No. 95/000,397)—Returned Postcards", Apr. 29, 2009, all pages.
Black, Lowe and Graham; "ReEx: U.S. Patent No. 6,941,543 Reexamination (Control No. 95/000,397)—Transmittal Letter", Apr. 29, 2009, all pages.
Black, Lowe and Graham; "ReEx: U.S. Patent No. 5,691,897 Reexamination (Control No. 90/009,282)—Certificate of Service", May 1, 2009, all pages.
Black, Lowe and Graham; "ReEx: U.S. Patent No. 5,691,897 Reexamination (Control No. 90/009,282)—Fee Transmittal", May 1, 2009, all pages.
Black, Lowe and Graham; "ReEx: U.S. Patent No. 5,691,897 Reexamination (Control No. 90/009,282)—Information Disclosure Statement", May 1, 2009, all pages.
Black, Lowe and Graham; "ReEx: U.S. Patent No. 5,691,897 Reexamination (Control No. 90/009,282)—Response after Non-Final Office Action", May 1, 2009, all pages.
Black, Lowe and Graham; "ReEx: U.S. Patent No. 5,691,897 Reexamination (Control No. 90/009,282)—Transmittal Letter", May 1, 2009, all pages.

Black, Lowe and Graham; "ReEx: U.S. Patent No. 6,941,543 Reexamination (Control No. 95/000,397)—Certificate of Service", Apr. 29, 2009, all pages.

Black, Lowe and Graham; "ReEx: U.S. Patent No. 6,941,543 Reexamination (Control No. 95/000,397)—Fee Transmittal", Apr. 29, 2009, all pages.

Black, Lowe and Graham; "ReEx: U.S. Patent No. 6,941,543 Reexamination (Control No. 95/000,397)—Response after Non-Final Office Action", Apr. 29, 2009, all pages.

Ard, J.; "ReEx: U.S. Patent No. 6,941,543 Reexamination (Control No. 95/000,397)—Response Declaration: Ard", Apr. 29, 2009, (declaration—8 pages) and (supporting Exhibits A-BB—237 pages). See supporting Exhibit CC listed in "RGRX_06 Exhibit Index".

Chouinard, D.; "ReEx: U.S. Patent No. 6,941,543 Reexamination (Control No. 95/000,397)—Response Declaration: Chouinard", Apr. 29, 2009, (declaration—8 pages) and (supporting Exhibit A—4 pages).

Levy, A.; "ReEx: U.S. Patent No. 6,941,543 Reexamination (Control No. 95/000,397)—Response Declaration: Levy", Apr. 29, 2009, (declaration—9 pages) and (supporting Exhibits A-C—7 pages).

Malina, R.; "ReEx: U.S. Patent No. 6,941,543 Reexamination (Control No. 95/000,397)—Response Declaration: Malina", Apr. 29, 2009, (declaration—34 pages) and (supporting Exhibits A-F—19 pages).

Mathias, R.; "ReEx: U.S. Patent No. 6,941,543 Reexamination (Control No. 95/000,397)—Response Declaration: Mathias", Apr. 29, 2009, (declaration—73 pages). See supporting Exhibits AA1-AA3, Y1-Y25, and Z1-Z10—listed in "RGRX_06 Exhibit Index".

McConnell, S.; "ReEx: U.S. Patent No. 6,941,543 Reexamination (Control No. 95/000,397)—Response Declaration: McConnell", Apr. 29, 2009, (12 pages).

Omoigui, N.; "ReEx: U.S. Patent No. 6,941,543 Reexamination (Control No. 95/000,397)—Response Declaration: Omoigui", Apr. 29, 2009, (22 pages) and (supporting Exhibit C—8 pages). See supporting Exhibits A-B—listed in "RGRX_06 Exhibit Index".

Mathias, R.; "ReEx: U.S. Patent No. 6,513,058 Reexamination (Control No. 95/000,398)—Response Declaration: Mathias", Apr. 28, 2009, See supporting Exhibits AA1-AA3, Y1-Y25, and Z1-Z10—listed in "RGRX_06 Exhibit Index".

McConnell, S.; "ReEx: U.S. Patent No. 6,513,058 Reexamination (Control No. 95/000,398)—Response Declaration: McConnell", Apr. 28, 2009, (12 pages).

Omoigui, N.; "ReEx: U.S. Patent No. 6,513,058 Reexamination (Control No. 95/000,398)—Response Declaration: Omoigui", Apr. 28, 2009, (declaration—22 pages). See supporting Exhibits A-B—listed in "RGRX_06 Exhibit Index".

Petzold, C.; "ReEx: U.S. Patent No. 6,513,058 Reexamination (Control No. 95/000,398)—Response Declaration: Petzold", Apr. 28, 2009, (declaration—11 pages) and (supporting Exhibit A-B, where Exhibit B includes sub-exhibits A-G—78 pages).

Richter, J.; "ReEx: U.S. Patent No. 6,513,058 Reexamination (Control No. 95/000,398)—Response Declaration: Richter", Apr. 28, 2009, (declaration—27 pages) and (supporting Exhibits A-B where Exhibit B includes sub-exhibits A-G—80 pages).

Stone, M.; "ReEx: U.S. Patent No. 6,513,058 Reexamination (Control No. 95/000,398)—Response Declaration: Stone", Apr. 28, 2009, (declaration—13 pages) and (supporting Exhibit A—4 pages).

USPTO; "ReEx: U.S. Patent No. 6,513,058 Reexamination (Control No. 95/000,398)—Returned Postcards", Apr. 28, 2009, all pages.

Black, Lowe and Graham; "ReEx: U.S. Patent No. 6,513,058 Reexamination (Control No. 95/000,398)—Transmittal Letter", Apr. 28, 2009, all pages.

Black, Lowe and Graham; "ReEx: U.S. Patent No. 6,941,543 Reexamination (Control No. 95/000,397)—Information Disclosure Statement", Apr. 28, 2009, all pages.

Black, Lowe and Graham; "ReEx: U.S. Patent No. 6,513,058 Reexamination (Control No. 95/000,398)—Response after Non-Final Office Action", Apr. 29, 2009, all pages.

Richter, J.; "ReEx: U.S. Patent No. 6,516,236 Reexamination (Control No. 951000,396)—Response Declaration: Richter", Apr. 23, 2009, (declaration—27 pages) and (supporting Exhibits A-B where Exhibit B includes sub-exhibits A-G—80 pages).

Stone, M.; "ReEx: U.S. Patent No. 6,516,236 Reexamination (Control No. 951000,396)—Response Declaration: Stone", Apr. 23, 2009, (declaration—13 pages) and (supporting Exhibit A—4 pages).

Black, Lowe and Graham; "ReEx: U.S. Patent No. 6,516,236 Reexamination (Control No. 95/000,396)—Transmittal Letter", Apr. 23, 2009, all pages.

Black, Lowe and Graham; "ReEx: U.S. Patent No. 6,513,058 Reexamination (Control No. 95/000,398)—Certificate of Service", Apr. 28, 2009, all pages.

Black, Lowe and Graham; "ReEx: U.S. Patent No. 6,513,058 Reexamination (Control No. 95/000,398)—Fee Transmittal", Apr. 28, 2009, all pages.

Black, Lowe and Graham; "ReEx: U.S. Patent No. 6,513,058 Reexamination (Control No. 95/000,398)—Information Disclosure Statement", Apr. 28, 2009, all pages.

Ard, J.; "ReEx: U.S. Patent No. 6,513,058 Reexamination (Control No. 95/000,398)—Response Declaration: Ard", Apr. 28, 2009, (declaration—8 pages) and (supporting Exhibits A-BB—237 pages). See supporting Exhibit CC listed in "RCRX_06 Exhibit Index".

Chouinard, D.; "ReEx: U.S. Patent No. 6,513,058 Reexamination (Control No. 95/000,398)—Response Declaration: Chouinard", Apr. 28, 2009, (declaration—8 pages) and (supporting Exhibit A—4 pages).

Levy, A.; "ReEx: U.S. Patent No. 6,513,058 Reexamination (Control No. 95/000,398)—Response Declaration: Levy", Apr. 28, 2009, (declaration—9 pages) and (supporting Exhibits A-C—7 pages).

Malina, R.; "ReEx: U.S. Patent No. 6,513,058 Reexamination (Control No. 95/000,398)—Response Declaration: Malina", Apr. 28, 2009, (declaration—34 pages) and (supporting Exhibits A-F—19 pages).

Black, Lowe and Graham; "ReEx: U.S. Patent No. 6,516,236 Reexamination (Control No. 95/000,396)—Fee Transmittal", Apr. 23, 2009, all pages.

Black, Lowe and Graham; "ReEx: U.S. Patent No. 6,516,236 Reexamination (Control No. 95/000,396)—Information disclosure Statement", Apr. 23, 2009, all pages.

Ard, J.; "ReEx: U.S. Patent No. 6,516,236 Reexamination (Control No. 95/000,396)—Response Declaration: Ard", Apr. 23, 2009, (declaration—8 pages) and (supporting Exhibits A-BB—237 pages). See supporting Exhibit CC listed in "RGRX_06 Exhibit Index".

Chouinard, D.; "ReEx: U.S. Patent No. 6,516,236 Reexamination (Control No. 95/000,396)—Response Declaration: Chouinard", Apr. 23, 2009, (declaration—8 pages) and (supporting Exhibit A—4 pages).

Levy, A.; "ReEx: U.S. Patent No. 6,516,236 Reexamination (Control No. 95/000,396)—Response Declaration: Levy", Apr. 23, 2009, (declaration—9 pages) and (supporting Exhibits A-C—7 pages).

Malina, R.; "ReEx: U.S. Patent No. 6,516,236 Reexamination (Control No. 95/000,396)—Response Declaration: Malina", Apr. 23, 2009, (declaration—34 pages) and (supporting Exhibits A-F—19 pages).

Mathias, R.; "ReEx: U.S. Patent No. 6,516,236 Reexamination (Control No. 95/000,396)—Response Declaration: Mathias", Apr. 23, 2009, (declaration—74 pages). See supporting Exhibits AA1-AA3, Y1-Y25, and Z1-Z10—listed in "RGRX_06 Exhibit Index".

McConnell, S.; "ReEx: U.S. Patent No. 6,516,236 Reexamination (Control No. 95/000,396)—Response Declaration: McConnell", Apr. 23, 2009, (12 pages).

Omoigui, N.; "ReEx: U.S. Patent No. 6,516,236 Reexamination (Control No. 95/000,396)—Response Declaration: Omoigui", Apr. 23, 2009, (declaration—22 pages) and (supporting Exhibit C—8 pages). See supporting Exhibits A-B—listed in "RGRX_06 Exhibit Index".

Petzold, C.; "ReEx: U.S. Patent No. 6,516,236 Reexamination (Control No. 95/000,396)—Response Declaration: Petzold", Apr. 23, 2009, (declaration—12 pages) and (supporting Exhibit A-B, where Exhibit B includes sub-exhibits A-G—78 pages).

Chouinard, D.; "ReEx: U.S. Patent No. 5,691,897 Reexamination (Control No. 90/009,282)—Response Declaration: Chouinard", Apr. 23, 2009, (declaration—8 pages) and (supporting Exhibit A—4 pages).

Levy, A.; "ReEx: U.S. Patent No. 5,691,897 Reexamination (Control No. 90/009,282)—Response Declaration: Levy", Apr. 23, 2009, (declaration—9 pages) and (supporting Exhibits A-C—7 pages).

Malina, R.; "ReEx: U.S. Patent No. 5,691,897 Reexamination (Control No. 90/009,282)—Response Declaration: Mathias", Apr. 23, 2009, (declaration—34 pages) and (supporting Exhibits A-F—19 pages).

Mathias, R.; "ReEx: U.S. Patent No. 5,691,897 Reexamination (Control No. 90/009,282)—Response Declaration: Mathias", Apr. 23, 2009, (declaration—73 pages). See supporting Exhibits AA1-AA3, Y1-Y25, and Z1-Z10—listed in "RGRX_06 Exhibit Index".

McConnell, S.; "ReEx: U.S. Patent No. 5,691,897 Reexamination (Control No. 90/009,282)—Response Declaration: McConnell", Apr. 23, 2009, (12 pages).

Omoigui, N.; "ReEx: U.S. Patent No. 5,691,897 Reexamination (Control No. 90/009,282)—Response Declaration: Omoigui", Apr. 23, 2009, (declaration—22 pages) and (supporting Exhibit C—8 pages). See supporting Exhibits A-B—listed in "RGRX_06 Exhibit Index".

Petzold, C.; "ReEx: U.S. Patent No. 5,691,897 Reexamination (Control No. 90/009,282)—Response Declaration: Petzold", Apr. 23, 2009, (declaration—12 pages) and (supporting Exhibit A-B, where Exhibit B includes sub-exhibit A-G—78 pages).

Richter, J.; "ReEx: U.S. Patent No. 5,691,897 Reexamination (Control No. 90/009,282)—Response Declaration: Richter", Apr. 23, 2009, (declaration—27 pages) and (supporting Exhibits A-B where Exhibit B includes sub-exhibits A-G—80 pages).

Stone, M.; "ReEx: U.S. Patent No. 5,691,897 Reexamination (Control No. 90/009,282)—Response Declaration: Stone", Apr. 23, 2009, (declaration—13 pages) and (supporting Exhibit A—4 pages).

Black, Lowe and Graham; "ReEx: U.S. Patent No. 6,516,236 Reexamination (Control No. 95/000,396)—Certificate of Service", Apr. 23, 2009, all pages.

USPTO; "ReEx: U.S. Patent No. 6,941,543 Inter-Partes Reexamination (Control No. 95/000,397)—Granted", Nov. 25, 2008, all pages.

USPTO; "ReEx: U.S. Patent No. 6,516,236 Reexamination (Control No. 95/000,396)—Non-Final Office Action", Jan. 23, 2009, all pages.

USPTO; "ReEx: U.S. Patent No. 6,513,058 Reexamination (Control No. 95/000,398)—Non-Final Office Action", Jan. 29, 2009, all pages.

USPTO; "ReEx: U.S. Patent No. 6,941,543 Reexamination (Control No. 95/000,397)—Non-Final Office Action", Jan. 29, 2009, all pages.

USPTO; "ReEx: U.S. Patent No. 5,691,897 Reexamination (Control No. 90/009,282)—Non-Final Office Action", Feb. 4, 2009, all pages.

USPTO; "ReEx: U.S. Patent No. 5,691,897 Reexamination (Control No. 90/009,282)—Decision for Petition for Extension of Time", Feb. 12, 2009, all pages.

Black, Lowe and Graham; "ReEx: U.S. Patent No. 6,941,543 Reexamination (Control No. 95/000,397)—Decision on Petition Extension for Time", Feb. 12, 2009, all pages.

Black, Lowe and Graham; "ReEx: U.S. Patent No. 6,516,236 Reexamination (Control No. 95/000,396)—Decision for Petition for Extension of Time", Feb. 13, 2009, all pages.

USPTO; "ReEx: U.S. Patent No. 6,513,058 Reexamination (Control No. 95/000,398)—Decision for Petition for Extension of Time", Feb. 17, 2009, all pages.

Ard, J.; "ReEx: U.S. Patent No. 5,691,897 Reexamination (Control No. 90/009,282)—Response Declaration: Ard", Apr. 23, 2009, Black, Lowe and Graham, (declaration—8 pages) and (supporting Exhibits A-BB—237 pages). See supporting Exhibit CC listed in "RGRX_06 Exhibit Index".

National Electrical Manufacturers Association; "ReEx: Malina Exhibit B—Excerpts from NEMA Motion Control Handbook", Nov. 1, 1992, all pages.

Armstrong Teasdale LLP; "ReEx: U.S. Patent No. 5,691,897 Reexamination (Control No. 90/009,282)—Third Party Request", Sep. 23, 2008, all pages.

Armstrong Teasdale LLP; "ReEx: U.S. Patent No. 6,513,058 Reexamination (Control No. 95/000,398)—Third Party Request", Sep. 23, 2008, all pages.

Armstrong Teasdale LLP; "ReEx: U.S. Patent No. 6,516,236 Reexamination (Control No. 95/000,396)—Third Party Request", Sep. 23, 2008, all pages.

USPTO; "ReEx: U.S. Patent No. 5,691,897 Reexamination (Control No. 90/009,282)—Notice of Assignment of Request", Sep. 26, 2008, pp. 1-2.

USPTO; "ReEx: U.S. Patent No. 6,516,236 Reexamination (Control No. 95/000,396)—Notice of Assignment of Request", Oct. 2, 2008, all pages.

USPTO; "ReEx: U.S. Patent No. 6,513,058 Reexamination (Control No. 95/000,398)—Notice of Assignment of Request", Oct. 6, 2008, all pages.

USPTO; "ReEx: U.S. Patent No. 5,691,897 Ex-Partes Reexamination (Control No. 90/009,282)—Granted", Nov. 10, 2008, all pages.

USPTO; "ReEx: U.S. Patent No. 6,516,236 Inter-Partes Reexamination (Control No. 95/000,396)—Granted", Nov. 20, 2008, all pages.

USPTO; "ReEx: U.S. Patent No. 6,513,058 Inter-Partes Reexamination (Control No. 95/000,398)—Granted", Nov. 25, 2008, all pages.

ROY-G-BIV Corporation; "USPTO Patent FileHist: P215062 (U.S. Appl. No. 11/368,231) File History", Mar. 3, 2006, Now Abandoned (113 pages).

ROY-G-BIV Corporation; "USPTO Patent FileHist: P215032 (U.S. Appl. No. 11/370,082) File History", Mar. 6, 2006, Pending (1226 pages).

ROY-G-BIV Corporation; "USPTO Patent FileHist: P215031 (U.S. Appl. No. 11/375,502) File History", Mar. 13, 2006, Pending (1306 pages).

ROY-G-BIV Corporation; "USPTO Patent FileHist: P215322 (U.S. Appl. No. 11/583,233) File History", Oct. 18, 2006, Now Abandoned (664 pages).

ROY-G-BIV Corporation; "USPTO Patent FileHist: P215429 (U.S. Appl. No. 11/728,801) File History", Mar. 26, 2007, Pending (1338 pages).

ROY-G-BIV Corporation; "USPTO Patent FileHist: P216068 (U.S. Appl. No. 12/271,724) File History", Nov. 14, 2008, Pending (361 pages).

ROY-G-BIV Corporation; "USPTO Patent FileHist: P216258 (U.S. Appl. No. 12/546,566) File History", Aug. 24, 2009, Pending (646 pages).

USPTO; "USPTO Patent FileHist: P215032 (U.S. Appl. No. 11/370,082) File History—Office Action", Mar. 16, 2010, pp. 1-88.

USPTO; "ReEx: U.S. Patent No. 5,691,897 Reexamination (Control No. 90/009,282)—All Rejections Withdrawn", Oct. 4, 2010, (6 pages).

ROY-G-BIV Corporation; "USPTO Patent FileHist: P215057 (U.S. Appl. No. 11/454,053) File History—Request for Reconsideration After Final Rejection", Oct. 26, 2010, (4 pages).

USPTO; "ReEx: U.S. Patent No. 6,513,058 Reexamination (Control No. 95/000,398)—Action Closing Prosecution", Sep. 22, 2010, (144 pages).

USPTO; "ReEx: U.S. Patent No. 6,516,236 Reexamination (Control No. 95/000,396)—Action Closing Prosecution", Sep. 22, 2010, (147 pages).

USPTO; "ReEx: U.S. Patent No. 6,941,543 Reexamination (Control No. 95/000,397)—Action Closing Prosecution", Sep. 22, 2010, (141 pages).

ROY-G-BIV Corporation; "ReEx: U.S. Patent No. 6,513,058 Reexamination (Control No. 95/000,398)—Petition Requesting Termination of Reexamination Proceedings", Sep. 28, 2010, (34 pages).

ROY-G-BIV Corporation; "ReEx: U.S. Patent No. 6,516,236 Reexamination (Control No. 95/000,396)—Petition Requesting Termination of Reexamination Proceedings", Sep. 28, 2010, (34 pages).

ROY-G-BIV Corporation; "ReEx: U.S. Patent No. 6,941,543 Reexamination (Control No. 95/000,397)—Petition Requesting Termination of Reexamination Proceedings", Sep. 28, 2010, (34 pages).

ROY-G-BIV Corporation; "ReEx: U.S. Patent No. 6,516,236 Reexamination (Control No. 95/000,396)—Patent Owner's Comments in Response to the Action Closing Prosecution", Oct. 8, 2010, (40 pages).

ROY-G-BIV Corporation; "ReEx: U.S. Patent No. 6,513,058 Reexamination (Control No. 95/000,398)—Patent Owner's Comments in Response to the Action Closing Prosecution", Oct. 12, 2010, (38 pages).

ROY-G-BIV Corporation; "ReEx: U.S. Patent No. 6,941,543 Reexamination (Control No. 95/000,397)—Patent Owner's Comments in Response to the Action Closing Prosecution", Oct. 13, 2010, (43 pages).
Ge Fanuc; "Pleadings: Declaration of Christina M. Finn—Exhibit B", Dec. 6, 2008, pp. 1-2 (pdf pages).
Ge Fanuc; "Pleadings: Declaration of Christina M. Finn—Exhibit C", Dec. 6, 2008, pp. 1-2 (pdf pages).
Ge Fanuc; "Pleadings: Declaration of Christina M. Finn—Exhibit D", Dec. 6, 2008, pp. 1-2 (pdf pages).
Ge Fanuc; "Pleadings: Declaration of Christina M. Finn—Exhibit E", Dec. 6, 2008, pp. 1-17 (pdf pages).
Ge Fanuc; "Pleadings: Declaration of Christina M. Finn—Exhibit F", Dec. 6, 2008, pp. 1-2 (pdf pages).
Ge Fanuc; "Pleadings: Declaration of Christina M. Finn—Exhibit G", Dec. 6, 2008, pp. 1-2 (pdf pages).
Ge Fanuc; "Pleadings: Declaration of Christina M. Finn—Exhibit H", Dec. 6, 2008, pp. 1-2 (pdf pages).
Ge Fanuc; "Pleadings: Declaration of Christina M. Finn—Exhibit I", Dec. 6, 2008, pp. 1-8 (pdf pages).
Ge Fanuc; "Pleadings: Declaration of Christina M. Finn—Exhibit J", Dec. 6, 2008, pp. 1-9 (pdf pages).
Ge Fanuc; "Pleadings: Declaration of Christina M. Finn—Exhibit K", Dec. 6, 2008, pp. 1-8 (pdf pages).
Ge Fanuc; "Pleadings: Declaration of Christina M. Finn—Exhibit L", Dec. 6, 2008, pp. 1-5 (pdf pages).
Ge Fanuc; "Pleadings: Declaration of Melvin Ray Mercer", Dec. 6, 2008, pp. 1-34 (pdf pages).
Ge Fanuc; "Pleadings: Declaration of Melvin Ray Mercer—Exhibit A", Dec. 6, 2008, pp. 1-22 (pdf pages).
Ge Fanuc; "Pleadings: Declaration of Melvin Ray Mercer—Exhibit B", Dec. 6, 2008, pp. 1-2 (pdf pages).
Ge Fanuc; "Pleadings: Declaration of Melvin Ray Mercer—Exhibit C", Dec. 6, 2008, pp. 1-2 (pdf pages).
Ge Fanuc; "Pleadings: Declaration of Melvin Ray Mercer—Exhibit D", Dec. 6, 2008, pp. 1-2 (pdf pages).
Ge Fanuc; "Pleadings: Declaration of Melvin Ray Mercer—Exhibit E", Dec. 6, 2008, pp. 1-2 (pdf pages).
ROY-G-BIV Corporation; "Pleadings: Plaintiff Opening Markman Brief—Exhibit 7", Nov. 21, 2008, p. 1.
ROY-G-BIV Corporation; "Pleadings: Plaintiff Opening Markman Brief—Exhibit 8", Nov. 21, 2008, pp. 1-10 (pdf pages).
ROY-G-BIV Corporation; "Pleadings: Plaintiff Opening Markman Brief—Exhibit 9", Nov. 21, 2008, pp. 1-3 (pdf pages).
ROY-G-BIV Corporation and Ge Fanuc; "Pleadings: Supplemental Joint Claim Construction and Prehearing Statement of Plaintiff and Defendant", Nov. 21, 2008, pp. 1-4.
ROY-G-BIV Corporation and Ge Fanuc; "Pleadings: Supplemental Joint Claim Construction and Prehearing Statement of Plaintiff and Defendant—Exhibit B", Nov. 21, 2008, pp. 1-13 (pdf pages).
ROY-G-BIV Corporation and Ge Fanuc; "Pleadings: Supplemental Joint Claim Construction and Prehearing Statement of Plaintiff and Defendant—Exhibit A", Nov. 21, 2008, pp. 1-2 (pdf pages).
ROY-G-BIV Corporation; "Pleadings: Plaintiff's Answer to Defendant's Second Amended Answer and Counterclaims", Dec. 5, 2008, pp. 1-15 (pdf pages).
ROY-G-BIV Corporation; "Pleadings: Plaintiff's Motion to Dismiss Ge Fanuc Intelligent Platforms, Inc. and General Electric Company's Infringement Claims or, Alternatively, Motion to Sever—and Proposed Order", Dec. 5, 2008, pp. 1-11 (pdf pages).
Ge Fanuc; "Pleadings: Claim Construction Brief of Defendants", Dec. 6, 2008, pp. 1-46 (pdf pages).
Ge Fanuc; "Pleadings: Claim Construction Brief of Defendants—Exhibit A", Dec. 6, 2008, pp. 1-2 (pdf pages).
Ge Fanuc; "Pleadings: Claim Construction Brief of Defendants—Exhibit B", Dec. 6, 2008, pp. 1-2 (pdf pages).
Ge Fanuc; "Pleadings: Claim Construction Brief of Defendants—Exhibit C", Dec. 6, 2008, pp. 1-2 (pdf pages).
Ge Fanuc; "Pleadings: Claim Construction Brief of Defendants—Exhibit D", Dec. 6, 2008, pp. 1-2 (pdf pages).
Ge Fanuc; "Pleadings: Declaration of Christina M. Finn", Dec. 6, 2008, pp. 1-6 (pdf pages).
Ge Fanuc; "Pleadings: Declaration of Christina M. Finn—Exhibit A", Dec. 6, 2008, pp. 1-13 (pdf pages).
ROY-G-BIV Corporation; "Pleadings: Plaintiff Opening Markman Brief—Exhibit 2", Nov. 21, 2008, pp. 1-64 (pdf pages).
ROY-G-BIV Corporation; "Pleadings: Plaintiff Opening Markman Brief—Exhibit 2", Nov. 21, 2008, pp. 65-130 (pdf pages).
ROY-G-BIV Corporation; "Pleadings: Plaintiff Opening Markman Brief—Exhibit 3", Nov. 21, 2008, pp. 1-40 (pdf pages).
ROY-G-BIV Corporation; "Pleadings: Plaintiff Opening Markman Brief—Exhibit 3", Nov. 21, 2008, pp. 41-81 (pdf pages).
ROY-G-BIV Corporation; "Pleadings: Plaintiff Opening Markman Brief—Exhibit 4", Nov. 21, 2008, pp. 1-50 (pdf pages).
ROY-G-BIV Corporation; "Pleadings: Plaintiff Opening Markman Brief—Exhibit 4", Nov. 21, 2008, pp. 51-99 (pdf pages).
ROY-G-BIV Corporation; "Pleadings: Plaintiff Opening Markman Brief—Exhibit 6", Nov. 21, 2008, pp. 1-50.
ROY-G-BIV Corporation; "Pleadings: Plaintiff Opening Markman Brief—Exhibit 6", Nov. 21, 2008, pp. 51-94.
ROY-G-BIV Corporation and Ge Fanuc; "Pleadings: Supplemental Joint Claim Construction and Prehearing Statement of Plaintiff and Defendant—Exhibit C", Nov. 21, 2008, pp. 1-64 (pdf pages).
ROY-G-BIV Corporation and Ge Fanuc; "Pleadings: Supplemental Joint Claim Construction and Prehearing Statement of Plaintiff and Defendant—Exhibit C", Nov. 21, 2008, pp. 65-131 (pdf pages).
ROY-G-BIV Corporation and Ge Fanuc; "Pleadings: Supplemental Joint Claim Construction and Prehearing Statement of Plaintiff and Defendant—Exhibit D", Nov. 21, 2008, pp. 1-50 (pdf pages).
ROY-G-BIV Corporation and Ge Fanuc; "Pleadings: Supplemental Joint Claim Construction and Prehearing Statement of Plaintiff and Defendant—Exhibit D", Nov. 21, 2008, pp. 51-98 (pdf pages).
ROY-G-BIV Corporation; "Pleadings: Plaintiff Opening Markman Brief—Exhibit 1", Nov. 21, 2008, pp. 1-12 (pdf pages).
ROY-G-BIV Corporation; "Pleadings: Plaintiff Opening Markman Brief—Exhibit 10", Nov. 21, 2008, pp. 1-21 (pdf pages).
ROY-G-BIV Corporation; "Pleadings: Plaintiff Opening Markman Brief—Exhibit 11", Nov. 21, 2008, pp. 1-20 (pdf pages).
ROY-G-BIV Corporation; "Pleadings: Plaintiff Opening Markman Brief—Exhibit 12", Nov. 21, 2008, pp. 1-11 (pdf pages).
ROY-G-BIV Corporation; "Pleadings: Plaintiff Opening Markman Brief—Exhibit 13", Nov. 21, 2008, pp. 1-11 (pdf pages).
ROY-G-BIV Corporation; "Pleadings: Plaintiff Opening Markman Brief—Exhibit 14", Nov. 21, 2008, pp. 1-6 (pdf pages).
ROY-G-BIV Corporation; "Pleadings: Plaintiff Opening Markman Brief—Exhibit 15", Nov. 21, 2008, pp. 1-4 (pdf pages).
ROY-G-BIV Corporation; "Pleadings: Plaintiff Opening Markman Brief—Exhibit 16", Nov. 21, 2008, pp. 1-19 (pdf pages).
ROY-G-BIV Corporation; "Pleadings: Plaintiff Opening Markman Brief—Exhibit 17", Nov. 21, 2008, pp. 1-3 (pdf pages).
ROY-G-BIV Corporation; "Pleadings: Plaintiff Opening Markman Brief—Exhibit 18", Nov. 21, 2008, pp. 1-11 (pdf pages).
ROY-G-BIV Corporation; "Pleadings: Plaintiff Opening Markman Brief—Exhibit 19", Nov. 21, 2008, pp. 1-8 (pdf pages).
ROY-G-BIV Corporation; "Pleadings: Plaintiff Opening Markman Brief—Exhibit 20", Nov. 21, 2008, pp. 1-3 (pdf pages).
ROY-G-BIV Corporation; "Pleadings: Plaintiff Opening Markman Brief—Exhibit 21", Nov. 21, 2008, pp. 1-2 (pdf pages).
Ge Fanuc; "Pleadings: Defendants Proposed Terms and Claim Elements for Construction Pursuant to Patent Rule 4-1", Jul. 25, 2008, pp. 1-16 (pdf pages).
ROY-G-BIV Corporation; "Pleadings: Plaintiff Proposed Terms and Claim Elements for Construction", Jul. 25, 2008, pp. 1-4 (pdf pages).
ROY-G-BIV Corporation; "Pleadings: Plaintiff Identification of Ten Asserted Claims", Aug. 8, 2008, pp. 1-3.
Ge Fanuc; "Pleadings: Defendants Claim Constructions and Preliminary Identification of Extrinsic Evidence Pursuant to Patent Rule 4-2", Oct. 3, 2008, pp. 1-13 (pdf pages).
ROY-G-BIV Corporation; "Pleadings: Plaintiff Proposed Claim Constructions and Extrinsic Evidence", Oct. 3, 2008, pp. 1-22 (pdf pages).
Ge Fanuc; "Pleadings: Defendant's Preliminary Constructions for Three Terms Identified by Plaintiff", Oct. 16, 2008, pp. 1-2.
Ge Fanuc; "Pleadings: Defendant's Second Set of Interrogatories to Plaintiff", Oct. 17, 2008, pp. 1-9 (pdf pages).

Ge Fanuc; "Pleadings: Defendants Preliminary Claim Constructions and Preliminary Identification of Extrinsic Evidence Pursuant to Patent Rule 4-2", Oct. 17, 2008, pp. 1-29 (pdf pages).
ROY-G-BIV Corporation; "Pleadings: Plaintiff's Proposed Constructions and Extrinsic Evidence for Terms Identified in Defendant's Letter Dated October 7, 2008", Oct. 17, 2008, pp. 1-9.
ROY-G-BIV Corporation and Ge Fanuc; "Pleadings: Joint Claim Construction and Prehearing Statement of Plaintiff and Defendant", Oct. 24, 2008, pp. 1-5 (pdf pages).
ROY-G-BIV Corporation and Ge Fanuc; "Pleadings: Joint Claim Construction and Prehearing Statement of Plaintiff and Defendant—Exhibit A", Oct. 24, 2008, pp. 1-2 (pdf pages).
ROY-G-BIV Corporation and Ge Fanuc; "Pleadings: Joint Claim Construction and Prehearing Statement of Plaintiff and Defendant—Exhibit B", Oct. 24, 2008, pp. 1-19.
ROY-G-BIV Corporation and Ge Fanuc; "Pleadings: Joint Claim Construction and Prehearing Statement of Plaintiff and Defendant—Exhibit C", Oct. 24, 2008, pp. 1-64.
ROY-G-BIV Corporation and Ge Fanuc; "Pleadings: Joint Claim Construction and Prehearing Statement of Plaintiff and Defendant—Exhibit C", Oct. 24, 2008, pp. 65-133.
ROY-G-BIV Corporation and Ge Fanuc; "Pleadings: Joint Claim Construction and Prehearing Statement of Plaintiff and Defendant—Exhibit D", Oct. 24, 2008, pp. 1-22.
Ge Fanuc; "Pleadings: Sixth Supplemental Objections and Responses of Defendants to Plaintiff's First Set of Interrogatories (Nos. 3-5)", Nov. 12, 2008, pp. 1-11 (pdf pages).
ROY-G-BIV Corporation; "Pleadings: Plaintiff's Answers and Objections to Defendant's Second Set of Interrogatories", Nov. 20, 2008, pp. 1-9 (pdf pages).
ROY-G-BIV Corporation; "Pleadings: Plaintiff Opening Markman Brief", Nov. 21, 2008, pp. 1-43 (pdf pages).
Sercos Interface, Inc., "Sercos Interface: Digital Interface for Communications Between Controls and Drives for Numerically Controlled Machines", 1991, pp. 1-366.
Charles Petzoid, "Programming Windows: The Microsoft Guide to Writing Applications for Windows 3—Second Edition", 1990, pp. 1-95 (Chapters 1 and 2), Microsoft Press.
Charles Petzoid, "Programming Windows: The Microsoft Guide to Writing Applications for Windows 3—Second Edition", 1990, pp. 96-180 (Chapters 3 and 4), Microsoft Press.
Charles Petzoid, "Programming Windows: The Microsoft Guide to Writing Applications for Windows 3—Second Edition", 1990, pp. 181-268 (Chapters 5 and 6), Microsoft Press.
Charles Petzoid, "Programming Windows: The Microsoft Guide to Writing Applications for Windows 3—Second Edition", 1990, pp. 269-341 (Chapters 7 and 8), Microsoft Press.
Charles Petzoid, "Programming Windows: The Microsoft Guide to Writing Applications for Windows 3—Second Edition", 1990, pp. 342-408 (Chapter 9), Microsoft Press.
Charles Petzoid, "Programming Windows: The Microsoft Guide to Writing Applications for Windows 3—Second Edition", 1990, pp. 409-496 (Chapter 10), Microsoft Press.
Charles Petzoid, "Programming Windows: The Microsoft Guide to Writing Applications for Windows 3—Second Edition", 1990, pp. 497-609 (Chapters 11 and 12), Microsoft Press.
Charles Petzoid, "Programming Windows: The Microsoft Guide to Writing Applications for Windows 3—Second Edition", 1990, pp. 610-718 (Chapters 13 and 14), Microsoft Press.
Charles Petzoid, "Programming Windows: The Microsoft Guide to Writing Applications for Windows 3—Second Edition", 1990, pp. 719-777 (Chapters 15), Microsoft Press.
Charles Petzoid, "Programming Windows: The Microsoft Guide to Writing Applications for Windows 3—Second Edition", 1990, pp. 778-877 (Chapters, 16, 17, and 18), Microsoft Press.
Charles Petzoid, "Programming Windows: The Microsoft Guide to Writing Applications for Windows 3—Second Edition", 1990, pp. 878-952 (Chapter 19 and Index), Microsoft Press.
Paul Wright et al., "Mosaic: An Open-Architecture Machine Tool for Precision Manufacturing", 1993, pp. 1-10.
Steven Ashley, "A Mosaic for Machine Tools", Mechanical Engineering CIME, 1990, pp. 1-6.

Adrian King, "Inside Windows 95", 1994, pp. 1-129 (Chapters 1, 2, and 3), Microsoft Press.
Adrian King, "Inside Windows 95", 1994, pp. 129-247 (Chapters 4 and 5), Microsoft Press.
Adrian King, "Inside Windows 95", 1994, pp. 248-505 (Chapters 6-10), Microsoft Press.
Bruel & Kjaer, "Bruel & Kjaer Product Brochure: A System to Build Systems", 1991, pp. 1-64.
Bruel & Kjaer, "Major Challenges in Test Systems for the 1990's", 1991, pp. 1-22.
Bruel & Kjaer, "Modular Test System: A Second Generation VXI Architecture", date unknown, pp. 1-23.
VME Bus Extensions for Instrumentation, "System Specification VXI-1, Draft 1.4", 1991, pp. 1-24.
Bruel & Kjaer, "Short Form Catalog 1991", 1991, pp. 1-68.
Bruel & Kjaer, "Modular Test System Software Presentation", date unknown, pp. 1-36.
Ability Systems Corporation, "Development in Motion", 1990, p. 1.
Ability Systems Corporation, "Indexer LPT Version 5", 1989, pp. 1-214.
Furness, Harry, "New Family of 'NT' Process Software Set to Move in", Control Engineering, Apr. 1993, 2 pages.
Agrusa, Russell L., "Is Windows NT the PCT Platform for the Future?", Control Engineering, Apr. 1993, 3 pages.
Faber, Tom, "From Distributed Control to Integrated Information", Control Engineering, Mid-Mar. 1992, 3 pages, published by Cahners Publishing Company.
Daniel A. Norton, "Writing Windows Device Drivers", 1992, pp. 1-202, Addison-Wesley Publishing Company, Inc.
Daniel A. Norton, "Writing Windows Device Drivers", 1992, pp. 202-436, Addison-Wesley Publishing Company, Inc.
Microsoft Corporation, "Win32 Programmer's Reference: vol. I—Windows Management and Graphics Device Interface", 1993, pp. 1-428, Microsoft Press.
Microsoft Corporation, "Win32 Programmer's Reference: vol. I—Windows Management and Graphics Device Interface", 1993, pp. 429-876, Microsoft Press.
Microsoft Corporation, "Windows NT Device Driver Kit: Win32 Subsystem Driver Design Guide", 1993, pp. 1-80, Microsoft Corporation.
Microsoft Corporation, "Windows NT Device Driver Kit: Network Drivers", 1993, pp. 1-12, Microsoft Corporation.
Microsoft Corporation, "Windows NT Device Driver Kit: Win32 Subsystem Driver Reference", 1993, pp. 1-11, Microsoft Corporation.
Microsoft Corporation, "Windows NT Device Driver Kit: Programming Guide", 1993, pp. 1-11, Microsoft Corporation.
Microsoft Corporation, "Windows NT Device Driver Kit: Kernel-Mode Driver Design Guide", 1993, pp. 1-7. Microsoft Corporation.
Microsoft Corporation, "Windows NT Device Driver Kit: Kernel-Mode Driver Reference", 1993, pp. 1-5. Microsoft Corporation.
Martin Marietta, "Next Generation Workstation/Machine Controller (NGC): vol. VI—Sensor/Effector Standardized Application (SESA)", 1992, pp. 1-38.
Martin Marietta, "Next Generation WorkstationlMachine Controller (NGC): vol. V—Controls Standardized Application (CSA)", 1992, pp. 1-95.
Martin Marietta, "Next Generation WorkstationlMachine Controller (NGC): vol. IV—Workstation Planning Standardized Application (WPSA)", 1992, pp. 1-120.
Martin Marietta, "Next Generation WorkstationlMachine Controller (NGC): vol. III—Workstation Management Standardized Application (WMSA)", 1992, pp. 1-85.
Martin Marietta, "Next Generation WorkstationlMachine Controller (NGC): vol. II—NGC Data", 1992, pp. 1-309.
Martin Marietta, "Next Generation WorkstationlMachine Controller (NGC): vol. I—Specification for an Open System Architecture Standard (SOSAS)", 1992, pp. 1-259.
Steven K. Sorensen, "An Off-line Approach to Task Level State Driven Robot Programming", 1989, pp. 1-229.
Fanuc Robotics North America, Inc.; "Pontiac Truck and Bus PAINTworks II Manual", 1994, DEFS 00055734-00055920.

Fanuc Ltd.; "Fanuc MMC-IV Operator's Manual", Mar. 1, 1994, DEFS 00053795-00054125.
Ge Fanuc Automation; "MMC-IV Descriptions Manual", Mar. 1, 1994, DEFS 00054457-00054479.
Ge Fanuc Automation; "MMC-IV Operator's Manual", Mar. 1, 1994, DEFS 00054126-00054456.
Wonderware; "Extensibility Toolkit for InTouch", Jul. 1, 1994, DEFS 00016606-00016955.
Ge Fanuc Automation; "MMC-IV Connection and Maintenance Manual", Dec. 1, 1994, DEFS 00054480-00054537.
Hibbard, S.; "Open Drive Interfaces for Advanced Machining Concepts", Indramat Division, Rexroth Corporation, 1995, DEFS 00051134-00051151.
Mitchell, D.; "Ole Based Real-Time Device Interface", USDATA, Mar. 24, 1995, DEFS 00007882-00007908.
Schofield, S.; "Open Architecture Controllers for Advanced Machine Tools", Dec. 12, 1995, DEFS 00030394-00030590.
"Osaca Open System Architecture for Controls within Automation Systems Final Report", Feb. 21, 1996, DEFS 00009106-00009173.
Compumotor Division, Parker Hannifin; "Compumotor Motion Builder Start-Up Guide and Tutorial", Oct. 1, 1996, DEFS 00009960-00010053.
Hewlett Packard Company; "The HP-GL/2 and HP RTL Reference Guide", 1993, DEFS 00031028-00031418.
Pritschow, G., Daniel, C., Junghans, G., Sperling, W.; "Open System Controllers: A Challenge for the Future of the Machine Tool Industry (with DEFS)", Jan. 15, 1993, RGB00076341-RGB00076344, Annals of the CIRP, pp. 449-452, vol. 42.
Microsoft Corporation; "WOSA Backgrounder: Delivering Enterprise Services to the Windows-based Desktop (with DEFS)", Jul. 1, 1993, RGB00078542-RGB00078560, Backgrounders and Whitepapers: Operating Systems Extensions—MSDN Archive Edition, pp. 1-19.
National Instruments; "LabVIEW for Windows User Manual", Aug. 1, 1993, DEFS 00031588-00032047.
National Instruments; "LabVIEW Networking Reference Manual", Aug. 1, 1993, DEFS 00032048-00032154.
Wonderware; "Wonderware NetDDE for Windows Users Guide", Nov. 1, 1993, DEFS 00017524-00017663.
Ace Technical Sales; "Third Party I/O Driver List", Dec. 7, 1993, DEFS 00055557-00055565.
Wonderware; "InTouch Getting Started Reference", 1994, DEFS 00016956-00017007.
Wonderware; "InTouch User's Guide", 1994, DEFS 00017008-00017523.
Proctor, F., Damazo, B., Yang, C., Frechette, S.; "Open Architectures for Machine Control (with DEFS)", Nist, 1994, DEFS 00010471-00010487.
Tele-Denken Resources, Inc.; "VIEWpoint Product Documentation", May 18, 1992, DEFS 00014912-00015830.
Sercos Interface; "Digital Interface for Communication between Controls and Drives in Numerically Controlled Machines", Jul. 1, 1992, DEFS 00041190-00041207.
Hewlett Packard Company; "PCL 5 Printer Language Technical Reference Manual—Part 1", Oct. 1, 1992, HP 0001-0369.
Shaw, L., Bidstrup, E., Wu, Z.; "United States Pat. 5,604,843 (with DEFS)", USPTO, Dec. 23, 1992, RGB00061667- RGB00061713.
Smith, M.; "CNC Machining Technology—vol. III Part Programming Techniques", Springer-Verlag, Inc., 1993, DEFS 00010649-00010723.
Intellution, Inc.; "FIX DMACS Recipe Manual", 1993, DEFS 00035624-00035793.
Ability Systems; "HPGL Controller Design Reference", 1993, DEFS 00043010-00043052.
Intellution, Inc.; "I/O Driver Manual Eurotherm 800 Series", 1993, DEFS 00036515-00036600.
Fanuc Robotics America, Inc; "KFLOPPY-DOS PS-100/200 Floppy Disk Drive Emulator—Version 3.07P", 1993, DEFS 00058306-00058404.
Fanuc Robotics North America, Inc., "Robot Controller Terminal Emulator Manual (Version 3.0)", 1993, DEFS 00058405-00058428.
Cahners Publishing Company; "The First Open Architecture, Multitasking Machine Controller Plus Computer", 1993, DEFS 00045272-00045237, Article in Jan. 1993 issue of Control Engineering.
Intellution, Inc.; "I/O Driver Manual Allen-Bradley KT/KT2", 1991, DEFS 00020252-00020340.
IEC/TC; "Electrical Equipment of Industrial Machines—Serial Data Link for Real-time Communications Between Controls and Drives", Nov. 22, 1991, DEFS 00039926-00040070.
Intellution, Inc.; "FIXDMACS Product Documentation", 1992, DEFS 00018984-00019624.
Intellution, Inc.; "I/O Driver Manual I/O Driver Toolkit", 1992, DEFS 00020348-00020516.
Intellution, Inc.; "I/O Driver Manual I/O Driver Toolkit (Duplicate with different DEFS)", 1992, DEFS 00035971-00036139.
Ge Fanuc Automation; "MMC-II Application Reference Manual", 1992, DEFS 00054848-00055222.
Ge Fanuc Automation; "MMC-II Programming Manual", 1992, DEFS 00054538-00054847.
Fanuc Ltd.; "Fanuc MMC-II Product Literature", Aug. 1, 1989, DEFS 00055223-00055228.
Reeker, L., Wright, P., Greenfeld, I., Hansen, F., Fehlinger, J., Pavlakos, L.; "Investigation and Design of Open System Controllers for Machine Tools", Defense Advanced Research Projects Agency, Nov. 1, 1989, DEFS 00030700-00030946.
Fanuc Ltd.; "Fanuc MMC-II Programming Manual", 1990, DEFS 00055273-00055555.
Microsoft Corporation; "Microsoft Windows Software Development Kit Reference—vol. 2", 1990, DEFS 00050303-00050674.
Denardo, P., Lapage, S., Staniulis, E.; "Network Communications with DAE 1.0", IBM Corporation, Mar. 6, 1990, DEFS 00002923-00002935.
Aerotech, Inc.; "UNIDEX 31 Integrated Machine Controller Software Manual", Jun. 29, 1990, Aerotech 001-357.
Compumotor Division, Parker Hannifin; "Compumotor 6000 Series Software Reference Guide", 1991, RGBINSP00001703-RGBINSP00001970.
Loffredo, D.; "STEP-NC Mapping Notes", Sep. 26, 2001, STEP Tools, Inc., pp. 1-21.
Hoske, M.; "Connect the plant floor to supply chain", Oct. 1, 2001, Cahners Publishing Company, pp. 1-7, Oct. 2001 issue of Control Engineering.
Hardwick, D.; "STEP-NC Frequently Asked Questions", Oct. 1, 2001, pp. 1-10.
Bengtsson, K.; "Industry Interest—Design, Engineering Simulation", Nov. 1, 2001, EPM Technology, pp. 1-24, NorduGrid Workshop.
Microsoft Corporation; "Categorizing by Component Capabilities", Nov. 1, 2001, Platform SDK: COM.
Michaloski, J.; "STEP-NC Architecture Overview", Nov. 28, 2001, NIST, pp. 1-2, document creation date: Nov. 28, 2001.
Roy-G-Biv Corporation; "Roy-G-Biv Teams With OKUMA to Help Lean Manufacturing Vision Become Reality", Dec. 1, 2001, pp. 1-2.
Roy-G-Biv Corporation; "XMC Powers Robotic Welding Application for Future NASA Space Shuttles", Dec. 1, 2001, pp. 1-2.
Delta Tau Data Systems, Inc.; "PMAC Quick Reference Guide", Dec. 10, 2001, pp. 1-79.
Downie, B.; Hardwick, D.; "3D Data for Pipe Bending and Cutting Machines", 2002, STEP Tools, Inc., pp. 1-12.
Ge Fanuc; "Cimplicity HMI for CNC—Operation Manual", Jun. 1, 2001, 260 pages.
Nell, J.; "ISO 10303: STEP on a Page—#3", Jun. 7, 2001, p. 1.
Loffler, M.; Dawson, D.; Zergeroglu, E.; Costescu, N.; "Object-Oriented Techniques in Robot Manipulator Control Software Development", Jun. 25, 2001, Proceedings of the American Control Conference, pp. 4520-4525.
ISO—International Standards Organization; "ISO/FDIS 14649-10: Industrial automation systems and integration—Physical device control—Data model for Computerized Numerical Controls—Part 10: General Process Data: Draft", Aug. 29, 2001, pp. 1-172.
ISO—International Standards Organization; "ISO/FDIS 14649-11: Industrial automation systems and integration—Process device control—Data model for Computerized Numerical Controllers—Part 11: Process Data for Milling: Draft", Aug. 29, 2001, pp. 1-76.
ISO—International Standards Organization; "ISO/FDIS 14649-111: Industrial automation systems and integration—Physical device control—Data model for Computerized Numerical Controllers—Part 111: Tools for Milling: Draft", Aug. 29, 2001, pp. 1-27.
Ryou, O.; Jerard, R.; "FACILE: A Clean Interface for Design and Fabrication of Mechanical Parts", Sep. 1, 2001, University of New Hampshire, Mechanical Engineering Department, pp. 1-85.
Michaloski, J.; "OMAC HMI Data Type Overview using W3C XML and STEP", Sep. 18, 2001, OMAC HMI Working Group, pp. 1-11, document created on Sep. 18, 2001.
National Electronic Manufacturing Initiative, Inc.; "NEMA Members Letter: Industry Input on Data Exchange Convergence", Sep. 21, 2001, pp. 1-6.
Stark, J.; "2PDM e-zine Web Article (www.johnstark.com)", Sep. 24, 2001, pp. 1-10, vol. 4, No. 3.
Popular Mechanics; "United Internet Technologies Transforms Toy Industry With Intelligent Creative Interactive Technology", Mar. 1, 2001.
Slansky, D.; Spada, S.; "OMAC Embraces the Internet to Enable Machine Tool Collaboration", Mar. 7, 2001, ARC Advisory Group, pp. 1-4.
Acroloop Motion Control Systems, Inc.; "Acroloop—Perfection in Motion Catalog", Mar. 29, 2001, pp. 3-54, document created on Mar. 29, 2001.
AB Journal; "AB Journal New and Noteworthy", Apr. 1, 2001, pp. 1-5.
ISO—International Standards Organization; "ISO 13584-1: Industrial automation systems and integration—Parts library—Part 1: Overview and fundamental principles: Apr. 15, 2001", pp. 1-26.
CAN in Automation (CIA); "CANopen Cabling and Connector Pin Assignment", Apr. 20, 2001, pp. 1-22.
Compumotor Division, Parker Hannifin; "CompuCAM Computer Aided Motion", May 6, 2001, pp. 1-27.
Kanehiro, F.; Inaba, M.; Inoue, H.; Hirukawa, H.; Hirai, S.; "Developmental Software Environment that is applicable to Small-size Humanoids and Life-sized Humanoids", May 21, 2001, IEEE, pp. 4084-4089.
Lutz, P.; "OSACA Proposal of an XML Model for OSACA", May 23, 2001, OSACA Association, pp. 1-13.
CAN in Automation (CIA); "CANopen Indicator Specification", Jun. 1, 2001, pp. 1-7, Draft Recommendation 303-3.
Weyrich, M.; Rommel, B.; Haasis, S.; Mueller, P.; "First Prototype of a NC Controller based on STEP-NC", Oct. 4, 2000, pp. 1-11, document creation date Oct. 4, 2000.
Individual; "ISO 4343: Industrial Automation Systems—Numerical control of machines—NC processor output—Post processor commands: Second Edition", Oct. 15, 2000, all pages.
ISO—International Standards Organization; "ISO/PDTS 10303-28: XML representation of Express schemas and data", Oct. 16, 2000, all pages.
ISO—International Standards Organization; "Proposal of New Process Data Model based on AP213", Oct. 16, 2000, all pages.
ISO—International Standards Organization; "ISO 10303-41: Industrial automation systems and integration—Product data representation and exchange—Part 41: Integrated generic resource: Fundamentals of product description and support: Second Edition", Nov. 1, 2000, all pages.
Ge Fanuc; "CIMPLICITY Integrator's Toolkit—Application Developer's Guide", Dec, 1, 2000, pp. 1-1 to 48-12.
Penton Media, Inc.; "When data transfer goes awry", Dec. 7, 2000, all pages, Dec. 7, 2000 issue of Machine Design (www.machinedesign.com).
NACSA, J.; "Comparison of Three Different Open Architecture Controllers", 2001.
Evolution Robotics, Inc.; "ERSP 3.0—Getting Started Guide", 2001.
Evolution Robotics, Inc.; "ERSP 3.0—Robotic Development Platform", 2001, pp. 1-1134.
Step Tools, Inc.; "Introduction to STEP-NC: The STEP-NC Backbone: Executables", 2001, pp. 1-20.
Step Tools, Inc.; "Introduction to STEP-NC: The STEP-NC Backbone: Workpiece and Features", 2001, pp. 1-37.
Step Tools, Inc.; "Introduction to STEP-NC What is STEP-NC and What Does it Cover?", 2001, pp. 1-31.
Jara; "Outline of ORiN (Open Robot Interface for the Network)", 2001.
Terakado, Y.; "Standardization Group—Step Group", 2001, ECOM Journal, pp. 1-5, Published in ECOM Journal, No. 3 (believed published in 2001 or later—article describes events occurring in 2001).
Loffredo, D.; "STEP-NC: E-Manufacturing Using STEP Presentation", 2001, STEP Tools, Inc., pp. 1-22.
Shah, H.; "Packaging Industry Encourages Broad Adoption of Motion Control Technology", Jan. 4, 2001, ARC Advisory Group, pp. 1-4.
Techno-Isel; "Techno-isel CAD/CAM and CNC Brochure", Feb. 11, 2001, pp. 8-9.
OSACA Association; "OSACA Handbook, Version 2.0", Feb. 16, 2001, pp. 1-440 (all pages).
Radack, G.; "WG3 Presentation to SC4 Opening Plenary—T24—Step-Manufacturing Presentation", Feb. 19, 2001, ISO—International Standards Organization, pp. 1-2.
Evolution Robotics, Inc.; "ERSP 3.0—Tutorials", 2001.
Evolution Robotics, Inc.; "ERSP 3.0—User's Guide", 2001.
Step Tools, Inc.; "Introduction to STEP-NC: Advanced Control Flow for NC Workplans", 2001, pp. 1-14.
Step Tools, Inc.; "Introduction to STEP-NC: AP-238 and the STEP Integrated Resources", 2001, pp. 1-19.
Step Tools, Inc.; "Introduction to STEP-NC: Cutting Tools for Milling", 2001, pp. 1-12.
Step Tools, Inc.; "Introduction to STEP-NC: Explicit Toolpaths", 2001, pp. 1-11.
Step Tools, Inc.; "Introduction to STEP-NC: In-Process Features", 2001, pp. 1-12.
Step Tools, Inc.; "Introduction to STEP-NC: Milling Operations", 2001, pp. 1-18.
Step Tools, Inc.; "Introduction to STEP-NC: Project and Setups", 2001, pp. 1-12.
Step Tools, Inc.; "Introduction to STEP-NC: Stock", 2001, pp. 1-3.
Manufacturing Science and Technology Center (MSTC); "MSTC/JOP-1202: Specifications of the OpenMES Framework, Version 1.0 (Draft alpha 2)", Sep. 1, 2000, pp. 1-72.
Ge, S.; Lee, T.; Woon, L.; "A One-Stop Solution in Robotic Control System Design", Sep. 1, 2000, IEEE, Robotics and Automation Magazine, pp. 42-55.
Erol, N.; Altintas, Y.; Ito, M.; "Open System Architecture Modular Tool Kit for Motion and Machine Processing Control", Sep. 1, 2000, IEEE, pp. 281-291, vol. 5, No. 3.
Brown, K.; "SOAP for Platform Neutral Interoperability", Sep. 1, 2000, 16 pages.
Spada, S.; "Roy-G-Biv Tames the Motion Control Tiger", Sep. 6, 2000, ARC Advisory Group, pp. 1-4.
Red, E.; "Introduction to Robotics", Sep. 8, 2000, BYU Mechanical Engineering Department, pp. 1-30, document created on Sep. 8, 2000.
ISO—International Standards Organization; "ISO 3592: Industrial automation systems—Numerical control of machines—NC processor output—File structure and language format, Second Edition", Sep. 15, 2000, all pages.
ISO—International Standards Organization; "CEB Binding—Draft 3.0", Sep. 29, 2000, pp. 1-45.
Deltheil, C.; Didier, L.; Hospital, E.; Brutzman, D.; "Simulating an Optical Guidance System for the Recovery of an Unmanned Underwater Vehicle", Oct. 1, 2000, IEEE Journal of Oceanic Engineering, pp. 568-574.
Price, D.; "STEP Modularization Overview Presentation", Oct. 1, 2000, IBM Corporation, pp. 1-41.
Individual; "Containment Early Binding—Draft 1.6", May 24, 2000, pp. 1-23.
CAN in Automation (CIA); "CANopen: Electronic Data Sheet Specification for CANopen", May 31, 2000, pp. 1-24, CiA Draft Standard Proposal 306, Version 1.0.
CAN in Automation (CIA); "CANopen: Layer Setting Services and Protocol", May 31, 2000, pp. 1-17, CiA Draft Standard Proposal 305, Version 1.0.

Yee, K.; "STEP @ Boeing", Jun. 1, 2000, The Boeing Company, pp. 1-19.
Microsoft Corporation; "How to Write and Use Activex Controls for Microsoft Windows CE 3.0", Jun. 1, 2000, Windows CE 3.0 Technical Articles, 5 pages.
Mitsuishi, M.; Mutou, K.; Anmi, S.; Inazuru, I.; Kanemoto, M.; Shirakata, N.; Takagi, T.; Naitou, M.; Matsuda, S.; Yamaguchi, M.; Miyajima, H.; "User Interface for an Open-Architecture Controller", Jul. 1, 2000, 2000 Japan USA Symposium on Flexible Automation, pp. 1-4.
Lego; "Lego MindStorms RCX 2.0 Firmware Command Overview", Jul. 4, 2000.
ISO/IEC; "ISO-9506-1 Industrial Automation Systems;Manufacturing Message Specification;Part 1: Service definition", Aug. 1, 2000, pp. i-22, 38 pages.
ISO/IEC; "ISO-9506-2 Industrial Automation Systems;Manufacturing Message Specification;Part 2: Protocol specification", Aug. 1, 2000, pp. i-6, 18 pages.
ISO—International Standards Organization; "ISO 10303-42: Industrial automation systems and integration—Product data representation and exchange—Part 42: Integrated generic resource: Geometric and topological representation", Sep. 1, 2000, pp. 1-346.
Compumotor Division, Parker Hannifin; "Motion Toolbox User Guide (A Library of LabVIEW Virtual Instruments for Motion Control)", Jun. 1, 1997, pp. i-v, 7-10, 85-93.
Proctor, F.; Albus, J.; "Open Architecture Controllers", Jun. 1, 1997, IEEE Spectrum, pp. 60-64.
Penton Media, Inc.; "Software opens up many possibilities", Sep. 1, 1997, p. 36 (Sep. 1997 issue of American Machinist).
Szabo; "Validation Results of Specifications for Motion Control Interoperability", Sep. 1, 1997, SPIE, pp. 166-176, vol. 2912.
OPC Foundation; "OLE for Process Control, Data Access Standard", Sep. 11, 1997, Updated, version 1.0A, Chapter 1-5 (pp. 1-169).
Redmond III, F.; "DCOM—Microsoft Distributed Component Object Model", Sep. 22, 1997, IDG Books Worldwide, Inc., (371 pages) Copyright 1997.
Jennings, R.; "Special Edition Using Access 97, Second Edition", Oct. 9, 1997, Que, Chapter 25.
Fritz, K.; Grant, K.; Khambholja, K.; Krueger, J.; "Circuit Board Prototyping System, CS400 Senior Design", Oct. 10, 1997, Milwaukee School of Engineering, pp. 1-17.
Ge Fanuc; "Windows '95 and Windows NT 32-Bit Drivers and Libraries for Open CNC Systems", Nov. 1, 1997, pp. 8-828.
Feng; "Distributed Control of a Multiple-Tethered Mobile Robot System for Highway Maintenance and Construction", Nov. 1, 1997, Microcomputers in Civil Engineering, pp. 383-392, vol. 12.
Penton Media, Inc.; "Computer Store (American Machinist)", 1997, p. 83 (Jan. 1997 issue of American Machinist).
Johnson, C.; "Process Control Instrumentation Technology—Fifth Edition", 1997, Prentice-Hall, Inc., (645 pages).
Wonderware; "The Factory Suite Product Literature", 1997, pp. 1-34.
Matsui; "An Event-Driven Architecture for Controlling Behaviors of the Office Conversant Mobile Robot, Jijo-2: Proceedings of the 1997 IEEE International Conference on Robotics and Automation", 1997, IEEE, pp. 3367-3372, vol. 4.
Lawrenz, W.; "Can System Engineering--From Theory to Practical Applications", 1997, Springer-Verlag, Inc., Chps. 1, 2.1, 2.2, 3.2 and 4.1.
Cahners Publishing Company; "Software Allows Combined Relay Ladder Logic and Flowchart Programming", Feb. 1, 1997, p. 1 (Reprint from Control Engineering, Feb. 1997).
Lewis, M.; "Five best bets for the machine-tool industry", Mar. 1, 1997, Penton Media, Inc., p. 79, 80, 92 (Mar. 1997 issue of American Machinist).
Nematron Corporation; "Nematron OpenControl Product Literature", Mar. 15, 1997, pp. 1-7.
Penton Media, Inc.; "CAM software offers simultaneous 5-axis machining", Apr. 1, 1997, p. 32, Apr. 1997 edition of American Machinist.
ISO/IEC; "ISO/IEC 7498-3 Information Technology--Open Systems Interconnection-Basic Reference Model: Naming and Addressing", Apr. 1, 1997, ISO/IEC 7498-3.
Individual; "SC4 Framework Presentation - Annex A-N326 Presentation", Sep. 30, 1996, pp. 1-8, document creation date: Sep. 30, 1996.
Schneeman, R.; "Device Driver Development for Microsoft Windows NT: Accessing Motion Control Hardware Using a Multimedia Framework", Oct. 1, 1996, NIST, pp. 1-43.
Steeplechase Software, Inc.; "Flow Charts Give Focus to Manufacturing", Oct. 1, 1996, pp. 1-2 (Reprinted from Managing Automation, Oct. 1996).
ISO/IEC; "ISO/IEC 8649: Information Technology—Open Systems Interconnection—Service definition for the Association Control Service Element", Oct. 15, 1996, all pages.
Wonderware; "Wonderware InTouch DDE I/O Server Listing", Nov. 1, 1996, pp. 1-14.
Suzuki, T.; Fujii, T.; Yokota, K.; Asama, H.; Kaetsu, H.; Endo, I.; "Teleoperation of Multiple Robots through the Internet", Nov. 14, 1996, pp. 84-88.
Kapoor, C.; "A Reusable Operational Software Architecture for Advanced Robotics", Dec. 1, 1996, UMI, pp. vi-vii, 1-79, 111-253, 302-368 (ch1, ch2, ch4, ch5 and ch7).
Sycara, K.; Pannu, A.; Williamson, M.; Zeng, D.; "Distributed Intelligent Agents—1", Dec. 1, 1996, IEEE Expert, Downloaded from IEEE, 11(6): pp. 36-46.
Sycara, K.; Pannu, A.; Williamson, M.; Zeng, D.; "Distributed Intelligent Agents—2", Dec. 1, 1996, IEEE Expert, (Downloaded from CiteSeer) 11(6): 36-46.
National Electronic Manufacturing Initiative, Inc.; "NEMI Low-cost Controller Project", Dec. 1, 1996, pp. 1-392.
Sperling, W.; Lutz, P.; "Enabling Open Control Systems: An Introduction to the OSACA System Platform", May 1, 1996, ASME Press, Robotics and Manufacturing, pp. 1-8, vol. 6.
Schuett, T.; "Advanced Controls for High Speed Milling"; conference paper presented at the SME"High Speed Machining", May 7, 1996, Creative Technology Corporation.
General Motors; "Open, Modular Architecture Controls at GM Powertrain", May 14, 1996, 39 pages, Version 1.
National Instruments; "Lookout Product Literature", May 15, 1996, pp. 1-12.
Fusaro, D.; "A Standard for Programming PLCs Emerges—Now What?", Jun. 1, 1996, Control, pp. 1-4 (reprint from Control—Jun. 1993).
Ge Fanuc Automation; "CIMPLICITY Product Brochure", Jun. 1, 1996, pp. 1-4.
Siemens Energy and Automation, Inc.; "Siemens Automation Technology Newsletter (Q2/96)", Jul. 1, 1996, pp. 1-24.
Brockschmidt, K.; "What OLE Is Really About; OLE (General) Technical Articles", Jul. 1, 1996, Microsoft Corporation, 33 pages.
Mitsubishi Electric Corporation; "Mitsubishi Electric Advance: Programmable Logic Controllers Edition", Sep. 1, 1996, vol. 76.
Marcos, M.; Orive, D.; "A New Solution for Integrating Control Devices Involved in Computer-Integrated Manufacturing", Sep. 2, 1996, IEEE, UKACC International Conference Publication No. 427, pp. 485-490.
Factorysoft, Inc.: "FactorySoft Report Product Literature", 1996, pp. 1-2.
Kruglinski, D.; "Inside Visual C++—The Standard Reference for Programming with Microsoft Visual C++ version 4", 1996, Microsoft Press, (946 pages) Copyright 1996.
Galil Motion Control; "Motion Control Product Catalog", 1996, pp. 1-10, 82-91, 106-125.
Ge Fanuc Automation; "PowerMotion Servo and Machine Control (Product Brochure)", 1996, pp. 1-8.
Shinskey, F.; "Process Control Systems: Application, Design, and Tuning—Fourth Edition", 1996, McGraw-Hill Inc., (450 pages).
Compumotor Division, Parker Hannifin; "Step Motor and Servo Motor Systems and Controls", 1996, pp. 1, 28-29.
Ge Fanuc; "TCP/IP Ethernet Communications for the Series 90-70 PLC", 1996.
Chappell, D.; "Understanding ActiveX and OLE—A Guide for Developers and Managers", 1996, Microsoft Press, (347 pages) Copyright 1996.
McGraw; "A Friendly Command, Control, and Information System for Astronomy", 1996, ASP Conference Series, pp. 356-367.

Farsi, M.; "CANopen: The Open Communications Solution", 1996, pp. 112-116.
Sisco, Inc.; "MMS-EASE", 1996, pp. 1-4.
Jackman; "Robotic Control Using Sequential Function Charts", 1996, SPIE, pp. 120-128, vol. 2911.
Schuett, T.; "The Ultimate DNC; Direct CNC Networking (DCN)", 1996, Modern Machine Shop, Creative Technology Corporation.
Proctor, F.; "Validation of Standard Interfaces from a Machine Control", 1996, NIST, NIST Internal Report, pp. 659-664.
Team ICLP API Working Group; "Technologies Enabling Agile Manufacturing (TEAM) Intelligent Closed Loop Processing", Jan. 11, 1996, pp. 1-30.
Baruch, J.; Cox, M.; "Remote control and robots: an Internet solution", Feb. 1, 1996, Computing and Control Engineering Journal.
Burchard, R.; Feddema, J.; "Generic Robotic and Motion Control API Based on GISC-Kit Technology and CORBA Communications", Apr. 1, 1996, Sandia National Laboratories, pp. 712-717.
Sperber, B.; "Try These Two Little Disks for a Bit Step in Streamlined, Object-Oriented SCADA", Apr. 1, 1996, Control, pp. 1-2 (reprinted from CONTROL—Apr. 1996).
Esprit 5629 Project; "Open System Architecture for Controls within Automation Systems EP 6379 and EP 9115, OSACA I and II Final Report", Apr. 30, 1996, pp. 1-79.
Ge Fanuc Automation; "Ge Fanuc Automation Product Guide", May 1, 1996, pp. 1-8.
Iconics, Inc.; "Configuring Input/Output (I/O) Devices (Genisis Product Guide)", Feb. 15, 1995, pp. 1-31.
Quinn, T.; George, G.; "Windows 95 Marks a New Era in PC-Based Automation", Mar. 1, 1995, Cahners Publishing Company, pp. 19-20, 22 (Control Engineering, Mar. 1995).
Automation and Control; "PLC Programming Standard Expands", Apr. 1, 1995, pp. 3-4 (Reprinted from Automation and Control, Apr. 1995).
Cahners Publishing Company; "PC Control Software Combines Ladder Logic, HMI and I/O", May 1, 1995, pp. 1-3 (reprint from Control Engineering—May 1995).
Koizumi, A.; "Pursuing Design Development with a Focus on Compatibility and Permeability with Incorporation of Worldwide Standard Specifications", May 1, 1995, Instrumentation: Instrumentation and Control Engineering, vol. 38, No. 5, pp. 58-62.
Electronic Industries Association; "ANSI/EOA-484-A: Electrical and Mechanical Interface Characteristics and Line Control Protocol Using Communication Control Characters for Serial Data Link Between a Direct Numerical Control System and Numerical Control Equipment Employing Asynchronous Full Duplex Transmission", Jun. 1, 1995, ANSI/EIA Specification 484-A.
Oasys Group, Inc.; "OASYS Open Architecture System", Jul. 11, 1995, pp. 1-23.
Schuett, T.; "The Benefits and Data Bottlenecks of High Speed Milling: Conference paper presented at Southeastern Michigan Chapter American Mold Builders Association", Aug. 1, 1995, Creative Technology Corporation.
ISO—International Standards Organization; "ISO/CD 10303-214—Application protocol: Core Data for Automotive Mechanical Design Process—Draft", Aug. 8, 1995, pp. 1-1967.
Cahners Publishing Company; "PC Software Adds 'Joy-of-Use' to Power and Flexibility", Sep. 1, 1995, pp. 2-3 (reprinted from Control Engineering, Sep. 1995).
Wonderware; "InTouch 5.6 (Product Data Sheet)", Sep. 15, 1995, pp. 1-4.
ARC Advisory Group; "PC-Based Control Strategies", Oct. 1, 1995.
Leitao; Lopes; Machado; "A Manufacturing Cell Integration Solution: paper developed at CCP as a part of the ESPRIT 5629 Project", Oct. 1, 1995.
Fedrowitz; "IRL-Based Expansion of the Commonly Used High-Level Language C for Robot Programming", Oct. 1, 1995, 5 pages.
Kramer, T.; Proctor, F.; "The NIST RS274/NGC Interpreter—Version 2", Oct. 26, 1995, NIST, pp. 1-58.
Pirjanian; Christensen; "Hierarchical Control for Navigation Using Heterogeneous Models", Nov. 1, 1995, 19 pages, Denmark.
Wonderware; "InTrack Manufacturing Execution System (Product Data Sheet)", Nov. 15, 1995, pp. 1-5.
Selamoglu, H.; "Component Categories", Dec. 1, 1995, Microsoft Development Library, pp. 1-19.
OPC Foundation; "OLE for Process Control Standard—Version 1.0 Draft", Dec. 22, 1995, pp. 1-70.
Kagami, S.; Tamiya, Y.; Inaba, M.; Inoue, H.; "Design of Real-Time Large Scale Robot Software Platform and its Implementation in the Remote-Brained Robot Project", 1996, IEEE, pp. 1394-1399.
Microsoft Development Library; "1.1 Printer Driver Operation", 1992, Jul. 1994 MSDN, Windows NT DDK: Win32 Subsystem Driver Design Guide, pdf pp. 1-6.
Vaataja, H.; Hakala, H.; Mattila, P.; Suoranta, R.; "3-D Simulation of Ultrasonic Sensor System in Mobile Robots", 1992, IEEE, pp. 333-336.
Microsoft Development Library; "3.1.1 Using Unitool", 1992, Jul. 1994 MSDN, Windows NT DDK: Win32 Subsystem Driver Design Guide, pdf pp. 1-101.
Microsoft Development Library; "3.4 Specifying Cursor-Movement Commands", 1992, Jul. 1994 MSDN, Windows NT DDK: Win32 Subsystem Driver Design Guide, pdf pp. 1-7.
Microsoft Development Library; "4.1.22 Banding Drivers", 1992, Jul. 1994 MSDN, Windows 3.1 DDK: Device Driver Adaptation Guide, pdf pp. 1-3.
Amy, L.; "Automation Systems for Control and Data Acquisition", 1992, Instrument Society of America, (235 pages).
Microsoft Development Library; "Chapter 11—Graphics-Driver Escapes", 1992, Jul. 1994 MSDN, Windows 3.1 DDK: Device Driver Adaptation Guide, pdf pp. 1-50.
Microsoft Development Library; "Chapter 2 Supporting DDI Printing and User Interface Functions", 1992, Jul. 1994 MSDN, Windows NT DDK: Win32 Subsystem Driver Design Guide, pdf pp. 1-5.
Microsoft Development Library; "Chapter 4—Specifying Control Information", 1992, Jul. 1994 MSDN, Windows 3.1 DDK: Minidriver Development Guide, pdf pp. 1-16.
Microsoft Development Library; "Chapter 5 Printer Escapes", 1992, Jul. 1994 MSDN, Windows 3.1 SDK: Programmers Reference, vol. 3: Messages, Structures, Macros, pdf pp. 1-54.
Microsoft Development Library; "Chapter 7 Minidriver", 1992, Jul. 1994 MSDN, International SDKS: Hanguel Windows DDK, pdf pp. 1-8.
Lynch, M.; "Computer Numerical Control for Machining", 1992, McGraw-Hill Inc., All pages. (Copyright 1992).
USDATA; "FactoryLink IV for Microsoft Windows and NT", 1992, pp. 1-4.
Motion Engineering, Inc.; "PC/DSP-Series Motion Controller C Programming Guide", 1992, pp. 1-54.
Delta Tau Data Systems, Inc.; "PMAC Product Catalog", 1992, p. 43.
SEMI; "SEMI E30-1103 General Model for Communications and Control of Manufacturing Equipment (GEM)", 1992.
Microsoft Development Library; "Win32 SDK Programmers API Reference, Escape Function", 1992, Jul. 1994 MSDN, Win32 SDK Programmers API Reference, vol. 3, pdf pp. 1-2.
Microsoft Development Library; "Windows 3.1 SDK: Programmers Reference vol. 2: Functions-SpoolFile", 1992, Jul. 1994 MSDN, Windows 3.1 Programmers Reference vol. 2: Functions, pdf p. 1.
Microsoft Corporation; "Win32 SDK Programming Reference vol. 2", 1992, Dynamic Data Exchange Management Library, Chapter 77, 26 pages.
Microsoft Corporation; "Windows 3.1 SDK Guide to Programming", 1992, Dynamic Data Exchange, Chapter 22, 21 pages.
Microsoft Corporation; "Windows for Workgroups 3.1 Resource Kit", 1992, Network Dynamic Data Exchange, Chapter 11, 19 pages.
Smith, M.; "An Environment for More Easily Programming a Robot", May 1, 1992, International Conference on Robotics and Automation, pp. 10-16.
Nielsen, L.; Trostmann, S.; Trostmann, E.; "Robot Off-line Programming and Simulation As a True CIME-Subsystem", May 1, 1992, International Conference on Robotics and Automation, pp. 1089-1094.
Allen-Bradley Company, Inc.; "CNCnet Software Library", Oct. 1, 1992, Publication 8000-6.1.1.
Ambrose, C.; "The Development of an Interactive Synthesis Tool for Intelligent Controllers of Modular Reconfigurable Robots", Dec. 1, 1992, pp. 1-304.

Albus, J.; "A Reference Model Architecture for Intelligent Systems Design", 1993, NIST, pp. 1-38.
TA Engineering Co., Inc; "AIMAX-WIN MMI Software for the New DCS Era", 1993, 8 pages.
Compumotor Division, Parker Hannifin; "Compumotor Digiplan Positioning Control Systems and Drives", 1993, 1993-94 Catalog, pp. 10-11.
Gerry Engineering Software, Inc.; "ExperTune PID Tuning Software Product Brochure", 1993, 6 pages.
National Instruments; "IEEE 488 and VXIbus Control, Data Acquisition, and Analysis (Catalog)", 1993, pp. Main Table of Contents, Introduction pp. ii-xi, Section 1 Instrumentation Software Products.
Software Horizons, Inc.; "Operator Interface Software for Supervisory Control, Monitoring and Reporting for Windows Operating System (Product Literature)", 1993, pp. 1-12.
Oregon Micro Systems, Inc.; "Precision Motion Controls At Affordable Prices Product Guide", 1993, pp. 1-20.
Pro-Log Corporation; "Pro-Log Motion Control for Allen-Bradley PLCs (Product Literature)", 1993, pp. 1-5.
Iconics, Inc.; "Software Products for Industrial Automation", 1993, 6 pages.
Tele-Denken Resources, Inc.; "VIEWpoint (Product Data Sheet)", 1993, pp. 1-11.
Dictionary.Com LLC; "www.dictionary.com definition of 'persistent'", 1993.
Farsi, M.; "Flexible and Reliable Robotics Cells in Factory Automation", 1993, pp. 520-525.
Anderson, R.; "Smart: A Modular Architecture for Robotics and Teleoperation", 1993, IEEE, pp. 416-421.
Pritschow, G.; Daniel, C.; Junghans, G.; Sperling, W.; "Open System Controllers: A Challenge for the Future of the Machine Tool Industry (with DEFS)", Jan. 15, 1993, RGB00076341-RGB00076344, Annals of the CIRP, pp. 449-452, vol. 42.
Pritchard, K.; "PC-based Simulation in Control System Design", Feb. 1, 1993, Cahners Publishing Company, pp. 1-2 (reprinted from Control Engineering, Feb. 1993).
Laduzinsky, A.; "An Open Look for PLC Programs", May 1, 1993, Cahners Publishing Company, p. 1 (reprint from Control Engineering—May, 1993).
Katayama, Y.; Nanjo, Y.; Shimokura, K.; "A Motion Control System with Event-driven Motion-module Switching Mechanism for Robotic Manipulators", Jul. 1, 1993, IEEE, International Workshop on Robot and Human Communication pp. 320-325., U.S.
Microsoft Corporation; "WOSA Backgrounder: Delivering Enterprise Services to the Windows-based Desktop", Jul. 1, 1993, Backgrounders and Whitepapers: Operating Systems Extensions—MSDN Archive Edition, pp. 1-19.
Wallace, S.; Senehi, M.; Barkmeyer, E.; Ray, S.; Wallace, E.; "Control Entity Interface Specification", Sep. 1, 1993, pp. 10-20.
Galil Motion Control; "Galil ServoTRENDS vol. IX. No. 2", Sep. 1, 1993, pp. 1-4.
Microsoft Corporation; "Object Linking and Embedding 2.0 Backgrounder", Sep. 1, 1993, pp. 1-15.
Cahners Publishing Company; "Control Engineering Software", Oct. 1, 1993, p. 184 of Oct. 1993 issue of Control Engineering.
Christensen, J.; "Programmable controller users and makers to go global with IEC 1131-3", Oct. 1, 1993, Instrument and Control Systems, pp. 1-4 (reprint from Instrument and Control Systems—Oct. 1993).
Tuggle, E.; "Introduction to Device Driver Design", Oct. 5, 1993, Proceedings of the Fifth Annual Embedded Systems Conference, pp. 455-468, vol. 2.
Microsoft Development Library; "How to Send Printer Escape Codes from a WinWord Document", Oct. 25, 1993, Jul. 1994 MSDN, Knowledge Base Article, PSS ID No. Q93658, pdf p. 1.
Microsoft Corporation; "Microsoft OLE Today and Tomorrow: Technology Overview", Dec. 1, 1993, pp. 1-9.
Richter, J.; "Advanced Windows NT—The Developer's Guide to the Win32 Application Programming Interface", 1994, Microsoft Press, (732 pages) Copyright 1994.
Lin, S.; "Computer Numerical Control—From Programming to Networking", 1994, Delmar Publishers, Inc, All pages. (Copyright 1994).
Intellution, Inc.; "FIX Product Brochure", 1994, 6 pages.
Kruglinski, D.; "Inside Visual C++—Version 1.5; Second Edition", 1994, Microsoft Press, (754 pages) Copyright 1994.
King, A.; "Inside Windows 95 Book", 1994, Microsoft Press, DEFS 00024891-00025395.
National Instruments; "LabWindows/CVI Product Literature", 1994, pp. 1-8.
Microsoft Press; "Microsoft Windows NT(TM) 3.5 Guidelines for Security, Audit, and Control", 1994, (296 pages) Copyright 1994.
Proctor, F.; Damazo, B.; Yang, C.; Frechette, S.; "Open Architectures for Machine Control", 1994, NIST, pp. 1-17.
Pid, Inc; "OpenBatch Product Brief", 1994, 6 pages.
Microsoft Corporation; "Open Systems: Technology, Leadership, and Collaboration", Mar. 1, 1994, Backgrounders and Whitepapers: Operating System Extensions—MSDN Archive Edition, pp. 1-15.
Microsoft Corporation; "The Microsoft Object Technology Strategy", Mar. 1, 1994, Backgrounders and Whitepapers: Operating System Extensions—MSDN Archive Edition, pp. 1-33.
Miller, D.; "Using Generic Tool Kits to Build Intelligent Systems (AIAA 94/1214)", Mar. 9, 1994, Sandia National Laboratories, pp. 1-9.
Tele-Denken Resources, Inc.; "The History of Programmable Controllers", Apr. 1, 1994, pp. 1-26.
Wonderware; "InTouch 5 Lite (Product Data Sheet)", Apr. 14, 1994, pp. 1-4.
Wonderware; "InTouch 5 (Product Data Sheet)", Apr. 19, 1994, pp. 1-4.
Wonderware; "InTouch 5 PDK/NT (Product Data Sheet)", Apr. 19, 1994, pp. 1-4.
CAN in Automation (CIA); "CAN Physical Layer for Industrial Applications", Apr. 20, 1994, pp. 1-4, CiA Draft Standard 102, Version 2.0.
Kramer, T.; Proctor, F.; Michaloski, J.; "The NIST RS274/NGC Interpreter—Version 1", Apr. 28, 1994, NIST, pp. 1-26.
ISO—International Standards Organization; "ISO/CD 10303-204: Application protocol: Mechanical design using boundary representation—Draft", 4129/1994, pp. 1-214.
Honeywell Inc.; "SDS Physical Layer Specification", 1994, pp. 1-34.
Tal, J.; "Step-By-Step Design of Motion Control Systems", 1994, Galil Motion Control.
Steeplechase Software, Inc.; "Visual Logic Controller (Product Literature)", 1994, pp. 1-3.
Trihedral Engineering Ltd; "Web 3.0 Product Brochure", 1994, 6 pages.
Xanalog; "Model NL-SIM Product Brochure", 1994, 4 pages.
Farsi, M.; "Device Communication for Flexible Manufacturing:-A New Concept", 1994, pp. 328-334.
Sisco, Inc.; "Overview and Introduction to the Manufacturing Message Specification (MMS)", 1994, pp. 1-47, Revision 2.
Chen, S.; Lin, S.; "Computer Numerical Control: Essentials in Programming and Networking", 1994, Delmar Publishers, Inc, pp. 824-848, Part V, Chapter 27.
US Department of Energy; "Robotic Technology Development Program", Feb. 1, 1994, pp. 1-114.
Microsoft Development Library; "Using Passthrough Escape to Send Data Directly to Printer", Feb. 2, 1994, Jul. 1994 MSDN, Knowlege Base Article, PSS ID No. Q96795, pdf pp. 1-2.
Chu; Wang; "Development of a Practical SFC System for CNC Machine Shop: International Conference on Data and Knowledge Systems for Manufacturing and Engineering", May 1, 1994, pp. 362-367, vol. 1; pp. xx+745, vol. 2.
Microsoft Development Library; "INF: An Alternative to SpoolFile()", May 6, 1994, Jul. 1994 MSDN, Knowledge Base Article, PSs ID No. Q111010, pdf pp. 1-5.
Microsoft Development Library; "INF: Banding, Printing, and the Number of Bands", May 6, 1994, Jul. 1994 MSDN, Knowledge Base Article, PSS ID No. Q72691.
Microsoft Development Library; "INF: Basics of Banding Printing in Windows", May 6, 1994, Jul. 1994 MSDN, Knowledge Base, PSS ID No. Q75471, pdf pp. 1-2.
ISO/IEC; "ISO/IEC 9506-6: Industrial automation systems—Manufacturing message specification—Part 6: Companion Standard for Process Control", Jun. 1, 1994, pp. 1-267.

Sakai, K.; "Object Orientation and C++ Language: Facts of Object-Oriented Programming", Jun. 1, 1994, CQ Publishing Co., Ltd., vol. 20, No. 6, pp. 83-93.
Control; "Simulation Software Helps Troubleshoot PLC Code", Jun. 1, 1994, p. 1 (reprinted from Control, Jun. 1994).
Tele-Denken Resources, Inc.; "SoftPLC (Product Data Sheet)", Jun. 1, 1994, pp. 1-5.
Blasvaer; Pirjanian; "An Autonomous Mobile Robot System", Jun. 8, 1994, pp. 52-61 and 122-124, Chapters 4 and 6.7.
Galil Motion Control; "Galil ServoTRENDS vol. X. No. 2", Jul. 1, 1994, pp. 1-4.
ISO/IEC; "ISO/IEC 9545: Information technology—Open Systems Interconnection—Application Layer structure", Aug. 15, 1994, pp. 1-20.
Ford, W.; "What Is an Open Architecture Robot Controller", Aug. 16, 1994, IEEE, pp. 27-32.
Hori, K.; "Protocol Conversion Software That Makes Possible Communication between Different Types of Field Devices", Sep. 1, 1994, Cosmo Technica, pp. 1-12.
Brockschmidt, K.; "Notes on Implementing an OLE Control Container", Sep. 21, 1994, Microsoft Development Library, pp. 1-47.
Daiyo, M.; "The Full Color Era Has Arrived with Scanner and Printer Development", Oct. 1, 1994, Nikkei Byte, No. 130, pp. 160-172.
Tele-Denken Resources, Inc.; "TopDoc (Product Data Sheet)", Oct. 1, 1994, pp. 1-7.
Senehi, M.; Kramer, T.; Michaloski, J.; Quintero, R.; Ray, S.; Rippey, W.; Wallace, S.; "Reference Architecture for Machine Control Systems Integration: Interim Report", Oct. 20, 1994, pp. 1-52.
ISO/IEC; "ISO/IEC 7498-1 Information Technology; Open Systems Interconnection-Basic Reference Model: The Basic Model", Nov. 1, 1994.
Putnam, F.; "The WinSEM OLE Messaging Architecture Working Paper", Dec. 1, 1994, Labtech.
OMAC Users Group; "Requirements of Open Modular Architecture Controllers for Applications in the Automotive Industry", Dec. 13, 1994, pp. 1-13, Version 1.1.
Various Entities; "ReEx: U.S. Patent No. 6,941,543 Reexamination (Control No. 95/000,397)—Patent Owner's Appeal Brief Evidence Appendix", Apr. 22, 2011, (161 pages).
Roy-G-Biv Corporation; "ReEx: U.S. Patent No. 6,941,543 Reexamination (Control No. 95/000,397)—Patent Owner's Appeal Brief", Apr. 22, 2011, (23 pages).
USPTO; "ReEx: U.S. Patent No. 5,691,897 Ex-Partes Reexamination (Control No. 90/009,282)—Certificate of Correction", May 24, 2011, (4 pages).
Roy-G-Biv Corporation; "USPTO Patent FileHist: P214185 (U.S. Appl. No. 10/405,883) File History—Amendment After Final Rejection", May 10, 2011, (9 pages).
USPTO; "USPTO Patent FileHist: P214185 (U.S. Appl. No. 10/405,883) File History—Notice of Allowance", May 26, 2011, (8 pages).
Roy-G-Biv Corporation; "USPTO Patent FileHist: 7110.00002 (U.S. Appl. No. 12/263,953)—Request for Continued Examination", Jun. 9, 2011, (7 pages).
Roy-G-Biv Corporation; "Foreign FileHist: European Patent Application No. EP04809804—Response to Examination Report", Jun. 16, 2011, (16 pages).
USPTO; "USPTO Patent FileHist: P216269 (U.S. Appl. No. 12/557,722) File History—Notice of Allowance", Jun. 16, 2011, (48 pages).
USPTO; "USPTO Patent FileHist: P216040 (U.S. Appl. No. 12/406,921) File History—Notice of Allowance", Jun. 23, 2011, (32 pages).
USPTO; "ReEx: U.S. Patent No. 6,513,058 Reexamination (Control No. 95/000,398)—Inter Partes Reexamination Certificate (0276th)", Jun. 28, 2011, (10 pages).
USPTO; "ReEx: U.S. Patent No. 6,516,236 Reexamination (Control No. 95/000,396)—Inter Partes Reexamination Certificate (0277th)", Jun. 28, 2011, (10 pages).
USPTO; "USPTO Patent FileHist: P216269 (U.S. Appl. No. 12/557,722) File History—Issue Notification", Sep. 7, 2011, (1 page).
Roy-G-Biv Corporation; "USPTO Patent FileHist: P215032 (U.S. Appl. No. 11/370,082) File History—Response to Non-Final Office Action", Sep. 12, 2011, (9 pages).
USPTO; "USPTO Patent FileHist: P214185 (U.S. Appl. No. 10/405,883) File History—Issue Notification", Sep. 14, 2011, (1 page).
CIPO; "Foreign FileHist: Canadian Patent Application No. CA 2,705,404—Office Action", Jul. 4, 2011, (4 pages).
CIPO; "Foreign FileHist: Canadian Patent Application No. CA 2,625,283—Office Action", Jul. 11, 2011, (2 pages).
USPTO; "USPTO Patent FileHist: P216349 (U.S. Appl. No. 13/004,789) File History—Published Application US 2011/0169832", Jul. 14, 2011, (18 pages).
USPTO; "USPTO Patent FileHist: P216269 (U.S. Appl. No. 12/557,722) File History—Notice of Allowability", Jul. 18, 2011, (22 pages).
USPTO; "USPTO Patent FileHist. P216627 (U.S. Appl. No. 13/011,753) File History—Published Application US 2011/0185371", Jul. 28, 2011, (94 pages).
CIPO; "Foreign FileHist: Canadian Patent Application No. CA 2,705,404—Office Action Cancelled", Aug. 3, 2011, (1 page).
CIPO; "Foreign FileHist: Canadian Patent Application No. CA 2,705,404—Office Action", Aug. 3, 2011, (4 pages).
USPTO; "USPTO Patent FileHist: P216269 (U.S. Appl. No. 12/557,722) File History—Notice of Allowability", Aug. 12, 2011, (8 pages).
Roy-G-Biv Corporation; "USPTO Patent FileHist: P216039 (U.S. Appl. No. 12/244,673) File History—Notice of Appeal", Aug. 25, 2011, (1 page).
Roy-G-Biv Corporation; "USPTO Patent FileHist: P215057 (U.S. Appl. No. 11/454,053) File History—Notice of Appeal", Aug. 31, 2011, (1 page).
Allen-Bradley Company, Inc.; "Servo Positioning Assembly User Manual", Oct. 1, 1985, DEFS 00034317-00034563.
Gmfanuc Robotics Corporation; "GMFCOMM Communications Program Reference Manual—Version 2.11", 1986, DEFS 00058429-00058553.
Gmfanuc Robotics Corporation; "KCS-PC KAREL Communications Software Reference Manual—Version 1.0", 1986, DEFS 00058611-00058786.
Gmfanuc Robotics Corporation; "KAREL OLPC Off-line Programming Software Operations Guide—Version OLPC-V1.50P", 1987, DEFS 00058098-00058305.
Gmfanuc Robotics Corporation; "KAREL-VAX Communication Software Reference Manual—Version 1.1", 1987, DEFS 00057536-00057757.
Greenfeld, I., Hansen, F., Wright, P.; "Self-Sustaining, Open-System Machine Tools", NAMR/SME, 1989, DEFS 00030204-00030210, 1989 Transactions of NAMR/SME.
Greenfeld, I., Hansen, F., Fehlinger, J., Pavlakos, L.; "Robotics Research Technical Report", New York University, Jun. 15, 1989, DEFS 00040323-00040398.
Thomas, R.; "The Languages of Tape", American Machinist, Jan. 6, 1964, DEFS 00011360-00011367, Special Report No. 545.
Aerotech, Inc.; "Aerotech UNIDEX 31 Series Machine Controller Brochure", Date Unknown, Aerotech 613-623.
Mishra, B., Antoniotti, M.; "Ed I: NYU Educational Robot", Date Unknown, DEFS 00007791-00007873.
Wright, P., Hong, J., Tan, X., Pavlakos, L., Hansen, F.; "MOSAIC: Machine-tool, Open-System, Advanced Intelligent Controller", Date Unknown, DEFS 00030957-00030962.
Wizdom Controls, Inc.; "Paradym-31 User's Guide and Reference", Date Unknown, DEFS 00047946-00048274.
Precision Microcontrol; "Precision MicroControl Product Guide (with DEFS)", Date Unknown, RGB00076292-RGB00076323.
Wright, P., Hansen, F., Pavlakos, L.; "Tool Wear and Failure Monitoring on an Open-Architecture Machine Tool", New York University, Date Unknown, DEFS 00031419-00031436.

* cited by examiner

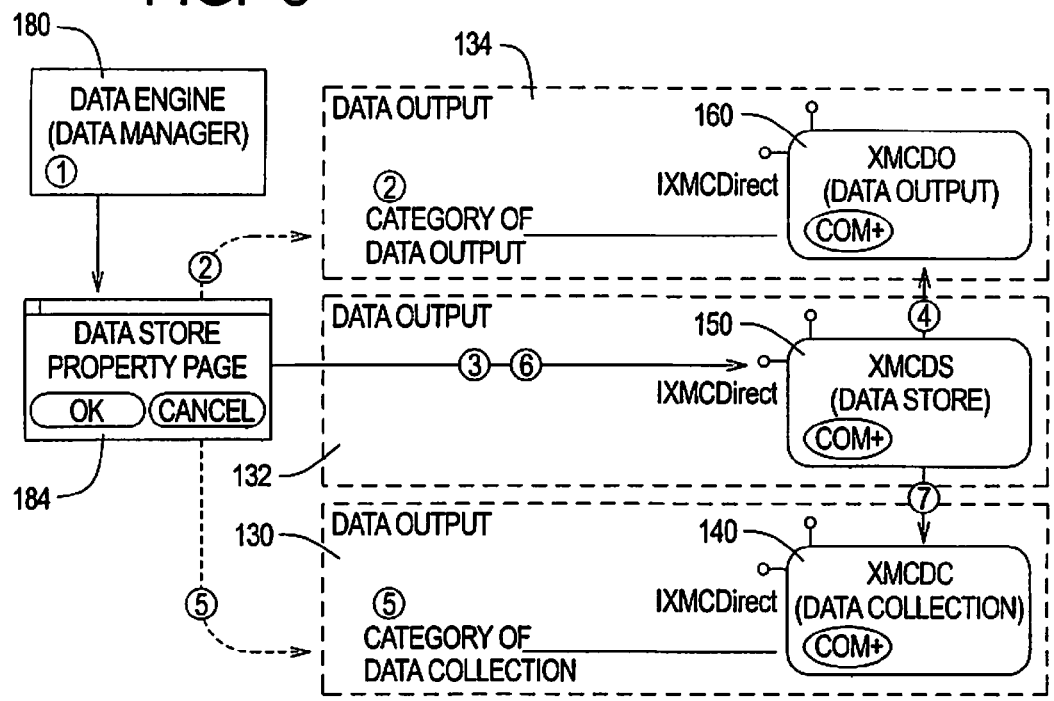
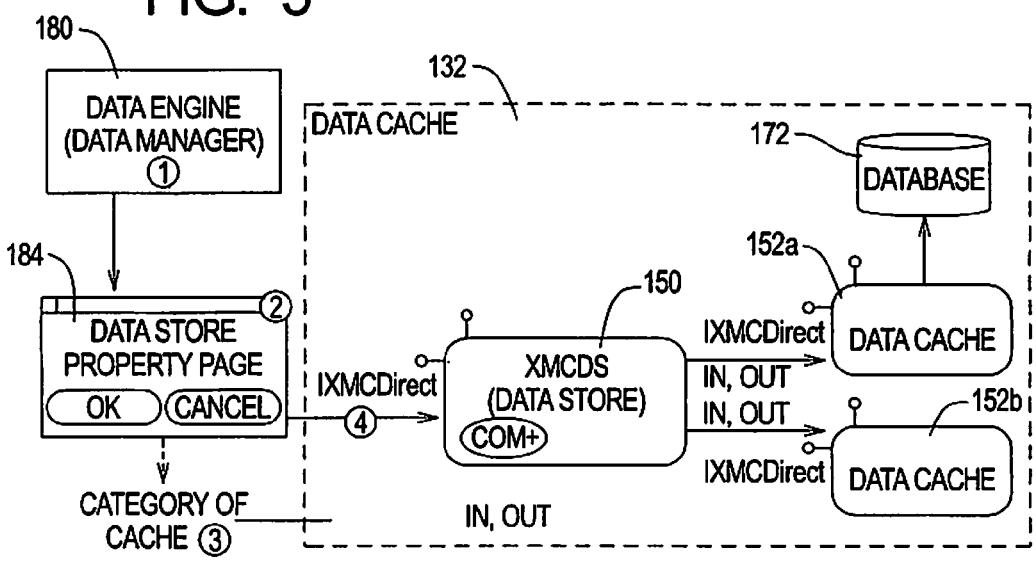

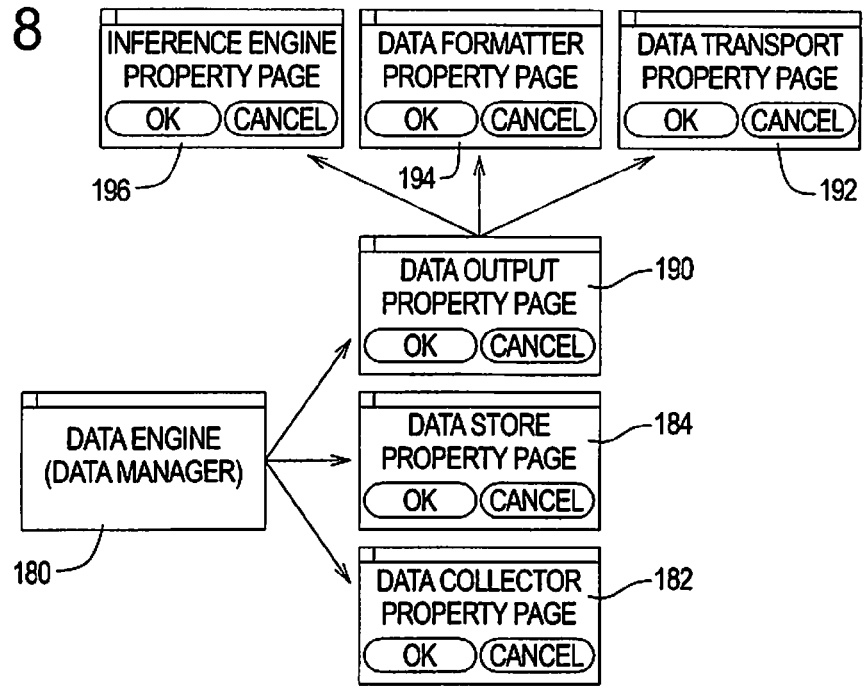

DATA ROUTING SYSTEMS AND METHODS

RELATED APPLICATIONS

This application Ser. No. 12/494,163 is a continuation of U.S. patent application Ser. No. 10/844,025, filed May 12, 2004, which claims priority of U.S. Provisional Patent Application Ser. No. 60/506,104, filed Sep. 25, 2003. The contents of all related applications listed above are incorporated herein by reference.

FIELD OF INVENTION

The present invention relates to computer systems for collecting data from one or more disparate data sources and distributing the collected data to one or more disparate data destinations.

BACKGROUND OF INVENTION

The present invention is used in the context of collecting and distributing data. The present application uses the term "routing" to refer to the process of both collecting data from data origins and distributing data to data destinations. The terms "data" and "data items" are used herein to refer to numeric, binary, or string data generated in an analog or digital format. Data is typically generated by machines, devices, or the like forming part of a larger working environment. The term "machine" as used herein refers to a physical asset used to perform a predetermined task. The term "device" is typically applied to a machine with a relatively small footprint.

The data origin or origins thus may be formed by any machine or device (mobile or not) that stores data and which is either directly controlled by humans through a user interface or automatically controlled via a computer based system. However, the present invention is of particular significance in the context of a working environment defined by a motion control system, and that application of the present invention will be described in detail below. The present invention may have broader application to other working environments, however, and the scope of the present invention should be determined by the claims appended hereto and not the following detailed description.

A motion control system typically comprises a plurality of motion control machines or devices each programmed to perform an individual task. The motion control system is configured to coordinate the individual tasks so that the motion control system itself performs a combined task.

Each motion control machine or device comprises a controller that generates and/or stores data indicative of the state of the machine or device at a particular point in time. Typically, some or all of this data changes because the state of the machine changes as the machine performs its individual task.

The data generated and/or stored by the motion control machines and/or devices of a motion control system can be used to optimize the performance of one or more of the individual machines as well as the entire motion control system. The data destinations where the data is sent can thus take any one or more of a number of forms, including a database system, a plant floor process management system, software used to optimize overall production flow, other software systems, and/or another data routing system as described herein.

The collection and distribution of the data associated with individual motion control machines is, however, complicated by several factors. The sheer volume of data can overwhelm the ability of the data destination to store and/or process the data collected. In addition, the data origins and data destination may employ different, unique, or proprietary hardware and software systems that utilize different data acquisition commands, data formats, and data transmission protocols.

The need thus exists for data routing systems and methods that simplify the collection of data from diverse data origins and the subsequent distribution of data to diverse data destinations.

SUMMARY OF INVENTION

The present invention may be embodied as a motion control system for collecting data from a plurality of motion control devices and distributing data to a plurality of data destinations, where the plurality of motion control devices are of a plurality of motion control device types and the plurality of data destinations are of a plurality of data destination types. A data input module comprises a plurality of data source components. Each of the data source components is configured to collect data from one of the plurality of motion control device types. At least one of the data source components is operatively connected to collect data from at least one of the motion control devices. A data output module comprises a plurality of data transport components. Each of the data transport components is configured to transport data to one of the plurality of data destination types. At least one of the plurality of data transport components is operatively connected to distribute data to at least one of the plurality of data destinations. A data cache module stores data collected by the plurality of data input modules, where data stored by the data cache module is accessible by the plurality of data output modules. The data output module distributes data collected by the data input module and stored in the data cache module to at least one of the plurality of data destinations.

DETAILED DESCRIPTION OF THE DRAWINGS

FIGS. 3-8 are scenario maps depicting the interaction of one or more components of the data routing system of FIG. 2 in different operational scenarios;

FIGS. 9-19 are examples of user interface configurations that may be used by the example data routing system of FIG. 2;

DETAILED DESCRIPTION OF THE INVENTION

Figure 1:
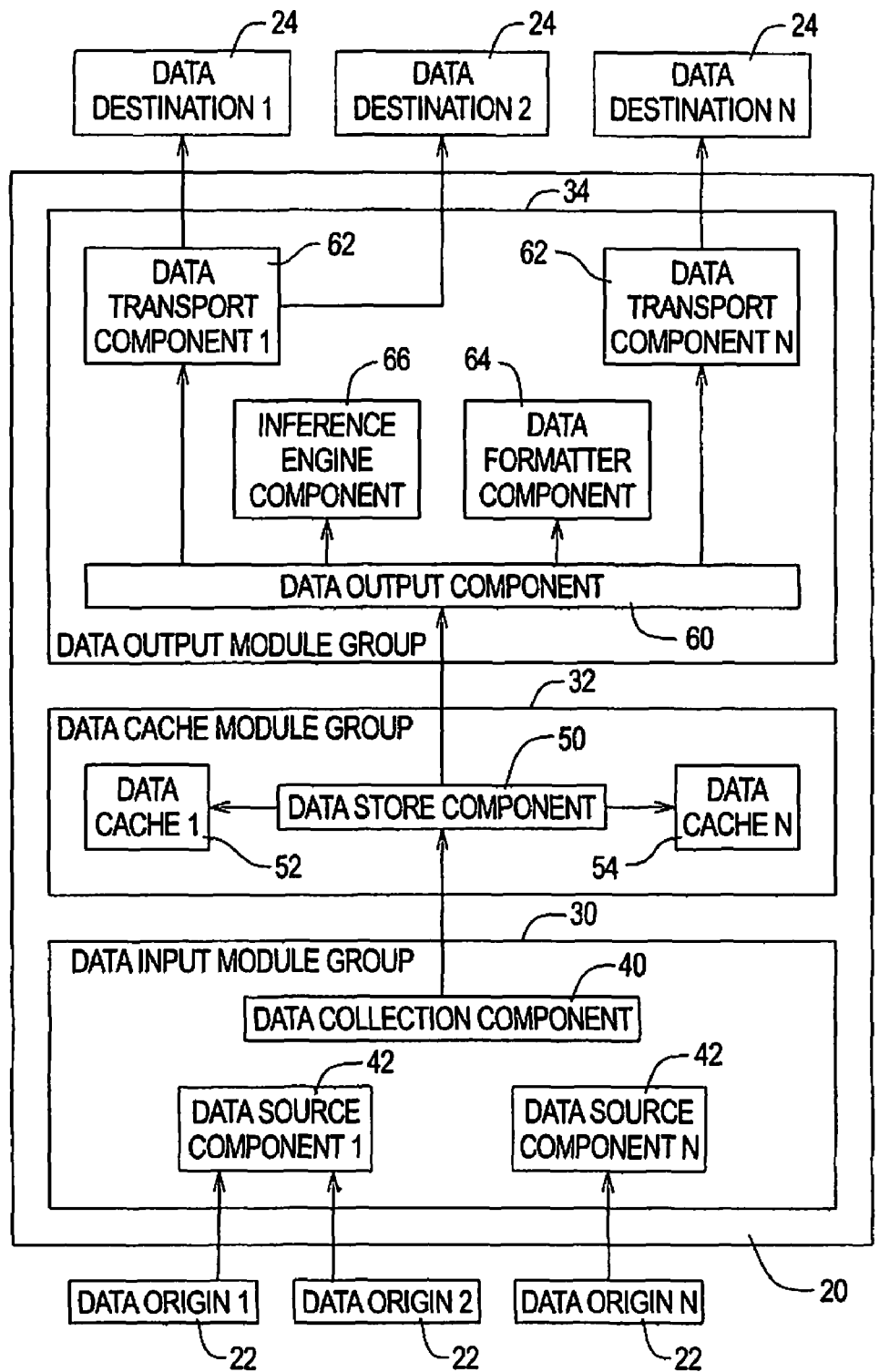
FIG. 1 is a somewhat schematic block diagram of a data routing system of a first embodiment of the present invention.

Referring initially to FIG. 1 of the drawing, depicted therein is a data routing system 20 constructed in accordance with, and embodying, the principles of the present invention. The data routing system 20 is used to route data or data items collected from data origins 22 to one or more data destinations 24.

As described above, the terms "data" and "data items" will be used herein to refer to numeric, binary, or string data values collected in an analog or digital format from a data origin 22. Examples of data types that represent data or data items as defined herein include ADDRESS, ARRAY, BIT, BYTE, WORD, DWORD, LONG, REAL, DOUBLE, FLOAT, BINARY BLOB, STRUCTURE, STRING, and ASCII STRING.

The data origins 22 are machines, devices, or the like forming part of a larger working environment. The working environment is not a part of the present invention and thus will not be described herein beyond what is necessary for a complete understanding of the invention. The terms "machine" as used herein refers to a physical asset used to perform a predetermined task. The term "device" is typically applied to a machine with a relatively small footprint.

Examples of machines as defined herein include a CNC mill used to shape metal, a pick-n-place machine used to position parts on a circuit board, a robotic machine used to perform surgery, a medical data input device (i.e. blood glucose meter, asthma meter, etc), a gaming device, a robotic toy, an animatronics figure, a robotic machine used to deliver goods to a warehouse or to people, an automobile, a truck or farm vehicle, a boat or ship, an airplane, a jet, a helicopter, a spacecraft, and/or a hardware or software-based control system within a personal computer or even just a personal computer or hand-held computer itself. The data origin or origins thus may be formed by any machine or device (mobile or not) that stores data and which is either directly controlled by humans through a user interface or automatically controlled via a computer based system.

As shown in FIG. 1, the data collected by the data routing system 20 is delivered to one or more data destinations 24. The data destinations 24 can take on many forms and serve many functions, but a primary function of the data destinations 24 is to use the data collected from the machines in the working environment to optimize operation of the individual machines and the overall working environment.

The example data routing system 20 is a software system that comprises a data input module group 30, an optional data cache module group 32, and a data output module group 34. The term "module" as used herein refers to a binary block of computer logic that contains functions, objects, components, ActiveX components, .NET source, HTML, XML and/or other computer code that can be executed in real-time or in script form. Several examples of a module include an executable EXE, a dynamic link library DLL, an OLE component or set of components housed within a DLL or EXE, an ActiveX Control, an HTML or XML based Control, a VB script source file, a Java Serverlet, Java Control, Java Object, .NET Package, etc.

The data input module group 30, data cache module group 32, and data output module group 34 typically run on a processor forming part of a computer system, but may be configured to operate across several discrete processors forming part of one or more computer systems.

The data routing system 20 operates basically as follows. The data input module group 30 communicates with one or more data origins 22 to obtain data indicative of a state or condition of the machine or device forming each of the data origins 22. If used, the data cache module group 32 temporarily or persistently stores the data collected by the data input module group 30. The data output module group 34 determines the conditions under which data collected by the data input module group 30 stored in the data cache module group 32 is sent to one or more of the data destinations 24. The data output module group 34 optionally also determines the format in which data is sent to the data destination 24 and/or the method of transporting the data to the data destination 24.

The example data input module group 30 comprises a data collection component 40 and one or more data source components 42. The term "component" as used herein refers to a logical organization of computer commands designed to perform an operation or set of operations. Examples of components include OLE components, ActiveX controls, HTML or XML based controls, HTML or XML based objects, .NET objects, C++ objects, C function set, Visual Basic objects, and the like. A component may operate on a single processor or may be distributed across a plurality of processors.

The data collection component 40 associates all of the data collected with the data origins 22 from which the data was collected. The data collection component 40 may be connected directly to one or more of the data origins 22 or may be connected to one or more of the data origins 22 through the data source components 42 as shown. If the data collection component 40 is connected directly to a data origin 22, the data collection component 40 and the data origin 22 must be pre-configured to work with each other, and the data collection component 40 is considered data origin independent, whereas the data source component 42 is considered data origin dependent. However, if the data collection component 40 communicates directly with a data origin 22, it then becomes data origin dependent.

Preferably, however, one or more data source components 42 are provided to allow the data collection component 40 to operate in a data origin independent manner. In this case, the example data source components 42 are each associated with one or more of the data origins 22. The data source components 42 collect data from a particular data origin 22 or class of data origins 22 and pass this data to the data collection component 40 in a predetermined format. The data source components 42 may run entirely on the same processor or processors as the data routing system 20, entirely on a processor or processors associated with the data origin 22, or on processors associated with both the data routing system 20 and the data origin 22. Although optional, the use of the data source components 42 is preferred to isolate the data collection component 40 from the operational details of each of the data origins 22.

The data input module group 30 may collect data from the data origins 22 by one or more of a number of methods. For example, the data source components 42 and/or data collection component 40 may read register values on the machine or device, read shared memory provided by the machine or device, send commands to the machine or device for which a data response is given containing the data requested, read variables provided by the machine or device, read and write to variables in a sequence necessary to produce data values, query data using a proprietary or standard data protocol, call a function provided by the machine or device, build and send a command based on a protocol used to communicate with the machine or device for which a data response is provided by the machine or device from which the data is extracted, and/or the like.

The optional data cache module group 32 comprises a data store component 50 and at least one data cache 52. The data collection component 40 passes data to the data store component 50; the data store component 50 stores this data in one or more of the data caches 52. The data caches 52 may be temporary or volatile memory devices such as RAM or may be permanent or persistent memory such as a hard drive or database system. The data store component 50 further retrieves data from the appropriate data cache 52 as necessary. If the data cache module 32 is not used, data collected by the data collection component 40 is passed directly to the data output module group 34 in real time.

The data output module 34 comprises a data output component 60. As mentioned, the data output component 60 may receive data directly from the data collection component 40.

However, if the data cache module 32 is used, the data output component 60 may direct the data store component 50 to read data stored in one or more of the data caches 52 and transfer the stored data to the data output component 60.

The data output module group 34 further comprises one or more data transport components 62. Each of the data transport components 62 defines or is associated with a method or system of transporting data from the data output component 60 to one or more of the data destinations 24. The data output component 60 selects an appropriate one of the data transport components 62 for each data element based on the data destination 24 to which the data element is to be sent.

Optionally, the data output module group 34 further comprises a data formatter component 64. The data formatter component 64 contains logic, templates, or the like for arranging data elements in a format appropriate for one or more of the data destinations 24. The data formatter component 64 allows the data destinations 24 to be implemented in a machine or device independent manner by obviating the need for the data destinations 24 to process data elements in the format generated by the data origins 22.

The data output module group 34 further optionally comprises an inference engine component 66. If used, the inference engine component 66 helps the data output component 60 to determine the data destination or destinations 24 where each data element is set. The inference engine component 66 may further assist the data output component 60 to make the determination of which data is to be output (if any) and/or which data transport component 62 to use and/or whether the data formatter component 64 is to be used.

The data routing system 20 of the present invention thus collects data from one or more data origins 22 and routes this data to one or more data destinations 24. The use of the data routing system 20 allows the data destination or destinations 24 to operate independent of the implementation details of the data origin or origins 22. In addition, the data routing system 20 can be configured to be independent of the data destination through the use of the data transport components 62, and data formatter components 64.

Turning now to FIGS. 2-21 of the drawing, depicted therein is a data routing system 120 of the present invention. The example data routing system 120 operates in the same basic manner as the data routing system 20 described above but is optimized to operate in a working environment defined by a motion control system.

Figure 2A:
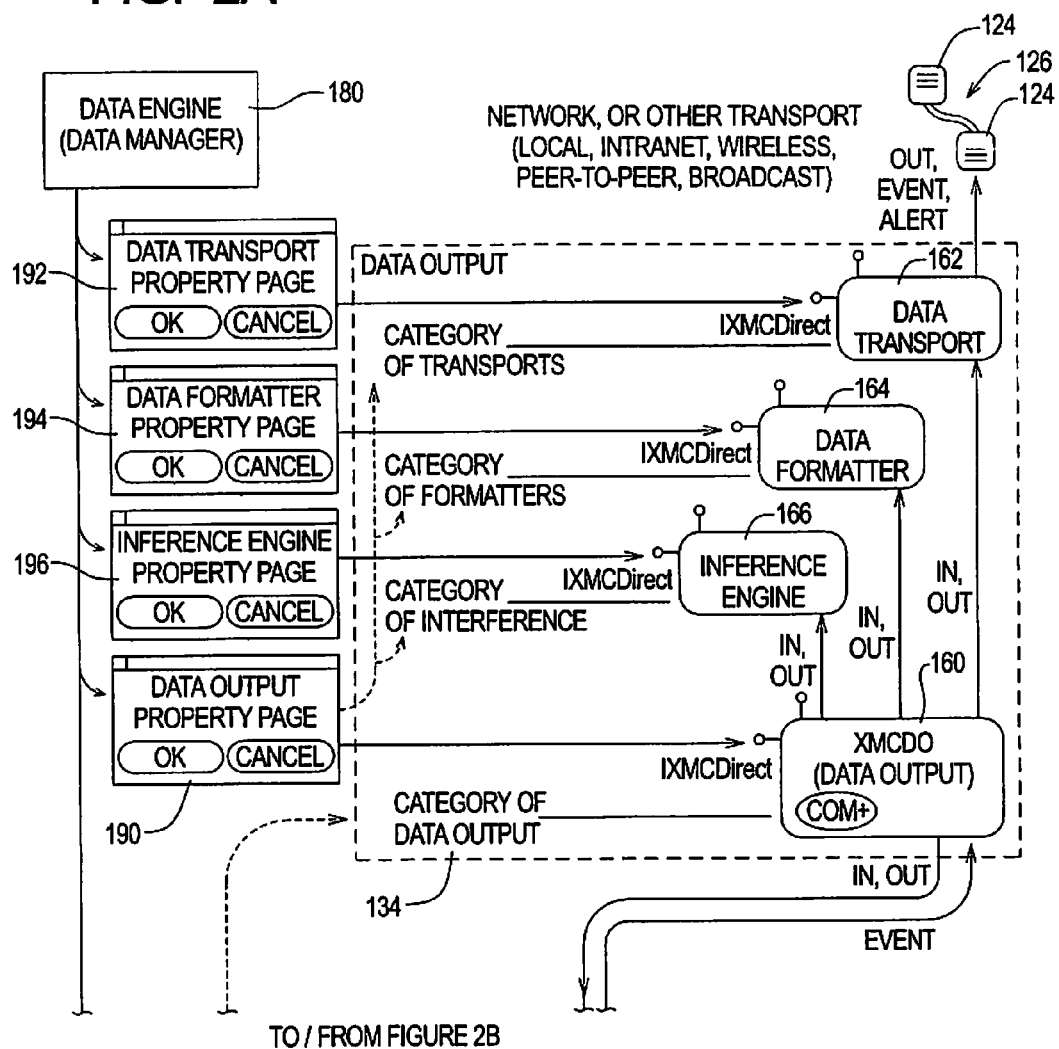
FIG. 2 is a somewhat schematic block diagram of a data routing system of a second embodiment of the present invention, where the data routing system has been optimized for use with a motion control system.
Figure 2B:
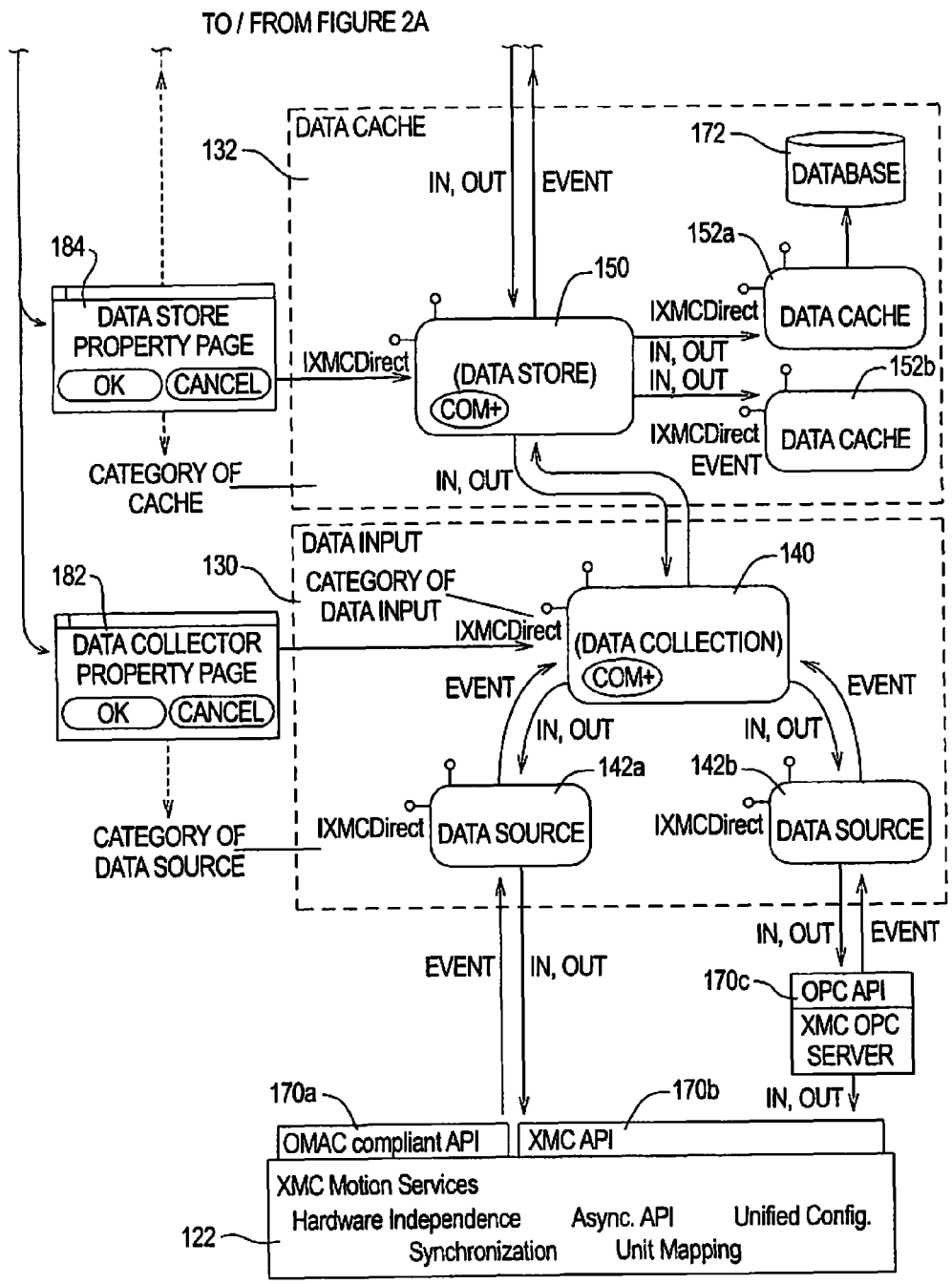
Figure 4:
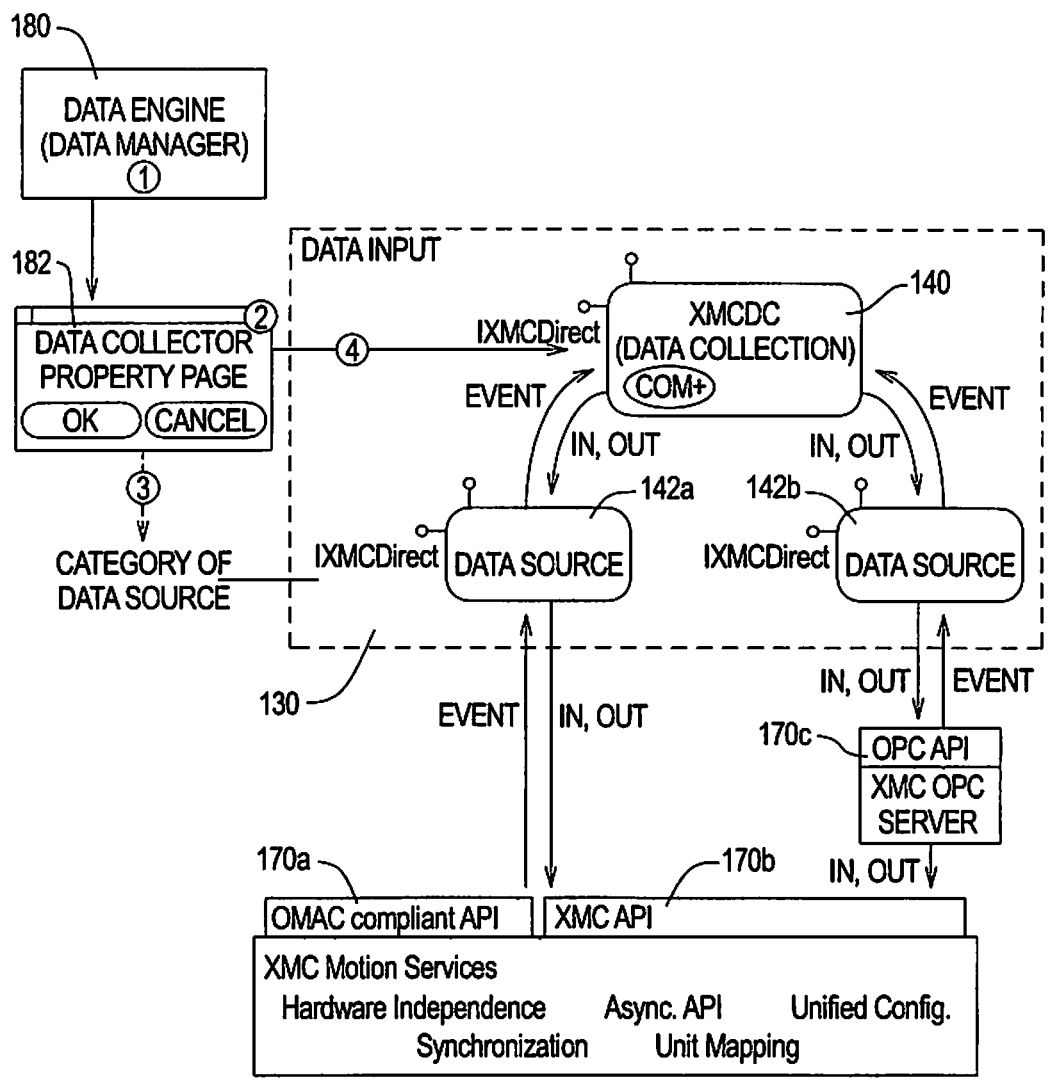

FIG. 2 illustrates that the data routing system 120 is a collection of modules or components used to collect machine data from the data origins 122 and then send some or all of the data collected to the data destinations 124. The data destinations 124 may be either a local data destination (for later replication to a remote data destination) or a remote site (either a remote data routing system or third party data destination).

The example motion system 122 as defined in U.S. Pat. No. 5,691,897, but other motion systems may be used instead or in addition. As will be described in further detail below, the motion system 122 defines or is associated with one or more application programming interfaces. The motion system 122 is not per se part of the present invention and will not be described herein beyond what is necessary for a complete understanding of the present invention.

The data destinations 124 may use the data delivered by the data routing system 20 for a variety of purposes. A primary function of the data destinations 124 is to optimize and/or monitor the operation of the machines and/or devices forming the motion control system that the motion services 122 or other software used by the data sources 142 communicate with. The data destinations 124 can thus take any one or more of a number of forms, including a database system, a plant floor process management system, software used to optimize overall production flow, or other software systems, and/or another data routing system as described herein.

The example data routing system 120 is connected to the data destination 124 through a network 126. The network 126 is a combination of hardware and software architectures that forms a link between two or more computer systems. Examples of network architectures include a packet based network, a streaming based network, broadcast based network, or peer-to-peer based network. Examples of networks that may be used as the network 126 include a TCP/IP network, the Internet, an Intranet, a wireless network using WiFi, a wireless network using radio waves and/or other light based signals, and the like.

The software components making up the example data routing system 120 may be organized into three module groups: a data input module group 130, a data cache module group 132, and a data output module group 134. The data input module group 130, data cache module group 132, and data output module group 134 typically run on a processor forming part of a computer system, but may be configured to operate across several discrete processors forming part of one or more computer systems connected by a computer network.

The data input module group 130 comprises a data collection component 140 and a plurality of data source components 142*a* and 142*b*. The data cache module group 132 comprises a data store component 150 and one or more data cache components 152. The data output module group 134 comprises a data output component 160, one or more data transport components 162, a data formatter component 164, and an inference engine component 166.

The data collection component 140 is responsible for collecting data from the machine asset and routing all data collected to the data cache module group 132. The data collection component 140 is responsible for managing one or more data source components 142 for which data is collected and route the data collected to the data cache module group 132.

The data source components 142*a* and 142*b* communicate with the motion system 122. Each data source communicates with the motion system using whatever means are available including to the use of application programming interfaces (API) 170*a*, 170*b*, and 170*c* associated with the motion system 122, using (API) provided by a motion system vendor, or using network or other communication protocols. The example data source component 142*a* is configured to receive data from the API's 170*a* and 170*b*, while the example data source component 142*b* is configured to receive data from the API 170*c*.

The example data collection component 40 manages one or more data source components 142 and is responsible for routing the data collected to the data store component 150 of the data cache module 132. Optionally, each data collection component 140 may communicate directly to the motion system 122 without the need for an intermediary data source component 142. However, the use of the data source component 142 allows for code reuse as the data collection component 140 may then implement all common functionality, thus making each data source component 142 extremely thin and easy to build and maintain. In addition, the use of each data source components 142 allows the data collection component 150 itself to be independent of each data origin with which each data source component 142 communicates to collect data.

Each data source component 142 is responsible for mapping the data collected from the data source (i.e. XMC API, XMC CNC API, OPC Server, or proprietary data source) into the format expected by the data collection component 140 and ultimately the data store component 150. The main goal of the data source components 142 is to provide a consistent interface to the data origin 122, thereby freeing the client from the details of the data origin 122 and allowing all data source components 142 to act and operate in the same manner from the perspective of the data collection component 140.

The data cache module group 132 caches the data received so that it may later be analyzed or otherwise processed. In particular, the data store component 150 manages one or more data caches 152 and is responsible for storing all data received and giving access to all data stored. Optionally, each data store component 150 could cache all data received directly without the need for an intermediary data cache 152. However, the use of the data cache or caches 152 allows for code reuse and also allows the data store component 150 to remain independent of any caching technologies used by each data cache component 152. The data store component 150 may then implement all common functionality, thus making each data cache module 132 also extremely thin and easy to build and maintain.

The terms "primary data cache" and "secondary data cache" may be used to refer to one or more of the data caches 152 depending upon whether certain features of the data cache module 132 are implemented and/or used as will be discussed in detail below. The suffix "a" is used in FIG. 2B to designate a primary data cache, and the suffix "b" is used to designate a secondary data cache.

Each data cache 152 stores data in a data target 172 such as a database on a hard drive, RAM memory, or another persistent or volatile storage medium. The main purpose of the data caches 152 is to provide a consistent interface to the data storage medium used so that the caches 152 appear to be the same to the user, thus freeing the client of any details handling various caching mechanisms.

The data output module group 134 is responsible for sending the data collected by the data input module group 30 and/or stored by the data cache module group 32 to the data destination 122. The data output component 160 manages the other components forming the data output module 34, namely, the data transport components 162, the data formatter component 164, and the inference engine component 166.

More specifically, the data output component 160 is responsible for sending data to one or more data destinations 124. As generally described above, the data destination may be an enterprise data management system, an artificial intelligence system, a plant floor process management system, software used to optimize overall production flow, another data routing system such as the systems 20 and 120 described herein, and/or other software systems used to optimize and/or monitor how the overall factory operates based on how each machine making up the factory runs.

The inference engine component 166 is responsible for mapping the data elements received from the data input module group 130 or data cache module group 132 through the data output component 160 to the data destinations 124 to which the data elements are to be sent. The data transport component 162 defines which data elements are to be sent to which data destination 124. When performing this mapping, the inference engine component 166 also optionally provides a set of rules and/or other criteria that are used to determine whether or not each output defined by the data transport component 162 should 'fire'. For example, the inference engine component 166 may use one or more of the following logic systems: artificial intelligence systems, fuzzy logic algorithms, neural network pattern matching, genetic algorithms, expert system logic, and/or other computer based decision-making and/or pattern matching based systems, to determine when a given set of one or more data elements should be sent out. In the simplest case, an identity transform may be used which causes all data inputs received to be sent out as matching data outputs.

The data formatter component 164 is used to format all or portions of the data set to be transported to the data destinations 124. For example the data formatter component 164 may be used to format data output by the inference engine component 166 into a certain XML schema or other proprietary data format.

The data transport component 162 is responsible for sending the data to the ultimate data destination 124, including an enterprise database, an enterprise software system, or even another data routing system such as the data routing system 120.

Referring still to FIG. 2, also depicted therein is a data manager 180 that allows the user to manage operation of the data routing system 120. The data manager 180 controls access to property pages exposed or generated by user-interface components associated with the components 140, 150, 160, 162, 164, and 166. Property pages may also be exposed or generated by user interface components associated with the components 142 and 152. In particular, the example data routing system 120 comprises data collector property pages 182, data store property pages 184, data output property pages 190, data transport property pages 192, data formatter property pages 194, and inference engine property pages 196. As will be described in further detail below, the property pages 182, 184, 190, 192, 194, and 196 allow the user to initialize, configure, and control the components 140, 150, 160, 162, 164, and 166, respectively.

In the following discussion and in the drawings, the property pages 182, 184, 190, 192, 194, and 196 also refer to the user-interface components associated with these property pages. The property pages 182, 184, 190, 192, 194, and 196 and other interface elements are separated from the components 140, 150, 160, 162, 164, and 166 in the system 120 to optimize the overall system flexibility and facilitate evolution toward new and future user interface technologies such as HTML based web user interface, SOAP/XML based interfaces, Microsoft .NET based interfaces, etc. Optionally, however, the components 140, 150, 160, 162, 164, and 166 could directly expose property pages and other user-interface elements.

Referring now to FIGS. 3-8, the interactions of the components and property pages forming the data input module group 130, data cache module group 132, and data output module group 134 will now be described in further detail in the various scenarios required to implement the functions of the example data routing system 120.

Before using the data routing system 120, the system must first be initialized. During initialization, all components are started and configured with their initial settings. Initializing the system involves configuring the data routing system 120 so that it knows what data to collect, where to collect it from, how to process the data collected and where to send the processed data. Once initialized, the system is ready to begin collecting, storing and processing machine and/or device data.

The initialization process includes to levels. First, the overall data routing system 120 must be configured by connecting one or more data collection components 140 data and one or more data output components 160 to the data store component 150. Once connected, the components making up each of the data input module 130, data output module 134, and data cache module 132 groups must next be configured.

The process of initializing the data routing system 120 will now be described with reference to FIG. 3.

Initially, the data manager 180 is run to configure the overall system 120.

The data manager 180 of the data routing system 120 next uses the data store property pages 184 paired with the data store component 150. The data store property pages 184 query the data store component 150 for all entries in the data output module group 134 category (or optionally queries for each entry directly using the OLE Component Categories) and displays each entry visually in the property page 184.

Next, after the user selects which data output module or systems 134 to activate, the list of active data output components 160 associated with the selected data output module or systems 134 is sent back to the data store component 150 so that it may use the active components. The data store component 150 could optionally query a separate 'configuration' component used to select the active data output modules 134 to use later when processing data to be output. Additionally, the activation of each active component 160 may optionally be activated programmatically instead of by the user.

During its initialization, the data store component 150 creates an instance of each activated data output component 160 so that the data store component 150 can send data update events to each upon receiving new cache data.

Similar to the configuration of the data output module group 134, the data store property pages 184 query the data input module group 130 for a list of supported data collection components 140. Optionally, the data store component 150 may query the data collection components 140 of the data input module group 130 and display each these data collection components 140 visually so that the user can activate all components 140 that are appropriate for collecting data.

Once selected visually by the user, the active list of one or more data collection components 140 is sent to the data store component 150. Optionally, the data store component 150 could query a separate 'configuration' component used to select the active data output modules 134 to use later when processing data to be output. Additionally, the activation of each component may optionally be activated programmatically instead of by the user.

During initialization, the data store component 150 creates an instance of each active data collection component 140.

Once the main components data store component 150, data collection component 140, and data output component 160 of the data output module 134 are configured, the user (or configuration program) must configure the components used by each of the systems 140, 150, and 160. The main configuration task for the data collection component 140 is that of selecting the data source components 142 (and the data items supplied by each) from which data is to be collected. The process of configuring the components used by the systems 140, 150, and 160 will now be described with reference to FIG. 4.

The following steps take place when configuring the data collection component 140 and related components.

First, the data manager 180 is used to configure the data collection component 140.

Second, the data collector property pages 182 are used to configure the data collection component 140. Optionally, all configuration may be done programmatically by another software module.

Each of the data collector property pages 182 queries the Data Source OLE Category of components to see what data source components 142 are available. Optionally, the data collection component 140 may be queried for the list of all data source components 142 available.

A visual list of available data source components 142 is next constructed, thus allowing the user to select which data source component or components 142 to use when collecting data. Optionally, the data collection component 140 could directly talk to the data source components 142; however such direct communication would reduce code reuse as the data collection component 140 allows each data source component 142 to be very thin, making these components 142 easy to build and maintain.

Finally, after the user selects the data source components 142 to use, a list of active data source components 142 is passed to the data collection component 140, which then creates an instance of each selected component.

Optionally, each data source component 142 may use an associated property page (not shown) that allows the user to visually (or software to programmatically) configure and select the data inputs from which data is to be collected by each data source component 142. Each data collector component 140 may also define a set of data inputs that the user may configure and select; however this it not optimal as the data source components 142 allow each data collector component 140 to remain independent of how each data origin actually works; i.e. the data items they provide and how the data for each data item is actually collected.

Referring now to FIG. 5, the following steps take place when configuring the data cache module group 132, which includes the data store component 150 thereof. Configuring the data store component 150 requires the selecting of the data cache 152 to use. When caching data there are three main methods that may be employed: (1) cache all data to memory only; (2) cache all data to a persistent storage such as a database, or (3) a mixture where data is initially cached to memory and then 'rolled-over' into the persistent store at certain intervals or after a specified amount of data has been collected. All three models are utilized by the data cache module group 132 of the data routing system 120, where only one method is necessary to build a picture of the overall state of the data origin at a given moment in time.

In a first step shown in FIG. 5, the data manager 180 of the data routing system 120 is used to configure the data store component 150 and associated components using the embedded data store property page 184. As described above, the data store component 150 can be configured to implement all user aspects that it needed to edit and otherwise allow the user interact with the data and configuration managed by the component. However, separating the user interface from the component in a parallel component has several advantages that allow for easily adopting future user-interface based technologies such as HTML, Windows .NET, and thin client. For these reasons the user interface has optionally been separated from the main logic making up the data store component 150. As generally described above, this same design organization is used throughout the entire system 120 by all components having an associated property page.

The data store property page 184 component queries the data store component 150 for the list of data cache components 152 that are available and displays the list visually. The list of available components 152 may optionally be provided programmatically by a separate component used for configuration. As an additional option, the data store property page 184 may directly query the Cache Category of components in the OLE Component Category.

From the data store property page 184, the user visually selects the specific data cache components 152 to use and the specific caching strategy to employ (single caching or roll-over where data from one cache is rolled over to another cache based on certain criteria such as an interval of time, or a data cache data threshold being met). The selected data cache components 152 and strategy selected by the user are transferred to the data store component 150 which then stores the settings.

Figure 6:
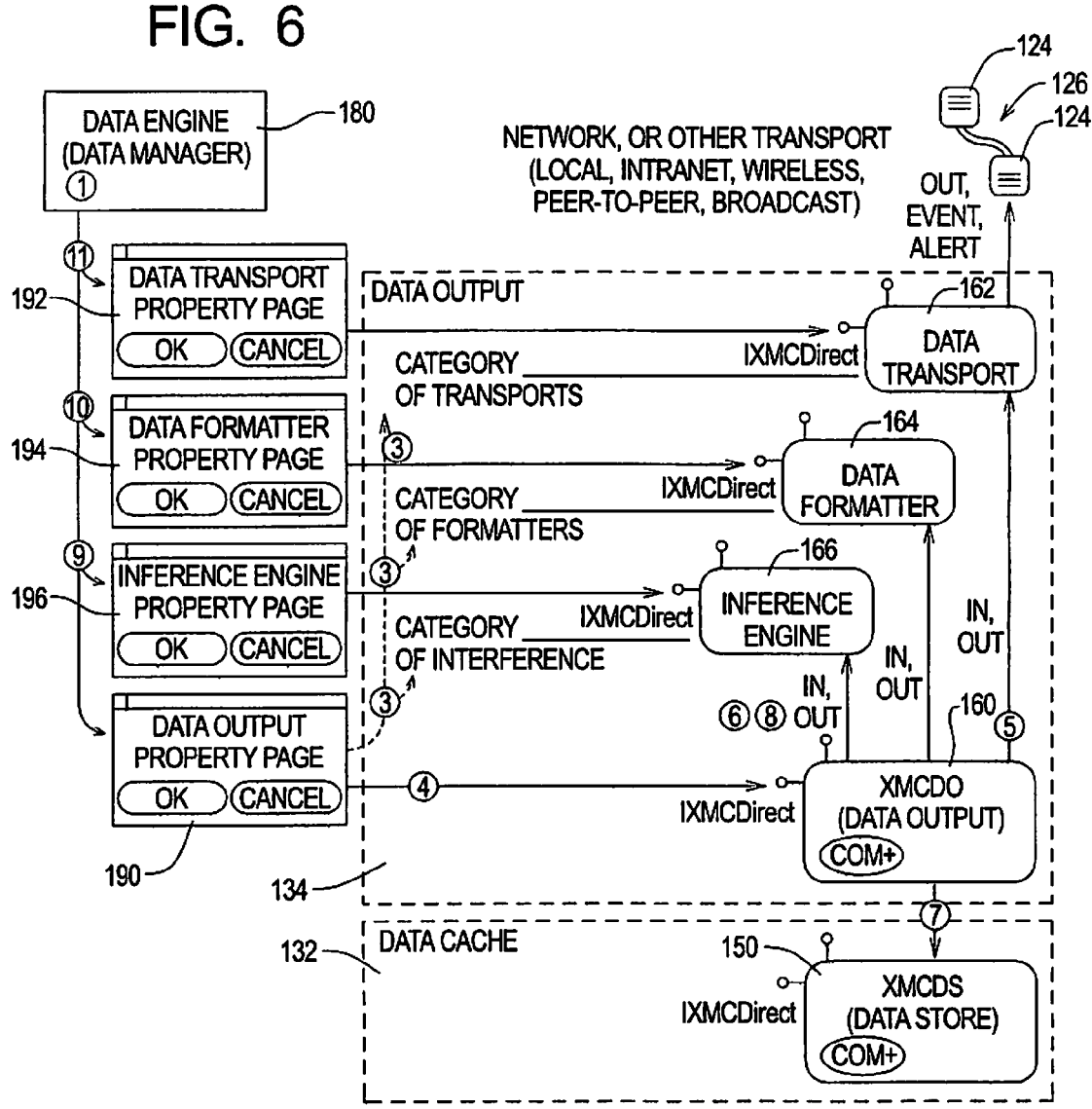

Each data output component 160 and associated components act as a data output 'pipeline' where data follows a set of steps that determines what data will be output, what format that data will be output in, and where the data will be sent. Referring now to FIG. 6 of the drawing, depicted therein are the steps that take place when configuring the data output component 160 and its related components.

First, the data manager 180 is used to configure the various aspects of the data output component 160 and its associated components.

When configuring the data output component 160, the data output property page 190 parallel component acquires the list of inference engine components 166, data formatter components 164, and data transport components 162 that are available. Once the list of data transport, data formatter, and inference engine components 162, 164, and 166 is acquired, a visual display of the list is created on the data output property page 190 so that the user can select one or more of the components 162, 164, and 166 from the list as appropriate for their application.

To obtain this list of components, the data output property page 190 may either query the data output component 160 or directly query the OLE Category for each of the data transport component 162, data formatter component 164, and inference engine component 166. If the data output component 160 is queried for the list of available components in each category, the data output component 160 in turn may then internally query a pre-configured list or the OLE components falling into each respective OLE Category for the data transport component 162, data formatter component 164, and inference engine component 166.

After the user selects one or more data transport components 162, one or more data formatter components 164, and one or more inference engine components 166, the list of components to activate is sent to the data output component 160, which stores the component information as its active components and then creates an instance of each component.

Next, each data transport component 162 is queried for its list of supported outputs. The list of supported data outputs is then passed to the inference engine component or components 166 selected.

Next, the data output component 160 queries the data store component 150 for its list of supported data items, usually stored in the data cache components 152 and previously selected when configuring the data collection component 140. The list of supported input data items is then passed to the inference engine component or components 166 selected.

When the inference engine component or components 166 have both the inputs and outputs available, the user may optionally configure rules or other criteria used to determine when each output is 'fired' based on the input data received. As examples, one or more of a set of Fuzzy Logic rules, a previously trained Neural Network pattern, a Genetic Algorithm fitness, Expert System logic, or other custom logic may be used to determine when certain outputs are sent through the data output pipeline to the data destination.

In addition, the data formatter component or components 164 may also be configured to output data in data formats supported by each data destination 124. For example, a data formatter component 164 may be used to output data items received in a certain proprietary schema. However, the data formatter component 164 would need to be configured so that it would know how to match the data items received to the proprietary schema. This step in the configuration process would allow the user, or another software program, to make this configuration.

And finally, the data transport component or components 162 would need to be configured so that they could properly send data received to the end data targets that it supported. For example, a data transport component 162 configured to use TCP/IP may need to have target TCP/IP addresses configured or TCP/IP ports configured telling the component 42 where to send the data.

Figure 7A:
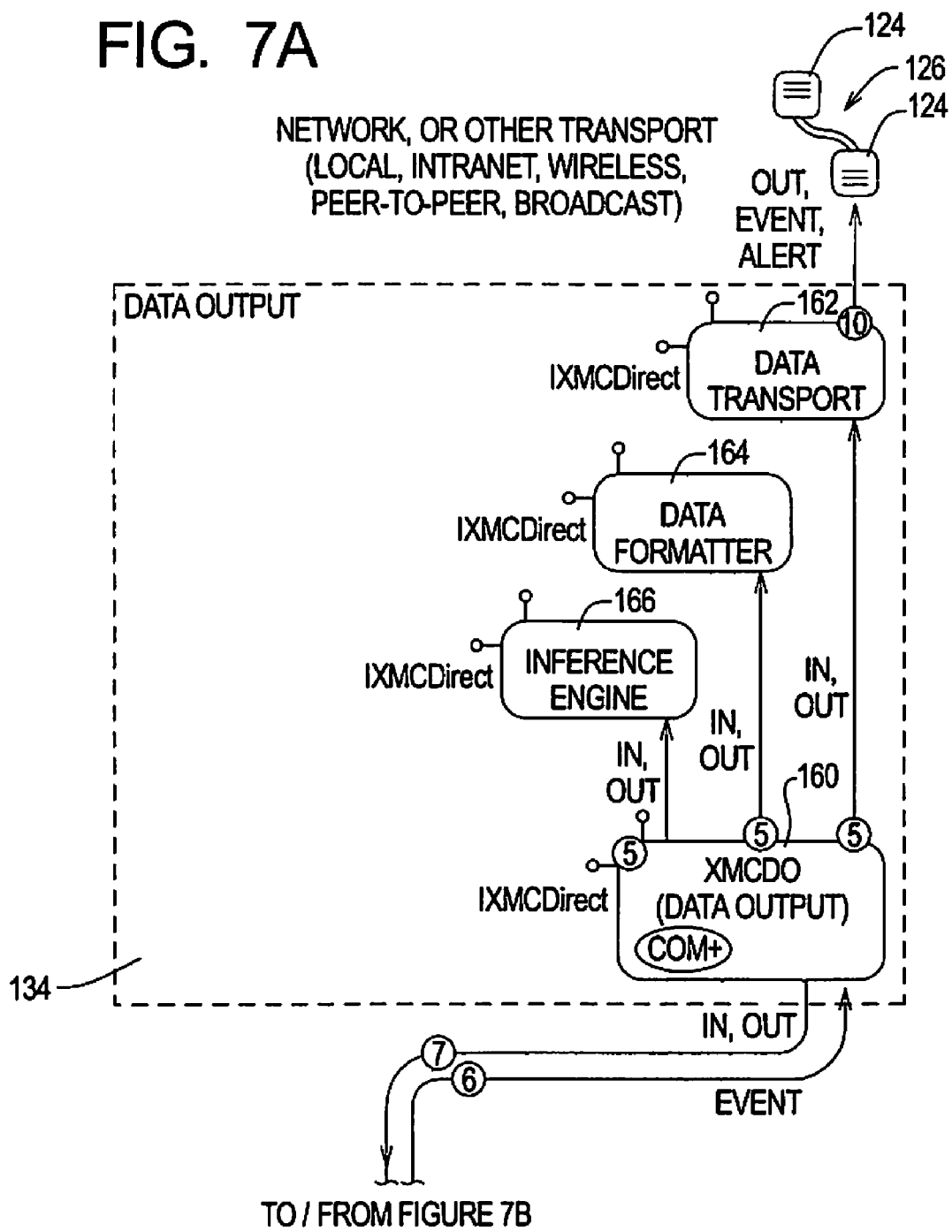
Figure 7B:
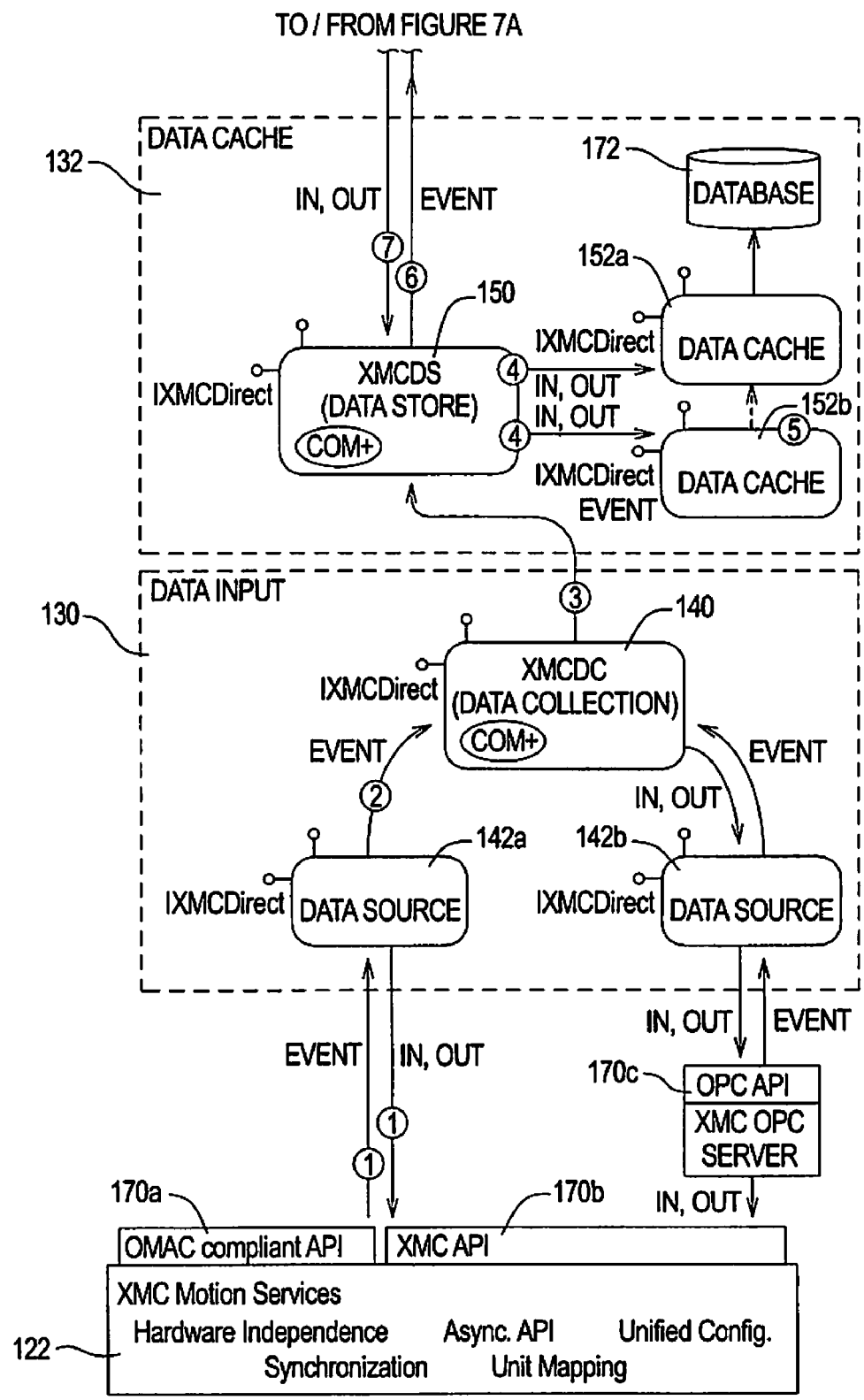

Once initialized, the data routing system 120 is ready to start collecting data and storing all data collected as previously configured. FIGS. 7A and 7B depict the interactions that take place when collecting data.

First each data source component 142 either polls for data or receives previously configured events from its data origination. For example, when using the motion system 124 or an OPC server as the data origin, events may be received telling the data source component 142 that new data is available.

Upon receiving a data update event, the data source component 142 fires an event to its respective parent data collection component 140.

Upon receiving its event, the data collection component 140 then fires an event to the data store component 150.

Upon receiving each data update event, the data store component 150 uses the active caching component or components 152 to store the data. Optionally, the data cache module 132 may employ a roll-over strategy in which data received is passed to one or more data cache modules 132 after a certain criteria is met such as in interval of time passing or a data caching threshold being met.

After caching the data, the data store component 150 fires a data update event to any data output component or components 160 connected to the data store system 132.

Upon receiving the data update event, the data output component 160 may optionally query the data store component 150 for more data if needed to gain a full description of the current state of the machines forming the motion system 122.

All data input information is then passed to the inference engine component 166 for processing. Upon receiving the data, the inference engine component 166 runs its preconfigured rule set against the data set received and produces the output (if any) that is eligible to be sent to the data destinations 124. If the inference engine component 166 employs a dynamic model of the data, its internal model may alter itself based on the input data received. For example, an inference engine component 166 that uses a neural network may 'learn' from the data by changing the neural network's weights based on the data input values received.

If data is eligible to be output, and a data formatter component 164 is used, the output data received from the inference engine component 166 is then sent to the data formatter component 164. Upon receiving the data, the data formatter component 164 transforms the data received into the supported output data format and passes the new output data back to the data output component 160.

The formatted data is then passed to the data transport component or components 162 to be transported or sent to the data destinations 124. If a data formatter component 164 is not used, the raw data format output from the inference engine component 166 is used and passed directly to any active data transport component 162. Upon receiving the output data, the active data transport component or components 162 send the data to their respective data destinations 124. For example, a TCP/IP transport would packetize the data into TCP/IP packets and send the data stream to a preconfigured TCP/IP address/port. Alternatively, a wireless transport may broadcast the data out on a pre-configured frequency.

Referring now to FIG. 8 of the drawing, depicted therein is a relationship among the interface windows and dialogs that form the property pages used to configure the example data routing system 120. The data manager 180 presents to the user a main window 220 (FIG. 9) that is used to access the data property pages 182, 184, 190, 192, 194, and 196 used to configure all settings of the data collection component 140, data store component 150, and data output component 160 forming up the system 120.

The example main window 220 presented by the data manager 180 to configure each of the main components 140, 150, and 160 is shown in FIG. 9. In particular, the main page 220 of the data manager 180 acts as a control panel that allows the user to configure and monitor how data flows from each data source 122 to the eventual data destination 124.

Each of the user interface elements of the main page 220 on the data manager 180 will now be described with reference to FIG. 7.

A "Configure" button 222 allows the user to configure the overall system 120 by building up the overall data transfer pipeline. This option is only available when running the application as an Administrator on the system.

A "Start" button 224 starts monitoring the data source components 142 and feeds the data received through the system 220.

A "Stop" button 226 stops monitoring the data source components 142 and shuts down the entire monitoring process.

A "Monitoring" icon 230 visually displays whether or not monitoring is currently enabled.

A "Close" button 232 closes the monitoring application window but does not close the application. Since the application runs as a system tray application, you must exit the application by right clicking on the system tray icon.

A "Status" window 234 visually shows the overall configuration and status of the system including all nodes making up the data input module 130, data store system 132, and data output module 134.

The following sections describe how to build and configure the overall system 120 using examples of the various property pages 182, 184, 190, 192, 194, and 196.

Figure 10:
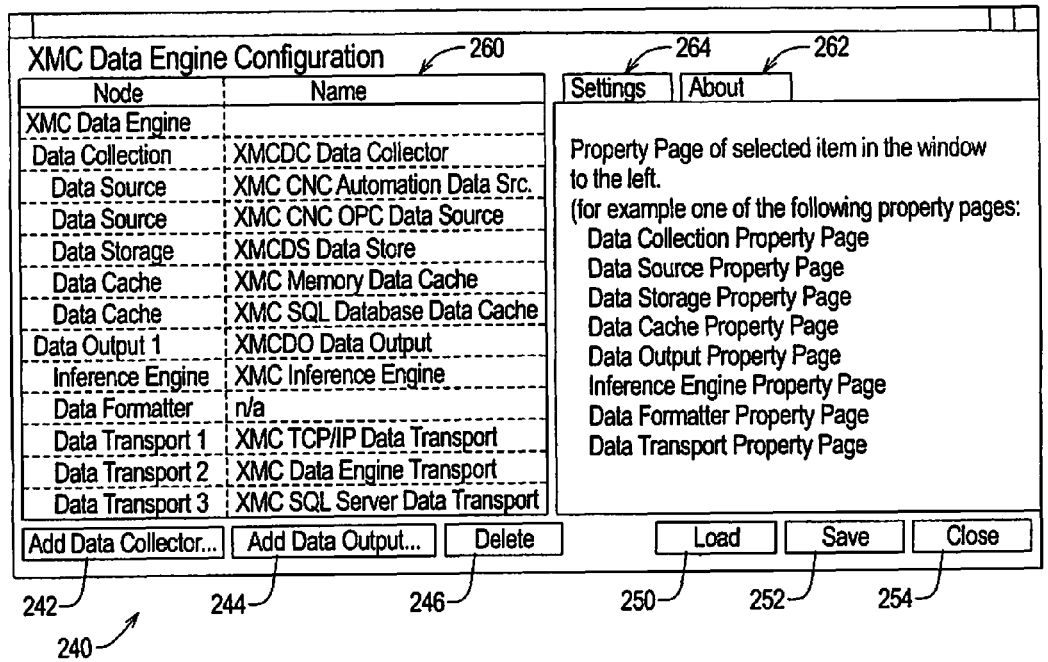

Referring initially to FIG. 10, depicted therein is a configuration dialog window 240 that is associated with the data manager 180. The configuration dialog window allows a user to build the overall data routing system 120. The user interface elements making up the configuration dialog window 240 are as follows.

An "Add Data Collector . . . " button 24 displays a dialog containing a list of all data collection components 140 available to the system. Once selected, the selected data collection components 140 are added to the system 120. The data collection components 140 are connected to the data store component 150 so that data events are sent to the data store component 150 each time data items are received by each of the data collection components 140 from their respective various data source components 142.

An "Add Data Output . . . " button 244 displays a dialog containing a list of all data output modules 134 available to the system. Once selected, the data output modules 134 are added to the system. Each data output module 134 manages a data pipeline that may involve inference rules or other decision-making technology that tell when to fire each data output.

A "Delete" button 246 removes a module from the list of components making up the overall data routing system 120.

A "Load" button 250 loads the components of a previously saved data routing system 120 from a persistent storage medium such as a file or database.

A "Save" button 252 saves the current data routing system 120 to a persistent storage medium such as a file or database.

A "Close" button 254 closes the configuration dialog.

A "Node" control 260 contains the current modules making up the data routing system 120, including data collection components 140, data store components 150, and data output components 160.

An "About" property page 262 displays information about the currently selected module in the node list.

A "Settings" property page 264 displays a property page corresponding to the currently selected node in the node list. The property page allows the user to configure the settings specific to the node selected.

Examples of interface elements that may be used to implement the property pages 182, 184, 190, 192, 194, and 196, as well as other related property pages, will now be described with reference to FIGS. 11-18. The "Delete", "Load", "Save", and "Close" interface elements depicted in FIGS. 11-18 apply to the "Node" Control on the left part of each figure (not shown) and will not be described in detail below.

Figure 11:
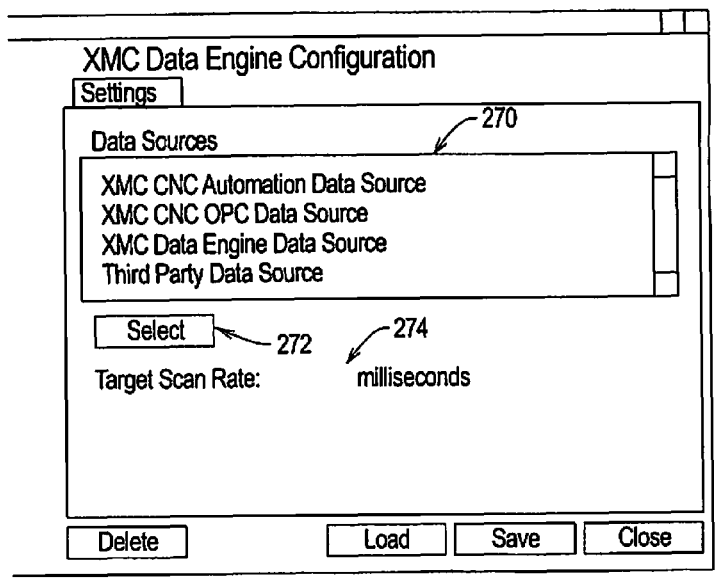

An example of the data collector property page 182 is depicted in FIG. 11 of the drawing. The data collector property page 182 allows a user to configure the components, such as the data collection components 140 and/or data source components 142, of the data input module group 130.

A "Data Sources" list box 270 contains a list of all data source components 142 available to the system. The list of available data source components 142 is acquired by either directly enumerating the Data Source OLE Category of components or by querying the data collection component 140 for all data source components 142 that it 'knows' about.

A "Select" button 272 adds the currently selected item in the list of data source components 142 to the currently selected data output module 134 in the main node list.

A "Target Scan Rate" edit field 274 allows the user to input a global scan rate that applies to all data source components 142 that may be controlled using a global scan rate.

Figure 12:
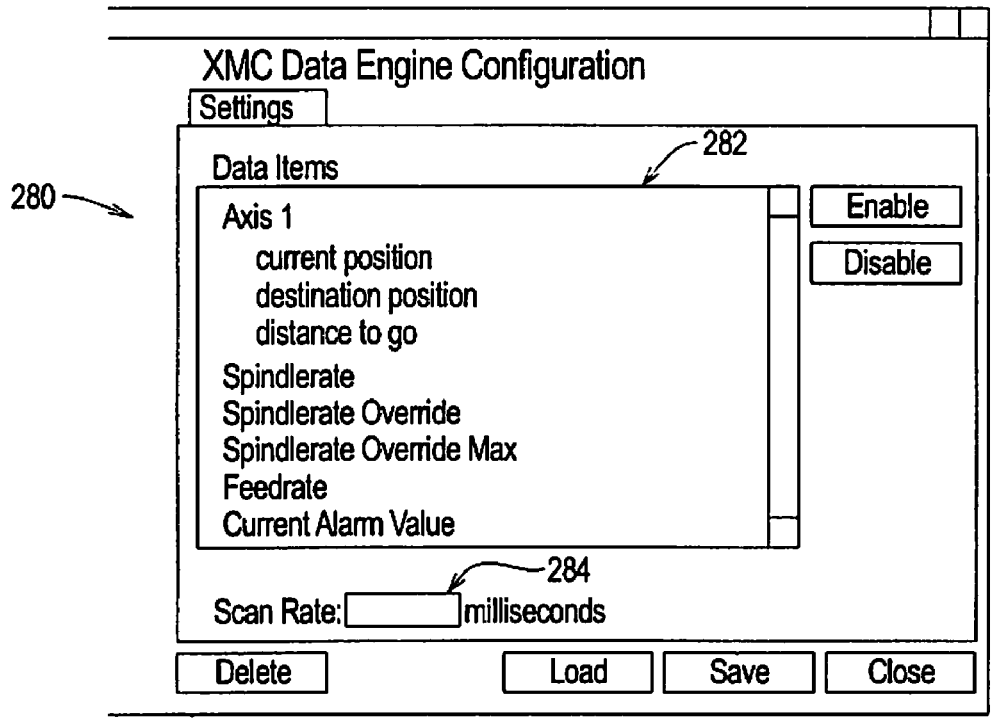

A data source property page 280 is depicted in FIG. 12. The data source property page 280 allows the user to select the data items made available by each data source component 142. The selected data items are then fed into the data store component 150 and eventually on into the selected inference engine component 166. The following user-interface elements make up the data source property page 280.

A "Data Items" list box 282 contains a list of all data items made available by each data source component 142. The user must enable the data items that they want to monitor in their system. The list of available data items is acquired by browsing a particular data source component 142.

A "Scan Rate" edit box 284 allows the user to enter the scan rate to use for this specific data source (which may be different from the global scan rate). If no scan rate is entered, the default global scan rate is used when appropriate.

Figure 13:
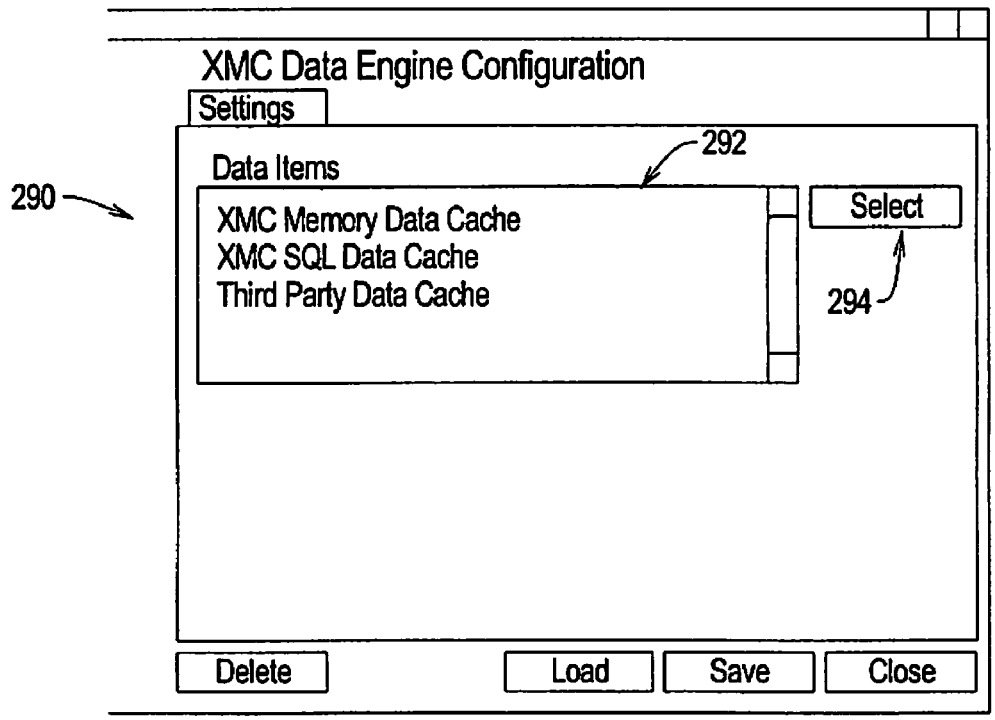

A data store property page 290 depicted in FIG. 13 is used to configure the data store component 150 by selecting and configuring the data cache or caches 152 used and the specific caching strategies for each. The following user-interface elements make up the data store property page 290.

A "Data Caches" list box 292 contains a list of all data caches 152 available to the system 120. The list of available data caches 152 may be acquired either by directly enumerating the data cache OLE Category of components or by querying the data store component 150 for a list of active data caches 152.

A "Select" button 294 adds the currently selected item in the "Data Caches" list box 290 to the currently selected data store component 150 in the master node list.

Figure 14:
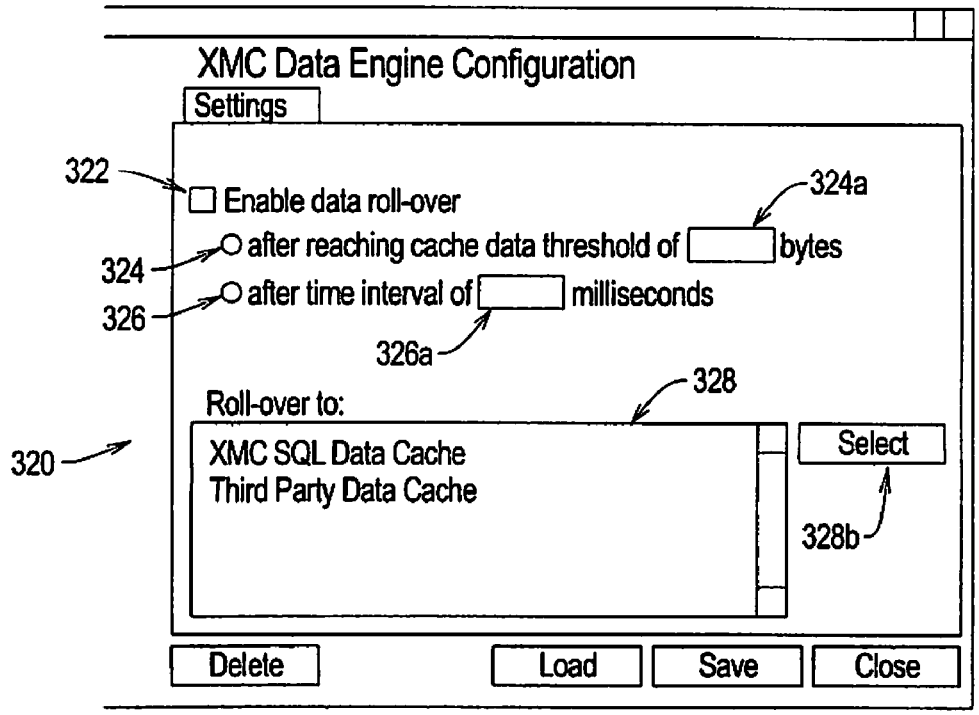

Referring now to FIG. 14, depicted therein is a data cache property page 320 that allows the user to configure the specific caching strategy to be used by each data cache 152. The following user interface elements make up the data cache property page 320.

An "Enable data roll-over" check-box 322 allows the user to enable/disable data roll-over. When enabled, data placed in a particular data cache 152 can roll-over into another, or secondary, data cache 152 upon meeting certain criteria specified by other of the user-interface elements forming the data cache property page 320.

An "After reaching cache data threshold of" radio button 224, if selected, determines that roll-over occurs when a certain number of bytes are cached in the primary data cache, assuming that data cache roll-over is also enabled by check box 322. A caching threshold data field 324a allows the user to specify the data cache threshold. After reaching the roll-over threshold level, all data currently in the primary data cache 152a is copied to the secondary data cache 152b.

An "After time interval of" radio button 326, when selected determines that roll-over occurs at specifically set time intervals, again assuming that data cache roll-over is enabled by check box 322. A time interval data field 326a allows the user to specify the duration of the time interval. Upon the expiration of each time interval all data in the primary data cache 152a is automatically copied over to the secondary data cache 152b and then removed from the primary cache 152a.

A "Roll-over to" list-box 328 contains a list of data caches that can be used as secondary caches 152b. The primary cache 152a rolls data over to the secondary cache 152b selected by pressing a "Select" button 328a.

Figure 15:
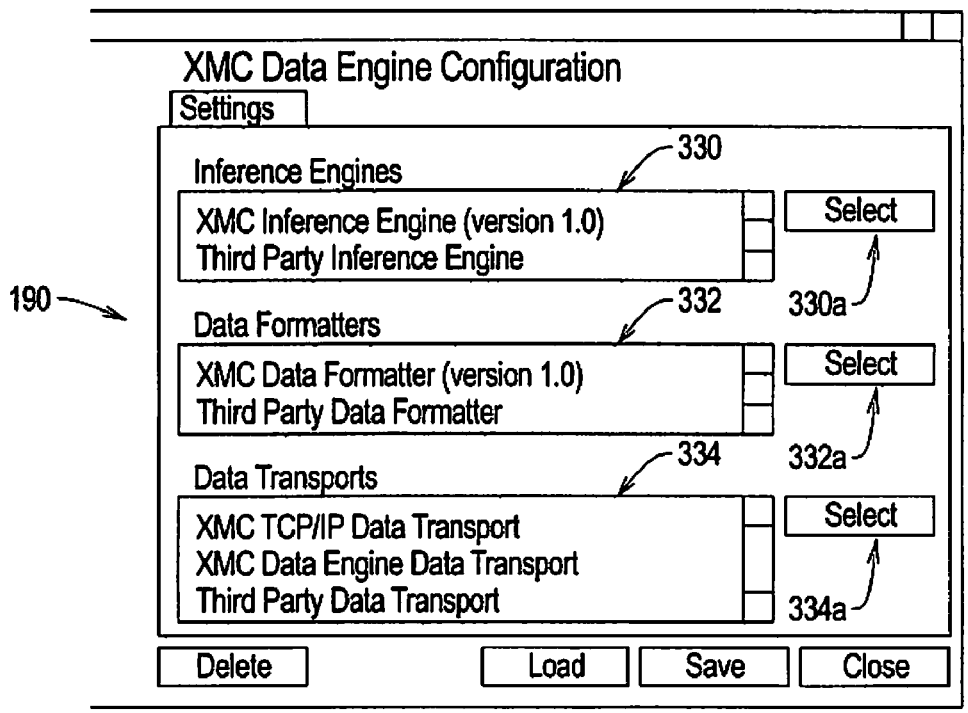

Referring now to FIG. 15, the data output property page 190 is depicted therein in further detail. The data output property page 190 is used to configure the data output module 134 by selecting the data transport components 162, data formatter component 164, and inference engine component 166 that are to make up the data output pipeline. The following user-interface elements make up the data output property page 190.

An "Interface Engines" list-box 330 contains a list of all inference engine component or components 166 that are available to the system 120. A first "Select" button 330a allows one or more of the inference engine components 166 to be selected. As generally described above, each inference engine component 166 is responsible for mapping input values to output values and determining when each data element should actually be sent to the data destination 124.

A "Data Formatters" list-box 332 contains a list of all data formatter components 164 that are available to the system 120. A second "Select" button 332a allows one or more of the data formatter components 164 to be selected. Each data formatter component 164 is responsible for transforming data input into another data format that is output as output data.

A "Data Transports" list-box 334 contains a list of all data transport components 162 that are available to the system 120. A third "Select" button 334a allows one or more of the data transport components 162 to be selected. Each data transport component 162 is responsible for sending the data received to the ultimate data destination 124, such as an enterprise database, analysis system, another data routing system, or the like.

Figure 16:
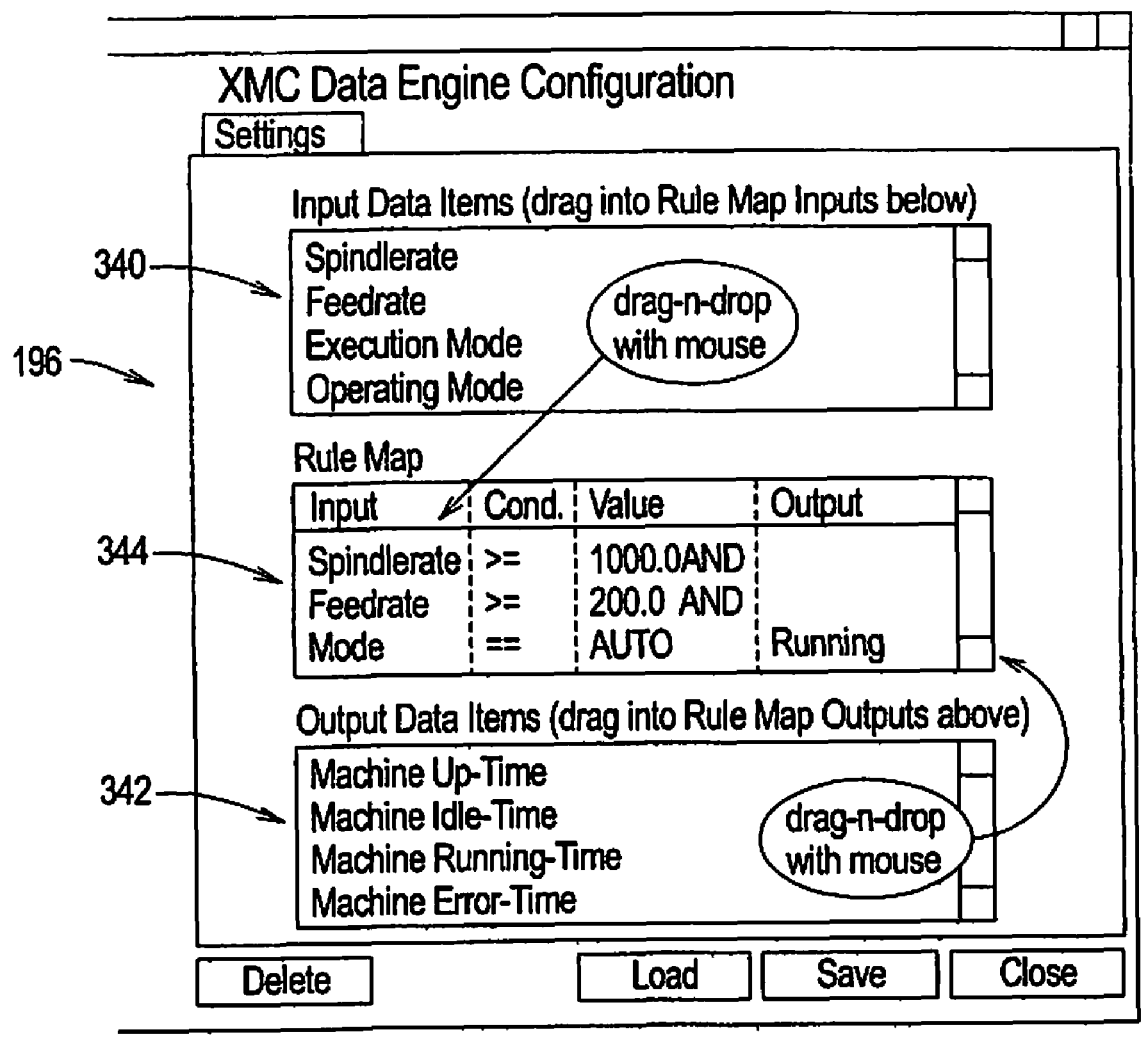

The inference engine property page 196 will now be described in further detail with reference to FIG. 16. The inference engine property page 196 is used to configure the settings defining how the inference engine component 166 actually works. The inference engine component 166 maps inputs received to expected outputs defined by the data transport component 162. When mapping inputs to outputs, the inference engine component 166 optionally uses decision logic to determine whether or not each output should fire (i.e. be sent on to one or more data transport component 162) based on the inputs received. The user interface elements making up the inference engine property page 196 are as follows.

An "Input Data Items" list-box 340 contains a list of all data inputs received from the data input module 130 via the data store component 150. An "Output Data Items" list-box 342 contains a list of all data outputs received from the data output module 134 via the data transport component 162. A "Rule Map" list-box 344 contains a list of rules that define how to map the received data inputs to the outputs.

In this sample inference engine component 166, the user drags items from the Input Data Items list box 340 into the inputs making up the rule-map as listed in the Rule Map list box 344. The rule-map associated with each of the items in the Input Data Items list box 344 defines when to fire output to each defined output.

Figure 17:
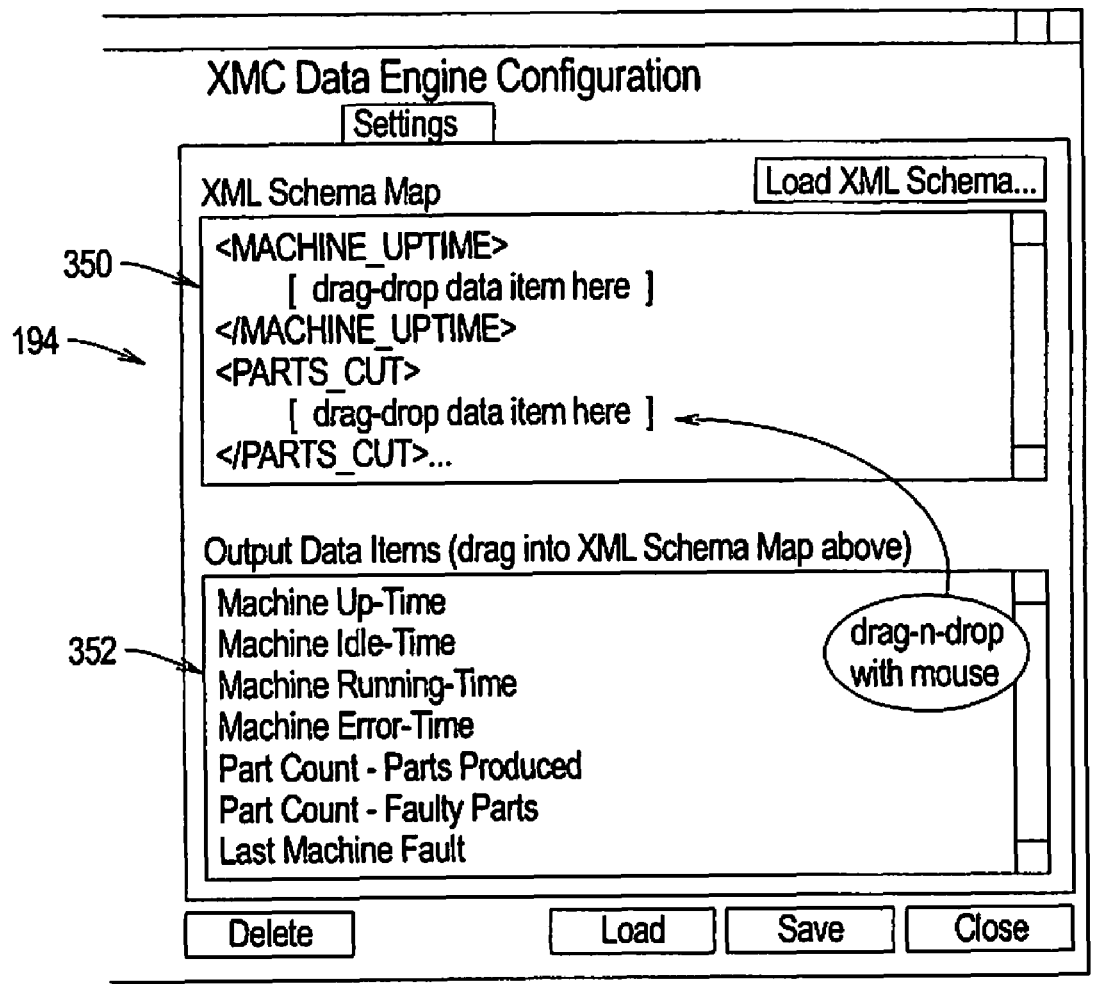

An example data formatter property page 194 is depicted in FIG. 17. The data formatter property page 194 allows the user to configure how the final data output is actually formatted. For example, the example property page 194 depicted in FIG. 17 illustrate how to map data outputs into an XML schema. The following user interface elements make up the data formatter property page 194.

An "XML Schema Map" 350 control contains an editable XML Schema that allows a user to drag an output data item into different portions of the schema essentially 'linking' the data item to that portion of the XML schema. When linked, the final XML data file is built by using the XML schema and then placing data from each output data item into the slots where they are linked into the XML schema.

An "Output Data Items List" list-box 352 contains a list of all data outputs available as defined by the data output module 134 via the data transport component or components 162.

Figure 18:
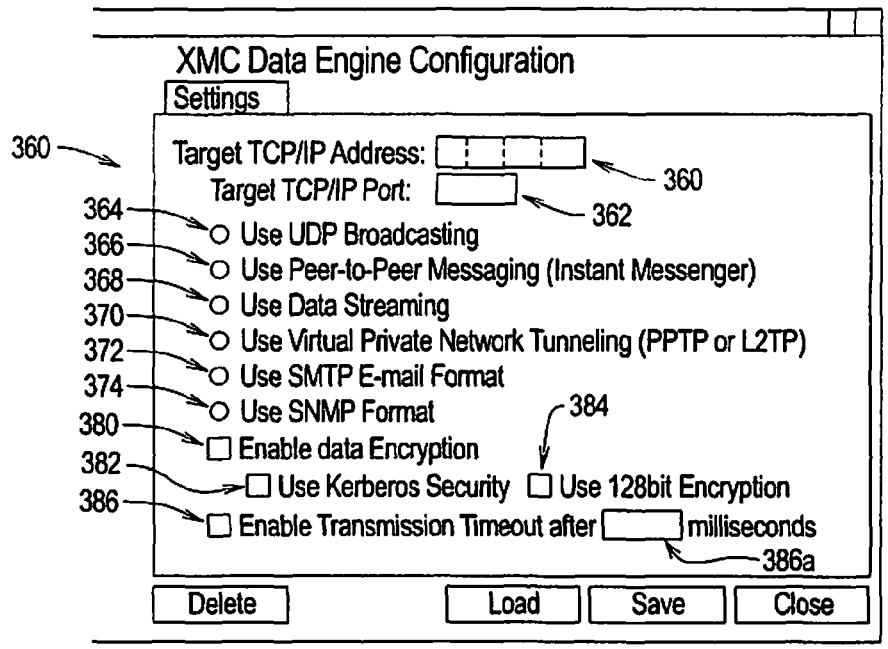

Depicted in FIG. 18 is an example of a data transport property page 192. The data transport property page 192 allows the user to configure the specific settings of each data transport component 162 used to communicate with the data destination or destinations 124. The example property page 192 depicted in FIG. 18 is an example property page for a data transport component 162 that communicates across a TCP/IP based (wire-based or wireless) network. The data transport property page employs the following user interface elements.

A "Target TCP/IP Address" 360 edit field allows the user to enter the target TCP/IP address of the machine or machines forming destinations where data is to be sent.

A "Target TCP/IP Port" edit field 362 allows the user to specify a set of one or more TCP/IP ports to use on the target TCP/IP address.

A "Use UDB Broadcasting" radio button 364 directs the transport to broadcast the output data using the UDP broadcasting protocol and ignore the target TCP/IP address as data will be sent to all machines forming data destinations 124 on the network 126.

A "Use Peer-to-Peer Messaging" radio button 366 directs the transport to use a peer-to-peer messaging protocol such as the one used with Windows Instant Messenger, where data is sent immediately to the target machine forming the data destination 124 and may optionally be displayed in an Instant Messenger viewing application such as Windows Messenger.

A "Use Data Streaming" radio button 368 directs the transport to use a data streaming technology where the data outputs are streamed to the target(s) in a manner similar to that of a streaming music or video source. Optionally, the data outputs may also be interleaved into an existing music, video, or other data streaming data source.

A "Use Virtual Private Networking Tunneling" radio button 370 directs the transport to use a tunneling technology, where the data packets making up the output data are embedded within another packet type, optionally encrypted and secured, and then sent to the target over another protocol such as HTTP, or in this case the PPTP or L2TP protocol. SOAP or XML messaging is another manner of tunneling where the data is placed within a SOAP or XML 'envelope' and then sent over to the output target using the SOAP or other XML messaging protocol.

A "Use SMTP E-Mail Format" radio button 372 directs the transport to package the output data sets into an e-mail format and sends it to the target. Further configuration may be required to actually setup a specific e-mail address for the recipient.

A "Use SNMP Format" radio button 374 directs the transport to use the SNMP transport to communicate with the output target.

An "Enable Data Encryption" check-box 380 enables data encryption such that the data is encrypted before transmission. A "Use Kerberos Security" check-box 382 enables Kerberos security. A "Use 128bit Encryption" check-box 384 enables 128-bit encryption for the output data packets.

An "Enable Transmission Timeout" check-box 386 enables transmission time-out on each communication with the target. When enabled, the sender only waits for an amount of time specified in a data field 386a for a response from the data destination 124, after which response data received from the target is ignored.

The example data routing system 120 is a modular system made up of a set of components as generally described above. In this case, each component is based on a component technology, such as OLE/COM technology defined by Microsoft Corporation.

Optionally, each component uses a separate 'parallel' ActiveX component to implement all user interface aspects of the main component, also as generally described above. Each ActiveX component may be implemented either within the main component module or separately in its own module. Bundling each object within one module is not required as they may be located at any location (i.e. across a network, and so forth), but doing so may optimize all communication between modules. How and where components are implemented is more of a logistical decision because, once components are built and deployed to the field, it is difficult to update a single component if all components are implemented within a single DLL or EXE module.

Figure 19:
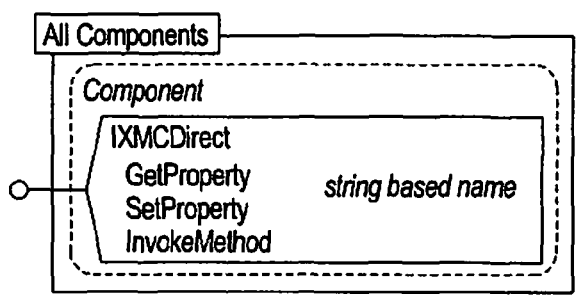

FIG. 19 illustrates that the components forming the data routing system conform to a single interface identified as the IXMCDirect interface. OLE Categories are used to determine how many components fall into a certain group of components. Components used by the example data routing system 120 fall into the following categories:

Data Input Components—Typically, this category includes a single data collector component, but multiple data input components may be used in a large distributed environment.

Data Source Components—Many data source components are often used at the same time.

Data Output Components—Many data output components are often used at the same time, with each data output component defining at least part of a data output pipeline.

Inference Components—One or more inference engine components are used by each data output component.

Data Formatter Components—One or more data formatter component components are typically used by each data output module.

Data Transport Components—One or more data transport components are typically used by each data output module.

The IXMCDirect interface depicted in FIG. 19 is used for most communications between components of the data routing system 120. The IXMCDirect interface is made up of the following functions, which are specified in standard OLE/COM IDL format.

A GetProperty method is used to query a specific property from the component implementing the interface.

A SetProperty method is used to set a specific property from the component implementing the interface.

An InvokeMethod method is used to invoke a specific action on the component implementing the interface. An action can cause an event to occur, carry out a certain operation, query a value, and/or set a value within the component implementing the method.

More detailed descriptions of each of the methods implemented by objects implementing the example IXMCDirect interface are described below.

The IXMCDirect::GetProperty method is used to query the property corresponding to the property name 'pszPropName'. Each component defines the properties that it supports. The following table summarizes the GetProperty method implemented by the example IXMCDirect interface:

| | |
|---|---|
| Syntax | HRESULT GetProperty( LPCTSTR pszPropName, LPXMC_PARAM_DATA rgData, DWORD dwCount ); |
| Parameters | LPCTSTR pszPropName - string name of the property to query. LPXMC_PARAM_DATA rgData - array of XMC_PARAM_DATA types that specify each parameter corresponding to the property. For example, a certain property may be made up of a number of elements - in this case an array of XMC_PARAM_DATA items is returned, one for each element making up the property. In most cases a property is made up of a single element, thus a single element array is passed to this method. For more information on the XMC_PARAM_DATA type, see below. DWORD dwCount - number of XMC_PARAM_DATA elements in the rgData array. |
| Return Value | HRESULT - NOERROR on success, or error code on failure. |

The IXMCDirect::SetProperty method is used to set a property in the component corresponding to the 'pszPropName' property. For the set of properties supported by the component, see the specific component description. The following table summarizes the SetProperty method implemented by the example IXMCDirect interface:

| | |
|---|---|
| Syntax | HRESULT SetProperty( LPCTSTR pszPropName, LPXMC_PARAM_DATA rgData, DWORD dwCount ); |
| Parameters | LPCTSTR pszPropName - string name of the property to set. LPXMC_PARAM_DATA rgData - array of XMC_PARAM_DATA types that specify each parameter corresponding to the property. For example, a certain property may be made up of a number of elements - in this case an array of XMC_PARAM_DATA items is returned, one for each element making up the property. In most cases a property is made up of a single element, thus a single element array is passed to this method. For more information on the XMC_PARAM_DATA type, see below. DWORD dwCount - number of XMC_PARAM_DATA elements in the rgData array. |
| Return Value | HRESULT - NOERROR on success, or error code on failure. |

The IXMCDirect::InvokeMethod method is used to call a specific method implemented by the component. For more information on the methods supported, see the description of the specific component. The following table summarizes the InvokeMethod method implemented by the example IXMCDirect interface:

| | |
|---|---|
| Syntax | HRESULT InvokeMethod( DWORD dwMethodIdx, LPXMC_PARAM_DATA rgData, DWORD dwCount ); |
| Parameters | DWORD dwMethodIdx - number corresponding to the specific method to invoke. For more information on the method indexes available, see the set of namespaces defined for the component. LPXMC_PARAM_DATA rgData [optional] - array of XMC_PARAM_DATA types that specify each parameter for the method called. For more information on the XMC_PARAM_DATA type, see below. NOTE: if no parameters exist for the method called, a value of NULL must be passed in. DWORD dwCount [optional] - number of XMC_PARAM_DATA elements in the rgData array. NOTE: if no parameters exist for the method called, a value of 0 (zero) must be passed in for this parameter. LPXMC_PARAM_DATA rgData [optional] - namespace associated with the instance of the custom extension module added. |
| Return Value | HRESULT - NOERROR on success, or error code on failure. |

This methods supported by each component making up the system 120 will now be described. Initially, the general methods supported by the majority of the components forming the system 120 will be first be described; the methods supported by each individual component will then be discussed.

The XMC_DE_BROWSE_GET_COUNT general method returns the number of data items in the browse set supported by the component and is described in the following table.

| | |
|---|---|
| Index | 8020 |
| Data In | None |
| Data Out | rgData[0] - (number) DWORD, number of browse elements. |

The XMC_DE_BROWSE_GET_ITEMS general method returns the number of data items in the browse set supported by the component and is described in the following table:

| | |
|---|---|
| Index | 8021 |
| Data In | rgData[0] - (number) DWORD, maximum number of elements to collect. |
| Data Out | rgData[0] - (number) number of elements collected, total number of elements will equal (rgData[0] * 2 + 1). rgData[1] - (string) name of the first browse element. rgData[2] - (number) adt of the first browse element. rgData[1 + n * 2] - (string) name of the n'th browse element. rgData[2 + n * 2] - (number) adt of the n'th browse element. |

The XMC_DE_SYSTEM_CONNECT_CMPNT general method is used to connect one server to another so that they may interact with one another and is described in the following table:

| | |
|---|---|
| Index | 8000 |
| Data In | rgData[0] - (number) DWORD, type of component. The type of component is a value that is server specific. For component type information, see the description for this method under each server's description.<br>rgData[1] - (string) LPTSTR, component class id as an ASCII string. |
| Data Out | None. |

The XMC_DE_SYSTEM_DISCONNECT_CMPNT general method is used to disconnect one server from another so that they stop interacting with one another and is described in the following table:

| | |
|---|---|
| Index | 8001 |
| Data In | rgData[0] - (number) DWORD, type of component. The type of component is a value that is server specific. For component type information, see the description for this method under each server's description.<br>rgData[1] - (string) LPTSTR, component class id as an ASCII string. |
| Data Out | None. |

The XMC_DE_DATA_PROCESS general method is called by a client to process data where a data set is input, processed in some way by the server, and then the resulting data is returned as output. The XMC_DE_DATA_PROCESS method is described in the following table:

| | |
|---|---|
| Index | 8063 |
| Data In | rgData[0] - (number) DWORD, number of data items input.<br>rgData[1 + n * 2] - (string) LPCTSTR, name of the data item input.<br>rgData[2 + n * 2] - (number or string), value of the data item. |
| Data Out | rgData[0] - (number) DWORD, number of data items output.<br>rgData[1 + n * 2] - (string) LPCTSTR, name of the data item output.<br>rgData[2 + n * 2] - (number) value of the data item. |

The XMC_DE_DATA_PROCESS_CONFIGURE general method is used to configure what type of data is returned when processing a given data item. For example in the server may be configured to return the minimal amount of data on each read (i.e. just the data item value), or the server may be requested to return more substantial data. The XMC_DE_DATA_PROCESS_CONFIGURE method is described in the following table:

| | |
|---|---|
| Index | 8062 |
| Data In | rgData[0] - (number) DWORD, flag describing the type of data to be returned when processing data. The following flags are supported:<br>XMC_DE_READ_DATA_FLAG_TIMESTAMP - requests that the time stamp recorded when processing the data is returned.<br>NOTE: by default, the data item value is always returned. |
| Data Out | None. |

The XMC_DE_DATA_READ general method is called by a client application to poll for data from the server and is defined in the following table:

| | |
|---|---|
| Index | 8061 |
| Data In | rgData[0] - (string) LPCTSTR, name of the data item to read. |
| Data Out | rgData[0] - (number or string), data item value.<br>rgData[1] - (OPTIONAL number) DWORD, data item time-stamp as a system time value.<br>NOTE: Since the last items are optional, only those items specified when configuring the data to receive are actually sent. |

The XMC_DE_DATA_READ_CONFIGURE general method is used to configure what type of data is returned when reading a given data item. For example, the server may be configured to return the minimal amount of data on each read (i.e. just the data item value) or the server may be requested to return more substantial data. The following table defines the XMC_DE_DATA_READ_CONFIGURE method:

| | |
|---|---|
| Index | 8060 |
| Data In | rgData[0] - (number) DWORD, flag describing the type of data to be returned on each read. The following flags are supported:<br>XMC_DE_READ_DATA_FLAG_TIMESTAMP - requests that the time stamp recorded when reading the data is returned.<br>NOTE: by default, the data item value is always returned. |
| Data Out | None. |

The XMC_DE_DATA_WRITE general method is used to write data to a server and is described in the following table:

| | |
|---|---|
| Index | 8064 |
| Data In | rgData[0] - (number) DWORD, number of data items.<br>rgData[1 + n * 2] - (string) LPCTSTR, name of the data item.<br>rgData[2 + n * 2] - (number or string), value of the data item. |
| Data Out | None. |

The XMC_DE_EVENT_ENABLE general method enables/disables a previously subscribed data item in the subscription list maintained by the server. Only enabled subscriptions actually fire. The XMC_DE_EVENT_ENABLE method is defined in the following table:

| | |
|---|---|
| Index | 2892 |
| Data In | rgData[0] - (number) DWORD, cookie (unique identifier) associated with the subscription. This value is returned to the client when calling the subscription XMCAPI above.<br>NOTE: using a cookie value of zero (0) will enable/disable ALL items subscribed to the server.<br>rgData[1] - (number) BOOL, TRUE to enable the subscription(s), FALSE to disable the subscription(s). Only enabled subscriptions actually fire events. |
| Data Out | None. |

This XMC_DE_EVENT_RECEIVE_DATA general method is called by the server (and implemented by the client) when each subscribed event fires and is described in the following table:

| | |
|---|---|
| Index | 8045 |
| Data In | rgData[0] - (number) DWORD, subscription cookie corresponding to the subscribed data item.<br>rgData[1] - (number or string), data item value.<br>rgData[2] - (OPTIONAL number) DWORD, data item time-stamp as a system time value.<br>rgData[3] - (OPTIONAL string) LPSTR, data item ASCII text name.<br>rgData[4] - (OPTIONAL number) DWORD, data item unique cookie.<br>NOTE: Since the last three items are optional, only those items specified when configuring the data to receive are actually sent. If, for example, one or more data items are NOT requested, then the items are returned in slots shifted up toward rgData[1]. For example if only the data item name is requested in addition to the default data items, the data returned would look like the following:<br>rgData[0] - (number) DWORD, subscription cookie.<br>rgData[1] - (number or string), data item value.<br>rgData[2] - (string) LPSTR, data item name. |
| Data Out | None. |

The XMC_DE_EVENT_RECEIVE_DATA_CONFIGURE general method is used to configure what type of data is returned on each event that is fired. For example in the server may be configured to send the minimal amount of data on each event (i.e. subscription cookie and data item value), or the server may be requested to return more substantial data. The XMC_DE_EVENT_RECEIVE_DATA_CONFIGURE method is defined in the following table:

| | |
|---|---|
| Index | 8044 |
| Data In | rgData[0] - (number) DWORD, flag describing the type of data to be returned on each event. The following flags are supported:<br>XMC_DE_EVENT_DATA_FLAG_TIMESTAMP - requests that the time stamp recorded when reading the data is returned.<br>XMC_DE_EVENT_DATA_FLAG_NAME - requests that the data items ASCII text name be returned.<br>XMC_DE_EVENT_DATA_FLAG_DATA_COOKIE - requests that the unique data item cookie corresponding to the read made for the data item be returned.<br>NOTE: by default, the subscription cookie and data item value are always returned. |
| Data Out | None. |

The XMC_DE_EVENT_SUBSCRIBE general method subscribes to a given data item activating the event interface when the subscription criteria are met for the data item. All subscribing components use the IXMCDirect interface to receive events received from the server for which they are subscribed. The XMC_DE_EVENT_SUBSCRIBE method is described in the following table:

| | |
|---|---|
| Index | 2890 |
| Data In | rgData[0] - (number) DWORD, flags describing the initial state of the subscription. The following flags are supported:<br>XMC_DE_EVENT_FLAG_ENABLED - subscription is immediately enabled upon subscription.<br>XMC_DE_EVENT_FLAG_DISABLED - subscription is disabled upon making the subscription. The Enable function must be called to enable the subscription.<br>rgData[1] —(number) DWORD, number of subscription criteria rules.<br>rgData[2 + (2 * n)] - (number) DWORD, event condition type where the following types are supported:<br>XMC_CNC_EVENTCONDITION_DATA_CHANGE - any data changes in the data type above will trigger the event.<br>XMC_CNC_EVENTCONDITION_DATA_EQUAL<br>XMC_CNC_EVENTCONDITION_DATA_LESSTHAN<br>XMC_CNC_EVENTCONDITION_DATA_GREATERTHAN<br>XMC_CNC_EVENTCONDITION_DATA_AND<br>XMC_CNC_EVENTCONDITION_DATA_OR<br>Each of the conditions above are used in a combined manner. Where the logical condition (=, <, >) are applied for each type respectively.<br>For example, in an array that contains the following items:<br>rgData[2] = 4 (4 condition values)<br>rgData[3] = XMC_CNC_EVENTCONDITION_EQUAL<br>rgData[4] = 3.0<br>rgData[5] = XMC_CNC_EVENTCONDITION_LESSTHAN<br>rgData[6] = 3.0<br>rgData[7] = XMC_CNC_EVENTCONDITION_OR<br>rgData[8] = 1.0<br>rgData[9] = XMC_CNC_EVENTCONDITION_GREATERTHAN<br>rgData[10] = 5.0<br>the array would be evaluated using the following logic:<br>If (DATA <= 3.0 OR DATA >5.0) then Trigger Event<br>rgData[3 + (2 * n)] - (number) double, the value for the condition. See above. |
| Data Out | rgData[0] - (number) DWORD, cookie (unique identifier) representing the subscription. |

The XMC_DE_EVENT_UNSUBSCRIBE general method removes a previously subscribed data item from the subscription list maintained by the server and is defined in the following table:

| | |
|---|---|
| Index | 2891 |
| Data In | rgData[0] - (number) DWORD, cookie (unique identifier) associated with the subscription. This value is returned to the client when calling the subscription XMCAPI above.<br>NOTE: using a cookie value of zero (0) will unsubscribe ALL items subscribed to the server. |
| Data Out | None. |

The XMC_DE_SYSTEM_INITIALIZEHW general method is used to initialize any hardware systems associated with the component and is defined in the following table:

| | |
|---|---|
| Index | 500 |
| Data In | None. |
| Data Out | None. |

The XMC_DE_SYSTEM_SHUTDOWNHW general method is used to shutdown any hardware systems associated with the component and is defined by the following table:

| | |
|---|---|
| Index | 501 |
| Data In | None. |
| Data Out | None. |

The following discussion will define which of the general methods implemented are implemented by particular components of the system 120.

The data collection component 140 implements the general methods described above as indicated in the following table:

| Method | Implemented | Not Implemented |
|---|---|---|
| XMC_DE_BROWSE_GET_COUNT | x | |
| XMC_DE_BROWSE_GET_ITEMS | x | |
| XMC_DE_DATA_PROCESS | | x |
| XMC_DE_DATA_PROCESS_CONFIGURE | | x |
| XMC_DE_DATA_READ | x | |
| XMC_DE_DATA_READ_CONFIGURE | x | |
| XMC_DE_DATA_WRITE | | x |
| XMC_DE_EVENT_ENABLE | x | |
| XMC_DE_EVENT_RECEIVE_DATA | x | |
| XMC_DE_EVENT_RECEIVE_DATA_CONFIGURE | x | |
| XMC_DE_EVENT_SUBSCRIBE | x | |
| XMC_DE_EVENT_UNSUBSCRIBE | x | |
| XMC_DE_SYSTEM_CONNECT_CMPNT | x | |
| XMC_DE_SYSTEM_DISCONNECT_CMPNT | x | |
| XMC_DE_SYSTEM_INITIALIZEHW | | x |
| XMC_DE_SYSTEM_SHUTDOWNHW | | x |

The following special notes apply to some of the general methods implemented by the data collection component 140.

The following component types are valid for the XMC_DE_SYSTEM_CONNECT_CMPNT method as implemented by the data collection component 140: the XMC_DE_CMPNT_TYPE_XMCDSRC, which specifies a data source component 142.

The following component types are valid for the XMC_DE_SYSTEM_DISCONNECT_CMPNT method as implemented by the data collection component 140: XMC_DE_CMPNT_TYPE_XMCDSRC, which specifies an data source component 142.

The data source component 142 implements the general methods described above as indicated in the following table:

| Method | Implemented | Not Implemented |
|---|---|---|
| XMC_DE_BROWSE_GET_COUNT | x | |
| XMC_DE_BROWSE_GET_ITEMS | x | |
| XMC_DE_DATA_PROCESS | | x |
| XMC_DE_DATA_PROCESS_CONFIGURE | | x |
| XMC_DE_DATA_READ | x | |
| XMC_DE_DATA_READ_CONFIGURE | x | |
| XMC_DE_DATA_WRITE | | x |
| XMC_DE_EVENT_ENABLE | x | |
| XMC_DE_EVENT_RECEIVE_DATA | x | |
| XMC_DE_EVENT_RECEIVE_DATA_CONFIGURE | x | |
| XMC_DE_EVENT_SUBSCRIBE | x | |
| XMC_DE_EVENT_UNSUBSCRIBE | x | |
| XMC_DE_SYSTEM_CONNECT_CMPNT | | x |
| XMC_DE_SYSTEM_DISCONNECT_CMPNT | | x |
| XMC_DE_SYSTEM_INITIALIZEHW | x | |
| XMC_DE_SYSTEM_SHUTDOWNHW | x | |

There are no special notes for the methods implemented by the data source components 142.

The data store component 150 implements the general methods described above as indicated in the following table:

| Method | Implemented | Not Implemented |
|---|---|---|
| XMC_DE_BROWSE_GET_COUNT | x | |
| XMC_DE_BROWSE_GET_ITEMS | x | |

| Method | Implemented | Not Implemented |
|---|---|---|
| XMC_DE_DATA_PROCESS | | x |
| XMC_DE_DATA_PROCESS_CONFIGURE | | x |
| XMC_DE_DATA_READ | x | |
| XMC_DE_DATA_READ_CONFIGURE | x | |
| XMC_DE_DATA_WRITE | | x |
| XMC_DE_EVENT_ENABLE | x | |
| XMC_DE_EVENT_RECEIVE_DATA | x | |
| XMC_DE_EVENT_RECEIVE_DATA_CONFIGURE | x | |
| XMC_DE_EVENT_SUBSCRIBE | x | |
| XMC_DE_EVENT_UNSUBSCRIBE | x | |
| XMC_DE_SYSTEM_CONNECT_CMPNT | x | |
| XMC_DE_SYSTEM_DISCONNECT_CMPNT | x | |
| XMC_DE_SYSTEM_INITIALIZEHW | | x |
| XMC_DE_SYSTEM_SHUTDOWNHW | | x |

The following special notes apply to each of the general methods implemented by the data store component 150.

The following component types are valid for the XMC_DE_SYSTEM_CONNECT_CMPNT method on the data store component 150:

XMC_DE_CMPNT_TYPE_XMCDCACHE, which specifies a data cache 152;

XMC_DE_CMPNT_TYPE_XMCDC, which specifies a data collection component 140 that is connected with events; and XMC_DE_CMPNT_TYPE_XMCDO, which specifies a data transport component 162 that is connected with events.

The following component types are valid for the XMC_DE_SYSTEM_DISCONNECT_CMPNT method as implemented by the data store component 150:

XMC_DE_CMPNT_TYPE_XMCDCACHE, which specifies a data cache 152;

XMC_DE_CMPNT_TYPE_XMCDC, which specifies a data collection component 140 that is connected with events; and XMC_DE_CMPNT_TYPE_XMCDO, which specifies an XMC data output module 134 that is connected with events.

The data store component 150 implements the general methods described above as indicated in the following table:

| Method | Implemented | Not Implemented |
|---|---|---|
| XMC_DE_BROWSE_GET_COUNT | x | |
| XMC_DE_BROWSE_GET_ITEMS | x | |
| XMC_DE_DATA_PROCESS | | x |
| XMC_DE_DATA_PROCESS_CONFIGURE | | x |
| XMC_DE_DATA_READ | x | |
| XMC_DE_DATA_READ_CONFIGURE | x | |
| XMC_DE_DATA_WRITE | x | |
| XMC_DE_EVENT_ENABLE | x | |
| XMC_DE_EVENT_RECEIVE_DATA | x | |
| XMC_DE_EVENT_RECEIVE_DATA_CONFIGURE | x | |
| XMC_DE_EVENT_SUBSCRIBE | x | |
| XMC_DE_EVENT_UNSUBSCRIBE | x | |
| XMC_DE_SYSTEM_CONNECT_CMPNT | | x |
| XMC_DE_SYSTEM_DISCONNECT_CMPNT | | x |
| XMC_DE_SYSTEM_INITIALIZEHW | | x |
| XMC_DE_SYSTEM_SHUTDOWNHW | | x |

There are no special notes for the methods implemented by the data store component 150.

The data output component 160 implements the general methods described above as indicated in the following table:

| Method | Implemented | Not Implemented |
|---|---|---|
| XMC_DE_BROWSE_GET_COUNT | x | |
| XMC_DE_BROWSE_GET_ITEMS | x | |
| XMC_DE_DATA_PROCESS | | x |
| XMC_DE_DATA_PROCESS_CONFIGURE | | x |
| XMC_DE_DATA_READ | x | |
| XMC_DE_DATA_READ_CONFIGURE | x | |
| XMC_DE_DATA_WRITE | | x |
| XMC_DE_EVENT_ENABLE | x | |
| XMC_DE_EVENT_RECEIVE_DATA | x | |
| XMC_DE_EVENT_RECEIVE_DATA_CONFIGURE | x | |
| XMC_DE_EVENT_SUBSCRIBE | x | |
| XMC_DE_EVENT_UNSUBSCRIBE | x | |
| XMC_DE_SYSTEM_CONNECT_CMPNT | x | |
| XMC_DE_SYSTEM_DISCONNECT_CMPNT | x | |
| XMC_DE_SYSTEM_INITIALIZEHW | | x |
| XMC_DE_SYSTEM_SHUTDOWNHW | | x |

The following special notes methods apply to the general methods as implemented by the data output component 160.

The following component types are valid for the XMC_DE_SYSTEM_CONNECT_CMPNT as implemented by the data output component 160:

XMC_DE_CMPNT_TYPE_XMCINFERENCE, which specifies an inference engine component 166;

XMC_DE_CMPNT_TYPE_XMCDFORMAT, which specifies a data formatter component 164; and XMC_DE_CMPNT_TYPE_XMCDTRANSPORT, which specifies a data transport component 162.

The following component types are valid for the XMC_DE_SYSTEM_DISCONNECT_CMPNT as implemented by the data output component 160:

XMC_DE_CMPNT_TYPE_XMCINFERENCE, which specifies an inference engine component 166.

XMC_DE_CMPNT_TYPE_XMCDFORMAT, which specifies an data formatter component 164.

XMC_DE_CMPNT_TYPE_XMCDTRANSPORT, which specifies an data transport component 162.

The inference engine component 166 implements the general methods described above as indicated in the following table:

| Method | Implemented | Not Implemented |
|---|---|---|
| XMC_DE_BROWSE_GET_COUNT | x | |
| XMC_DE_BROWSE_GET_ITEMS | x | |
| XMC_DE_DATA_PROCESS | x | |
| XMC_DE_DATA_PROCESS_CONFIGURE | x | |
| XMC_DE_DATA_READ | | x |
| XMC_DE_DATA_READ_CONFIGURE | | x |
| XMC_DE_DATA_WRITE | x | |
| XMC_DE_EVENT_ENABLE | | x |
| XMC_DE_EVENT_RECEIVE_DATA | | x |
| XMC_DE_EVENT_RECEIVE_DATA_CONFIGURE | | x |
| XMC_DE_EVENT_SUBSCRIBE | | x |
| XMC_DE_EVENT_UNSUBSCRIBE | | x |
| XMC_DE_SYSTEM_CONNECT_CMPNT | | x |
| XMC_DE_SYSTEM_DISCONNECT_CMPNT | | x |
| XMC_DE_SYSTEM_INITIALIZEHW | | x |
| XMC_DE_SYSTEM_SHUTDOWNHW | | x |

There are no special notes for the methods implemented by the inference engine component 166.

The data formatter component 164 implements the general methods described above as indicated in the following table:

| Method | Implemented | Not Implemented |
|---|---|---|
| XMC_DE_BROWSE_GET_COUNT | x | |
| XMC_DE_BROWSE_GET_ITEMS | x | |
| XMC_DE_DATA_PROCESS | x | |
| XMC_DE_DATA_PROCESS_CONFIGURE | x | |
| XMC_DE_DATA_READ | | x |
| XMC_DE_DATA_READ_CONFIGURE | | x |
| XMC_DE_DATA_WRITE | x | |
| XMC_DE_EVENT_ENABLE | | x |
| XMC_DE_EVENT_RECEIVE_DATA | | x |
| XMC_DE_EVENT_RECEIVE_DATA_CONFIGURE | | x |
| XMC_DE_EVENT_SUBSCRIBE | | x |
| XMC_DE_EVENT_UNSUBSCRIBE | | x |
| XMC_DE_SYSTEM_CONNECT_CMPNT | | x |
| XMC_DE_SYSTEM_DISCONNECT_CMPNT | | x |
| XMC_DE_SYSTEM_INITIALIZEHW | | x |
| XMC_DE_SYSTEM_SHUTDOWNHW | | x |

There are no special notes for the methods implemented by the data formatter component 164.

The data transport component 162 implements the general methods described above as indicated in the following table:

| Method | Implemented | Not Implemented |
|---|---|---|
| XMC_DE_BROWSE_GET_COUNT | x | |
| XMC_DE_BROWSE_GET_ITEMS | x | |
| XMC_DE_DATA_PROCESS | | x |
| XMC_DE_DATA_PROCESS_CONFIGURE | | x |
| XMC_DE_DATA_READ | | x |
| XMC_DE_DATA_READ_CONFIGURE | | x |
| XMC_DE_DATA_WRITE | x | |
| XMC_DE_EVENT_ENABLE | | x |
| XMC_DE_EVENT_RECEIVE_DATA | | x |
| XMC_DE_EVENT_RECEIVE_DATA_CONFIGURE | | x |
| XMC_DE_EVENT_SUBSCRIBE | | x |
| XMC_DE_EVENT_UNSUBSCRIBE | | x |
| XMC_DE_SYSTEM_CONNECT_CMPNT | | x |
| XMC_DE_SYSTEM_DISCONNECT_CMPNT | | x |
| XMC_DE_SYSTEM_INITIALIZEHW | | x |
| XMC_DE_SYSTEM_SHUTDOWNHW | | x |

There are no special notes for the methods implemented by the data transport component 162.

All methods exposed by each component in the example data routing system 120 use a standard parameter set to describe data used to set and query properties as well as to invoke methods. The standard parameters are in the following format:

pObj->InvokeMethod(LPXMC_PARAM_DATA rgData, DWORD dwCount);

Each element in the rgData array corresponds to a parameter, with the first element in the array corresponding to the first parameter.

The XMC_PARAM_DATA structure can contain either a numerical or a string value and is defined as follows:

```
typedef struct tagXMC_PARAM_DATA
{
    LNG_PARAM_DATATYPE adt;
    union
    {
        double df;
        LPTSTR psz;
    };
}XMC_PARAM_DATA;
```

The 'adt' member of the XMC_PARAM_DATA structure describes the data contained within the XMC_PARAM_DATA structure. The values are described below:

| LNG_PARAM_DATATYPE | Description |
|---|---|
| LNG_ADT_NUMBER | Use this value when passing a numerical value via the 'adt' member of the XMC_PARAM_DATA structure. |
| LNG_ADT_STAT_STRING | Use this value when passing a static string value via the 'psz' member of the XMC_PARAM_DATA structure. Static strings do not need to be freed from memory. |
| LNG_ADT_MEM_STRING | Use this value when passing a string value via the 'psz' member of the XMC_PARAM_DATA structure. LNG_ADT_MEM_STRING denotes that the string must be freed from memory during cleanup. |
| LNG_ADT_NOP | This value is used to ignore items within the XMC_PARAM_DATA array. When specifies, this parameter is not used. |

When querying and setting boolean TRUE/FALSE values, any non-zero value is considered TRUE, whereas a zero value is considered FALSE.

As described herein, the data routing system 120 is designed to collect data from one or more data origins 122, perform some decision logic on the data collected, and then send the data to one or more data destinations 124 based on the outcome of the decision logic run on the data inputs.

Figure 20:
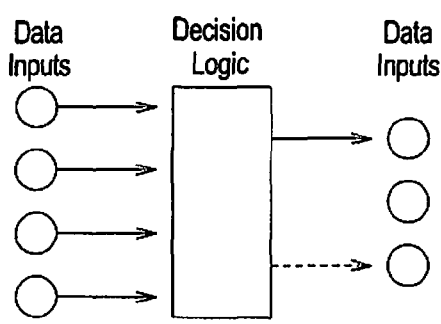
FIGS. 20 and 21 are highly schematic block diagrams depicting alternate relationships of data inputs, data outputs, and decision logic that may be used by the example data routing systems of FIGS. 1 and 2.

For example, data inputs may be data items describing the current state of a machine tool, automobile or other machine as shown in FIG. 20. The decision logic would then use these data inputs to determine the overall health or efficiency of the machine. Data outputs would be used to describe the machine's health or efficiency. This model thus operates as a data 'router', where data is routed from one or more input to one or more output based on the decision logic run on the inputs. Typically this model is used to 'cook-down' a wide array of data inputs that are very detailed in nature, to a more general set of data outputs that describe the overall performance, state or behavior of the machine.

Figure 21:
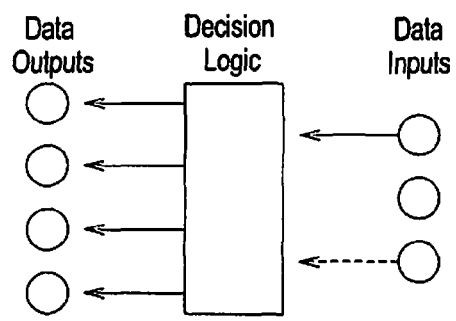

However, this overall model can easily run in the reverse where the data input and output roles are reversed. In such an example, as generally shown in FIG. 21 the inputs are general in nature and then decision logic is used to determine the specific detailed outputs necessary to carry out a given behavior or action or to enter a given state.

For example using the latter model, a general input to a machine tool may be something like 'mill a pocket' at a certain point. The decision logic in turn would then figure out all of the necessary tools, feedrate, spindlerate and moves necessary to create the pocket on the part. Once determined, the decision logic would 'output' the values as a set of detailed output values such as the specific feedrate, the specific spindlerate and the move profile to use. Each output would then be sent directly to the machine controller hardware that actually ran the servo algorithms to move the tool and cut the part.

In another example, general inputs may be used to direct the path for which a car, airplane, ship or other mobile machine moved to a given destination. For example, a general set of instructions would make up the inputs such as follow road 'x' to intersection 'y', turn left at intersection 'y', drive to house 'b'. The decision logic in this example would then be used to determine how to drive along road 'x' (making sure to track the right hand side of the road by following the yellow or white lines painted on the road), decision logic would determine when the intersection sought had been reached, how to negotiate the turn and drive to house 'b'. When making each of these decisions the decision logic system would more than likely require additional, more detailed input from sensor systems. Each output could then take a more detailed form such as the speed that the car or other mobile should drive, and the steering adjustments needed to track and follow the desired path on the selected road.

One of ordinary skill in the art will recognize that the present invention may be embodied in forms other than those described above. The scope of the invention should be determined by the following claims and not the foregoing detailed description of the example embodiments.

What is claimed is:

1. A motion control system for collecting data from a plurality of motion control devices and distributing data to a plurality of data destinations, where the plurality of motion control devices are of a plurality of motion control device types and the plurality of data destinations are of a plurality of data destination types, comprising:
   a data input module comprising a plurality of data source components, where
      each of the data source components is configured to collect data from one of the plurality of motion control device types, and
      at least one of the data source components is operatively connected to collect data from at least one of the motion control devices;
   a data output module comprising a plurality of data transport components and decision logic, where
      each of the data transport components is configured to transport data to one of the plurality of data destination types,
      at least one of the plurality of data transport components is operatively connected to distribute data to at least one of the plurality of data destinations, and
      the decision logic determines how data collected by the data input module is distributed to the plurality of data destinations; and
   a data cache module for storing data collected by the plurality of data input modules, where data stored by the data cache module is accessible by the plurality of data output modules; wherein
   the data output module distributes data collected by the data input module and stored in the data cache module to at least one of the plurality of data destinations.

2. A motion control system as recited in claim 1, in which the decision logic determines:
   what data is distributed to which of the plurality of data destinations;
   the format of the data to be distributed to each of the plurality of data destinations; and
   the method of transporting data to each of the plurality of data destinations.

3. A motion control system as recited in claim 1, in which the data output module comprises:
- an inference engine component for determining how data is distributed to the plurality of data destinations; and
- a data output component for receiving data from the data input module and distributing the data to the plurality of data destinations based on the determination made by the inference engine.

4. A motion control system as recited in claim 1, in which the data output module comprises:
- an inference engine component for determining how data is distributed to the plurality of data destinations; and
- a data output component for receiving data from the data input module and distributing the data to the plurality of data destinations based on the determination made by the inference engine.

5. A motion control system as recited in claim 4, in which the inference engine component maps data to one or more of the data destinations based on logic rules.

6. A motion control system as recited in claim 5, in which the logic rules determine:
- what data is distributed to which of the plurality of data destinations;
- the format of the data to be distributed to each of the plurality of data destinations; and
- the method of transporting data to each of the plurality of data destinations.

7. A motion control system as recited in claim 4, in which the inference engine component comprises at least one computer logic system selected from the group of computer logic systems consisting of artificial intelligence systems, fuzzy logic algorithm systems, neural network pattern matching systems, genetic algorithm systems, expert logic systems, and pattern matching systems.

8. A motion control system as recited in claim 4, in which the data output module further comprises at least one data transport component for transporting data to at least one of the data destinations.

9. A motion control system as recited in claim 4, in which the data output module further comprises at least one data formatter component for formatting data distributed to at least one of the data destinations.

10. A motion control system as recited in claim 1, in which the data input module comprises:
- at least one data source component associated with at least one data origin; and
- a data collection component for controlling the at least one data source to collected data from the at least one data origin associated therewith.

11. A motion control system as recited in claim 1, in which the data cache module comprises:
- at least one data cache component associated with a data storage system; and
- a data store component for receiving data from the data input module, storing the data in the data storage system associated with the at least one data cache component, retrieving data from the data storage system associated with the at least one data cache component, and delivering data to the data output module.

12. A motion control system as recited in claim 1, in which decision logic further determines how data requests generated by the data destinations are distributed to the plurality of data origins.

13. A motion control system for collecting data from a plurality of motion control devices and distributing data to a plurality of data destinations, where the plurality of motion control devices are of a plurality of motion control device types and the plurality of data destinations are of a plurality of data destination types, comprising:
- a data input module comprising a plurality of data source components, where
  - each of the data source components is configured to collect data from one of the plurality of motion control device types, and
  - at least one of the data source components is operatively connected to collect data from at least one of the motion control devices;
- a data output module comprising
  - a plurality of data transport components, where
    - each of the data transport components is configured to transport data to one of the plurality of data destination types, and
    - at least one of the plurality of data transport components is operatively connected to distribute data to at least one of the plurality of data destinations,
  - an inference engine component for determining how data is distributed to the plurality of data destinations, and
  - a data output component for receiving data from the data input module and distributing the data to the plurality of data destinations based on the determination made by the inference engine; and
- a data cache module for storing data collected by the plurality of data input modules, where data stored by the data cache module is accessible by the plurality of data output modules; wherein
- the data output module distributes data collected by the data input module and stored in the data cache module to at least one of the plurality of data destinations.

14. A motion control system as recited in claim 13, in which the data input module comprises:
- at least one data source component associated with at least one data origin; and
- a data collection component for controlling the at least one data source to collected data from the at least one data origin associated therewith.

15. A motion control system as recited in claim 13, in which the data cache module comprises:
- at least one data cache component associated with a data storage system; and
- a data store component for receiving data from the data input module, storing the data in the data storage system associated with the at least one data cache component, retrieving data from the data storage system associated with the at least one data cache component, and delivering data to the data output module.

* * * * *